United States Patent [19]

Yasugaki et al.

[11] Patent Number: 5,546,227
[45] Date of Patent: Aug. 13, 1996

[54] IMAGE DISPLAY APPARATUS

[75] Inventors: Masato Yasugaki; Osamu Konuma; Yoichi Iba, all of Tokyo, Japan

[73] Assignee: Olympus Optical Co., Ltd., Tokyo, Japan

[21] Appl. No.: 201,384

[22] Filed: Feb. 24, 1994

[30] Foreign Application Priority Data

| Feb. 24, 1993 | [JP] | Japan | 5-035211 |
| Feb. 24, 1993 | [JP] | Japan | 5-035212 |

[51] Int. Cl.⁶ .................................................. G02B 27/14
[52] U.S. Cl. .......................... 359/630; 359/631; 359/633; 359/636; 359/638
[58] Field of Search ................................ 359/619, 625, 359/627, 629, 630, 631, 633, 634, 636, 638, 726, 727, 730, 731, 831, 833, 834

[56] References Cited

U.S. PATENT DOCUMENTS

| 3,914,030 | 10/1975 | Weiss | 359/727 |
| 4,269,476 | 5/1981 | Gauthier et al. | 350/174 |
| 4,560,255 | 12/1985 | Reiner | 359/863 |
| 4,600,271 | 7/1986 | Boyer et al. | |
| 5,151,722 | 9/1992 | Massof | 351/158 |
| 5,289,312 | 2/1994 | Hashimoto | 359/727 |
| 5,383,053 | 1/1995 | Hegg | 359/486 |
| 5,408,346 | 4/1995 | Trissel | 359/65 |

FOREIGN PATENT DOCUMENTS 5130532   5/1993   Japan .

*Primary Examiner*—Georgia Y. Epps
*Assistant Examiner*—Ricky Mack
*Attorney, Agent, or Firm*—Cushman, Darby & Cushman

[57] ABSTRACT

An image display apparatus, e.g., a head-mounted display apparatus, which uses a half-mirror or a beam splitter prism and yet has an even more compact structure and provides a favorably flat image surface. A half-mirror (S) is obliquely disposed in front of an observer's eyeball (1), and an image display device (3), e.g., a liquid crystal display device, and a magnifying reflecting mirror (4) are disposed to face each other across the half-mirror (S) and to extend parallel to the observer's line of sight. To widen the field angle without increasing the size and weight of the optical system considerably, at least one surface (L) having positive refractive power is interposed between the eyeball (1) and the half-mirror (S). An even more compact arrangement is obtained by using a beam splitter prism in place of the half-mirror (S).

30 Claims, 34 Drawing Sheets

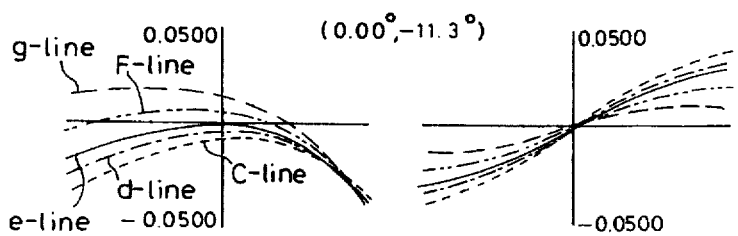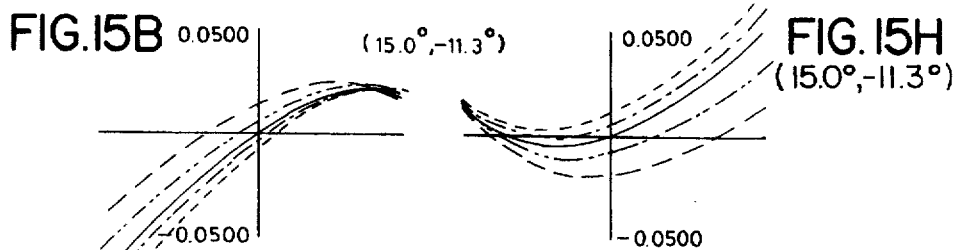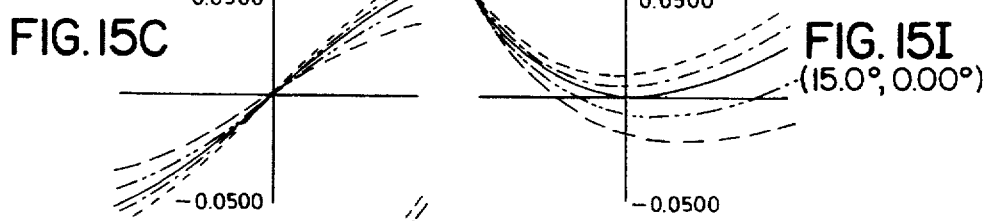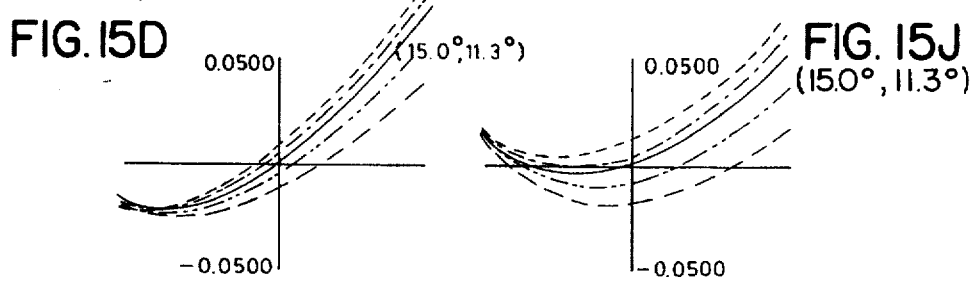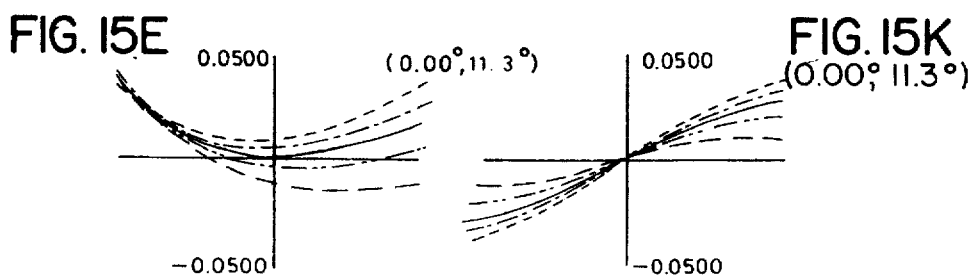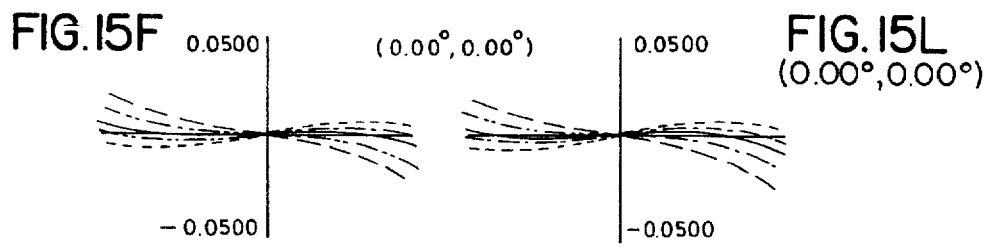

FIG.16A (0.00°,-13.5°)
FIG.16G (0.00°,-13.5°)
FIG.16B (18.0°,-13.5°)
FIG.16H (18.0°,-13.5°)
FIG.16C (18.0°,0.00°)
FIG.16I (18.0°,0.00°)
FIG.16D (18.0°,13.5°)
FIG.16J (18.0°,13.5°)
FIG.16E (0.00°,13.5°)
FIG.16K (0.00°,13.5°)
FIG.16F (0.00°,0.00°)
FIG.16L (0.00°,0.00°)
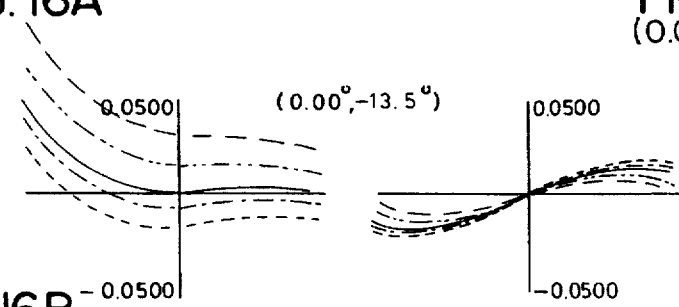
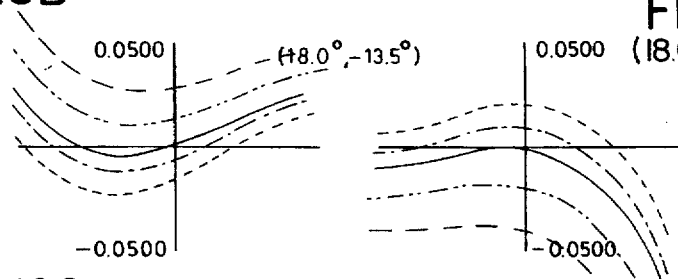
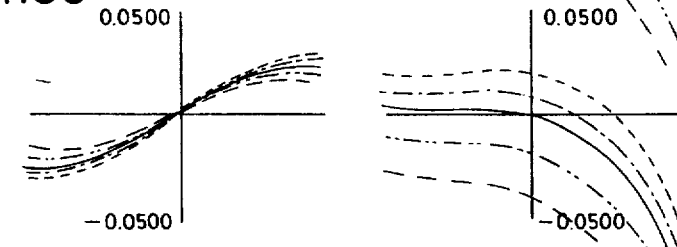
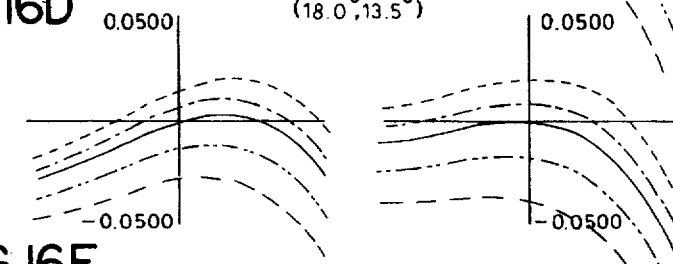
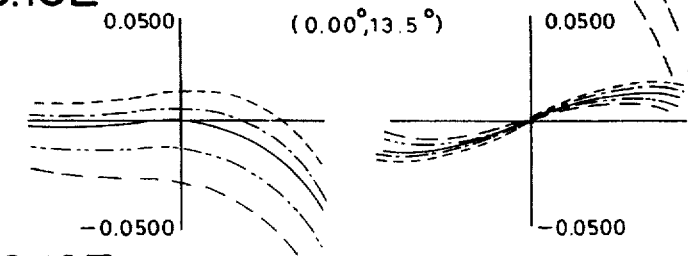
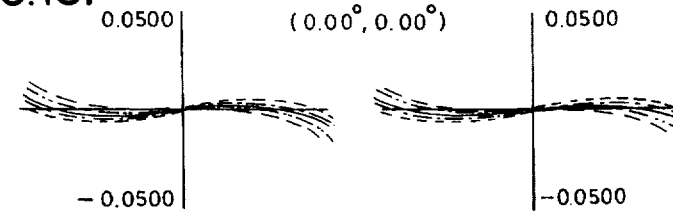

FIG. 17A
(0.00°, −13.5°)
FIG. 17G
(0.00°, −13.5°)
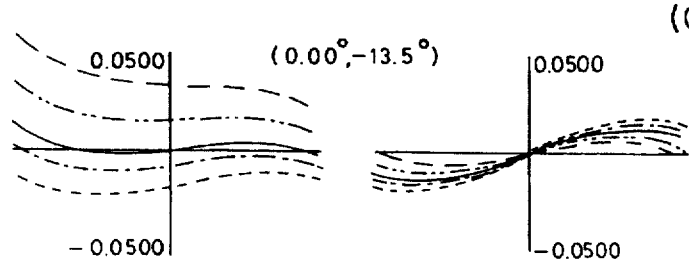
FIG. 17B
(18.0°, −13.5°)
FIG. 17H
(18.0°, −13.5°)
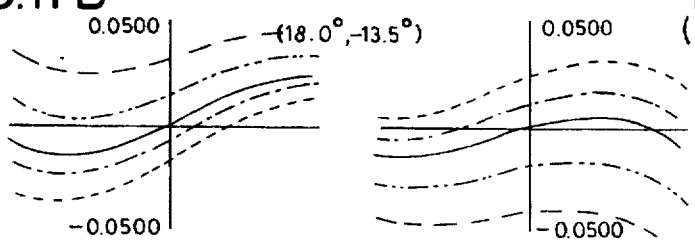
FIG. 17C
(18.0°, 0.00°)
FIG. 17I
(18.0°, 0.00°)
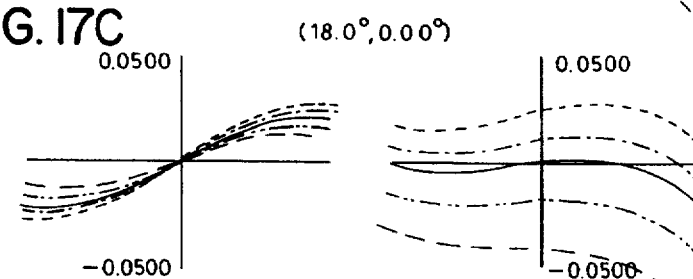
FIG. 17D
(18.0°, 13.5°)
FIG. 17J
(18.0°, 13.5°)
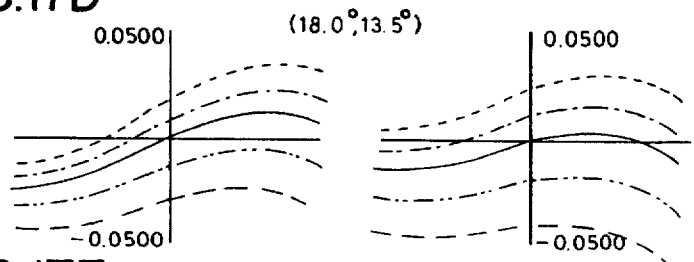
FIG. 17E
(0.00°, 13.5°)
FIG. 17K
(0.00°, 13.5°)
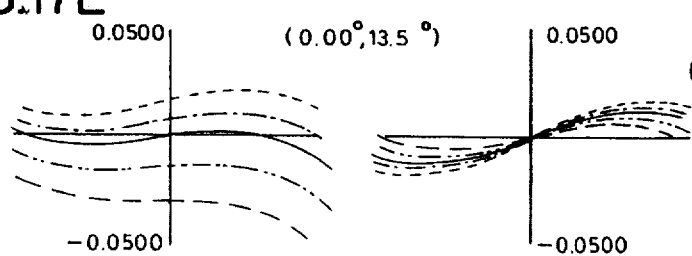
FIG. 17F
(0.00°, 0.00°)
FIG. 17L
(0.00°, 0.00°)
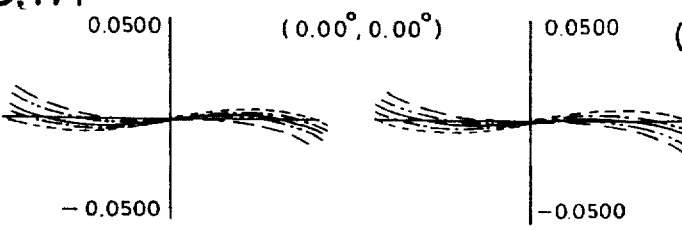

FIG. 18A (0.00°,-19.0°)
FIG. 18G (0.00°,-19.0°)
FIG. 18B (25.0°,-19.0°)
FIG. 18H (25.0°,-19.0°)
FIG. 18C (25.0°,0.00°)
FIG. 18I (25.0°,0.00°)
FIG. 18D (25.0°,19.0°)
FIG. 18J (25.0°,19.0°)
FIG. 18E (0.00°,19.0°)
FIG. 18K (0.00°,19.0°)
FIG. 18F (0.00°,0.00°)
FIG. 18L (0.00°,0.00°)
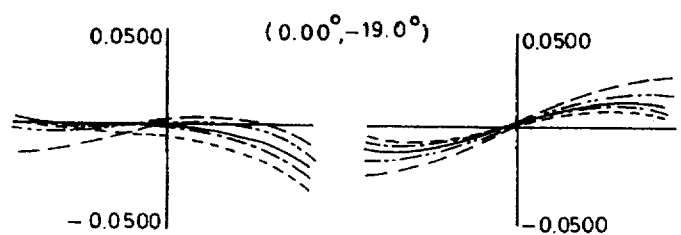
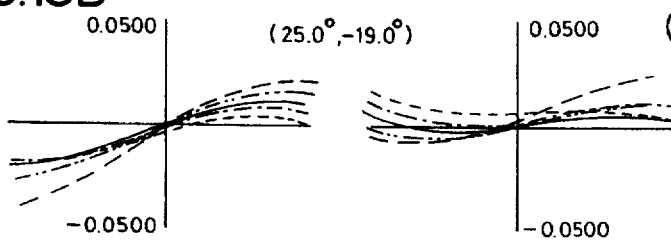
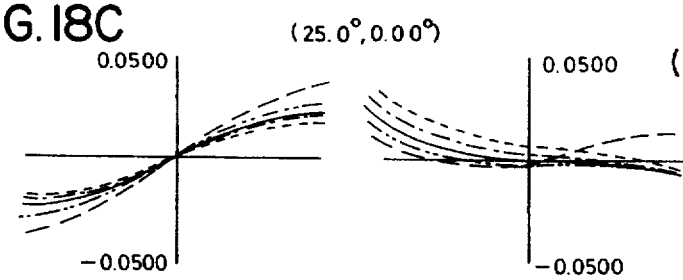
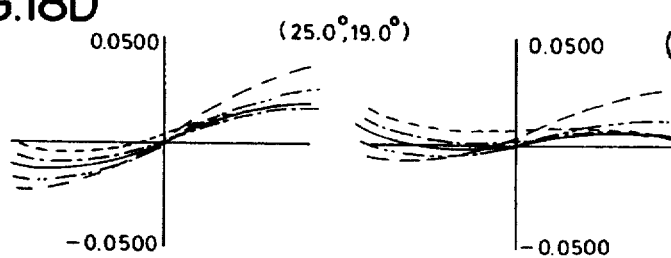
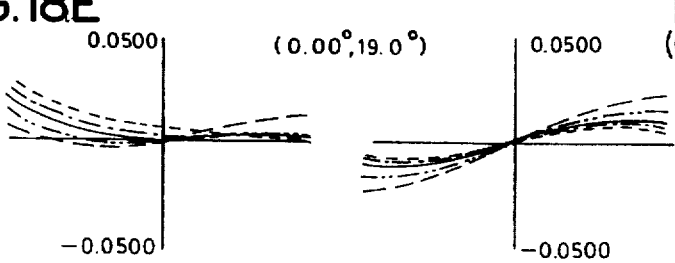
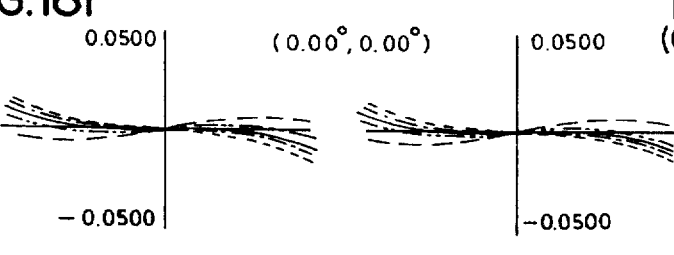

FIG.19A (0.00°,-19.0°)
FIG.19G (0.00°,-19.0°)
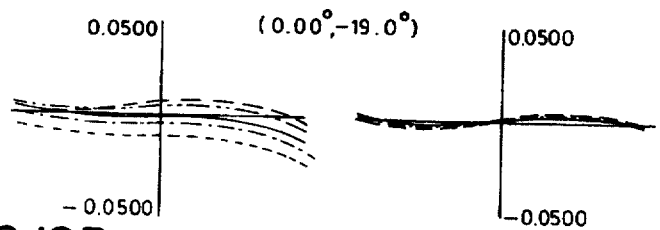
FIG.19B (25.0°,-19.0°)
FIG.19H (25.0°,-19.0°)
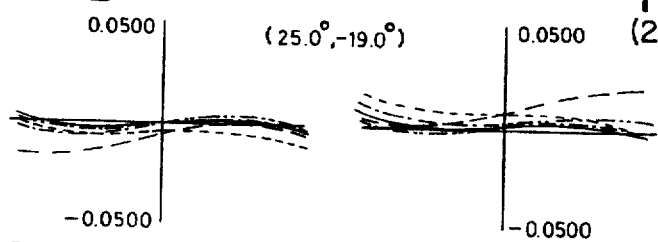
FIG.19C (25.0°,0.00°)
FIG.19I (25.0°,0.00°)
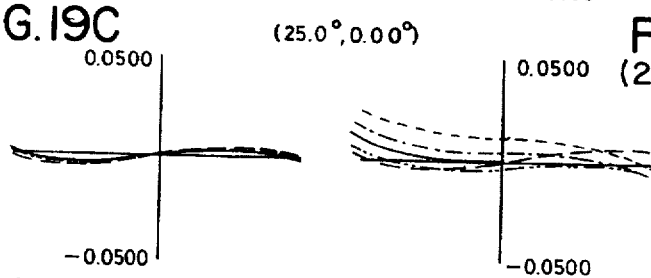
FIG.19D (25.0°,19.0°)
FIG.19J (25.0°,19.0°)
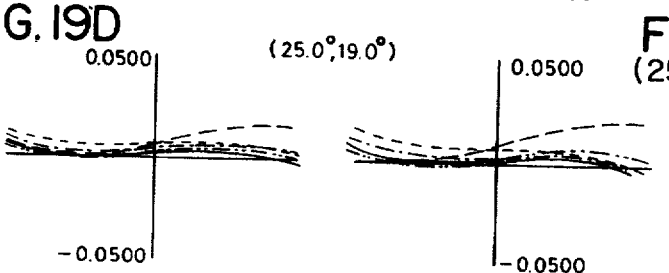
FIG.19E (0.00°,19.0°)
FIG.19K (0.00°,19.0°)
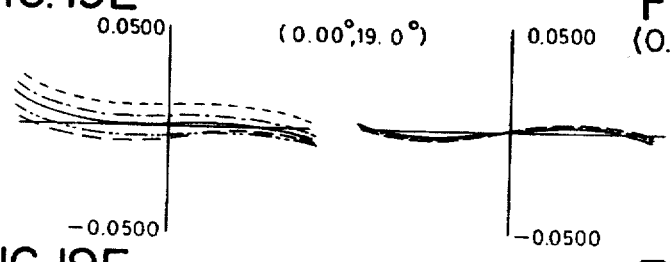
FIG.19F (0.00°,0.00°)
FIG.19L (0.00°,0.00°)
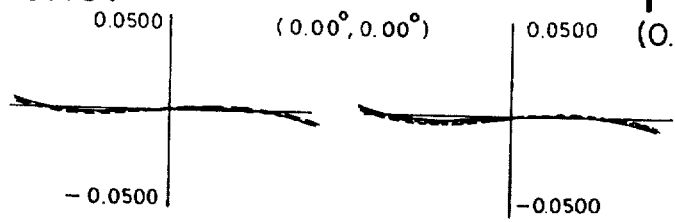

Spherical aberration (mm)

Astigmatism (mm)

Distortion (%)

ω = 15.00°

ω = 15.00°

10.50°

ω = 10.50°

0.000°

ω = 0.000°

FIG. 34A
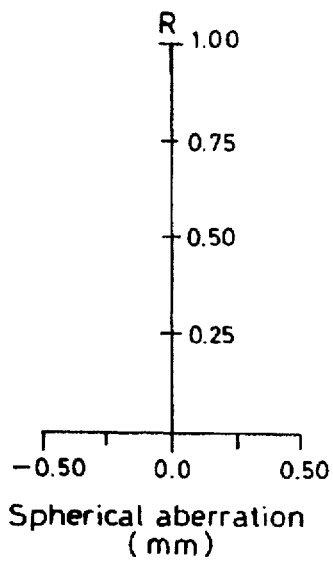
Spherical aberration (mm)
FIG. 34B
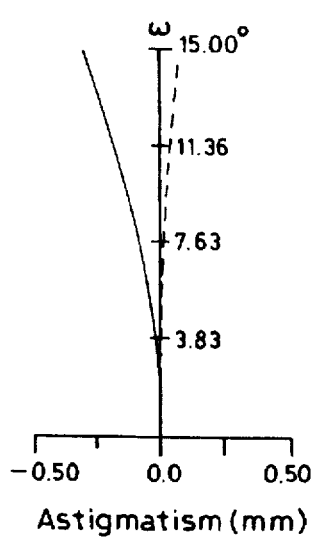
Astigmatism (mm)
FIG. 34C
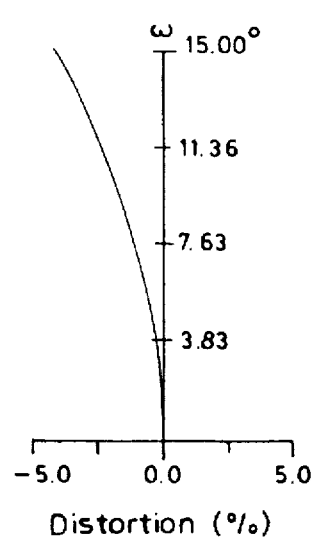
Distortion (%)
FIG. 34D
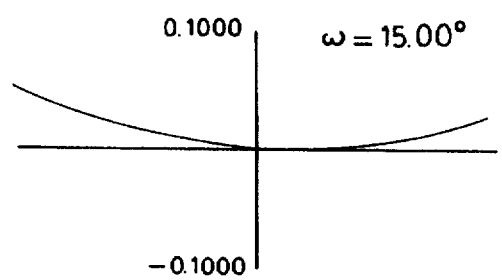
$\omega = 15.00°$
FIG. 34G
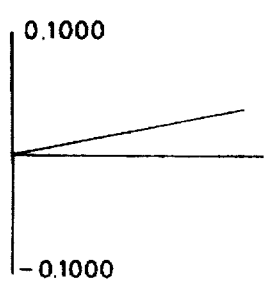
$\omega = 15.00°$
FIG. 34E
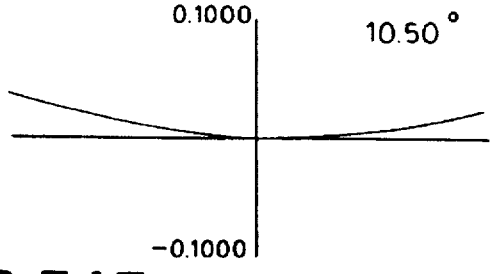
$10.50°$
FIG. 34H
$\omega = 10.50°$
FIG. 34F
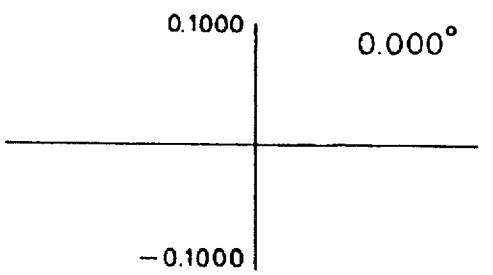
$0.000°$
FIG. 34I
$\omega = 0.000°$ FIG. 35A
FIG. 35B
FIG. 35C
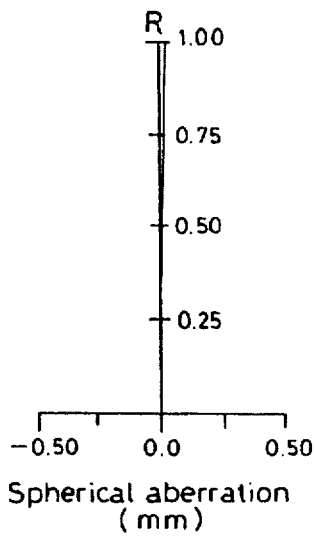
Spherical aberration (mm)
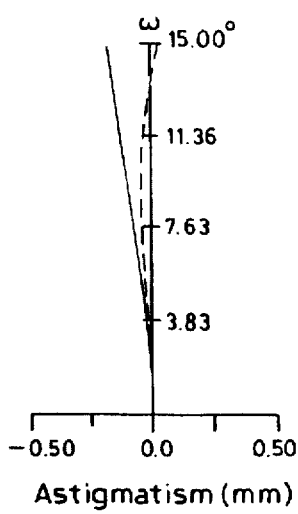
Astigmatism (mm)
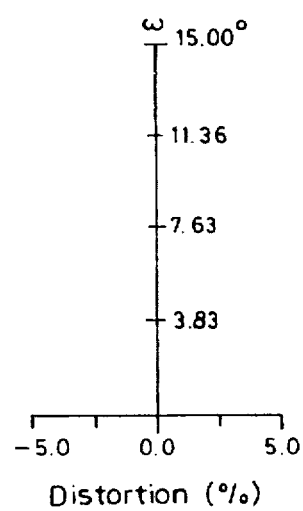
Distortion (%)
FIG. 35D
FIG. 35G
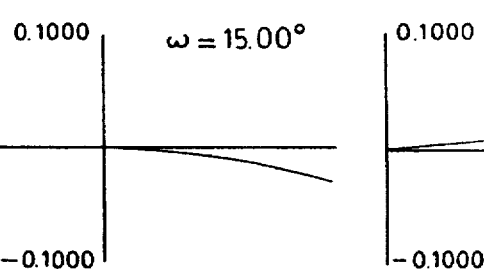
FIG. 35E
FIG. 35H
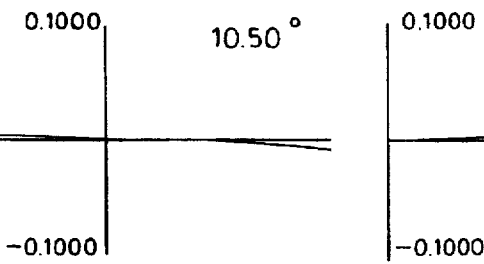
FIG. 35F
FIG. 35I
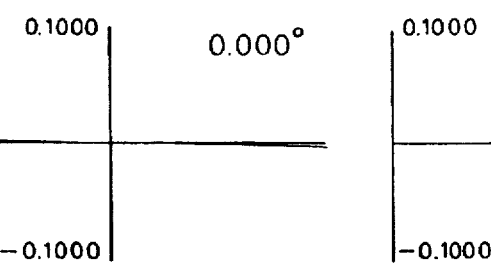

Spherical aberration (mm)

Astigmatism (mm)

Distortion (%)

Spherical aberration (mm)

Astigmatism (mm)

Distortion (%)

ω = 15.00°

ω = 15.00°

10.50°

ω = 10.50°

0.000°

ω = 0.000°

Spherical aberration (mm)

Astigmatism (mm)

Distortion (%)

ω = 15.00°

10.50°

0.000°

ω = 15.00°

ω = 10.50°

ω = 0.000°

Spherical aberration (mm)

Astigmatism (mm)

Distortion (%)

ω = 15.00°

10.50°

0.000°

ω = 15.00°

ω = 10.50°

ω = 0.000°

FIG. 40A
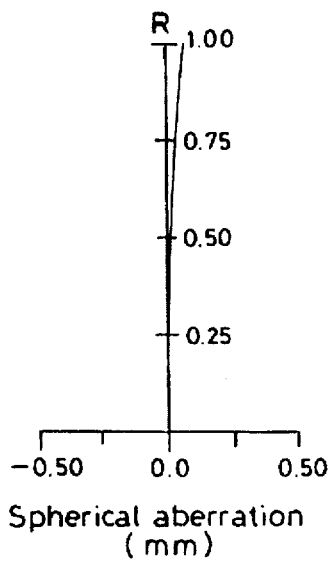
Spherical aberration (mm)
FIG. 40B
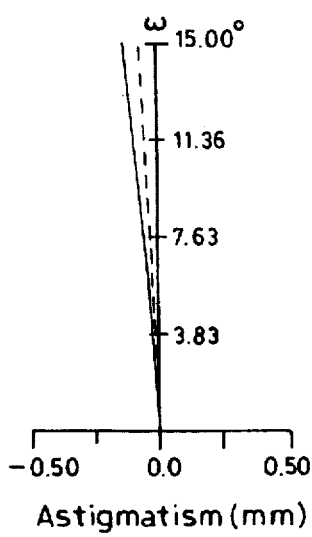
Astigmatism (mm)
FIG. 40C
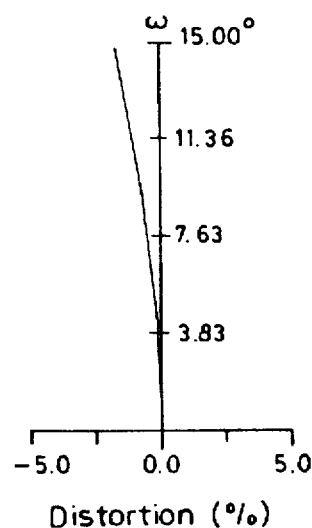
Distortion (%)
FIG. 40D
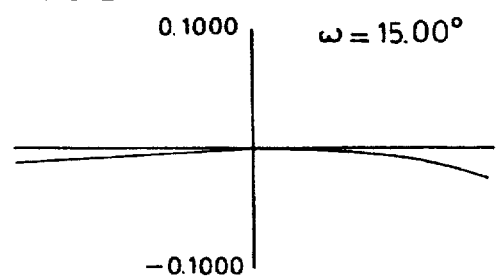
FIG. 40G
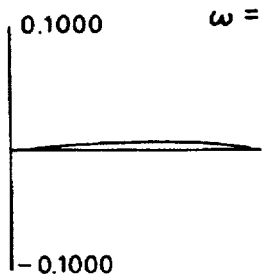
FIG. 40E
FIG. 40H
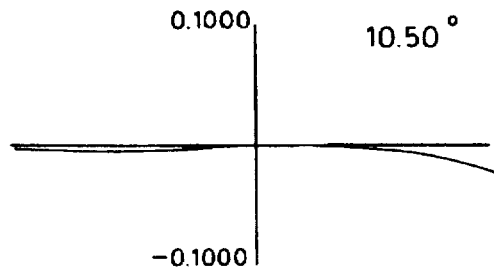
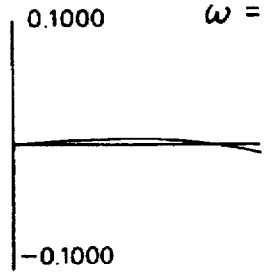
FIG. 40F
FIG. 40I
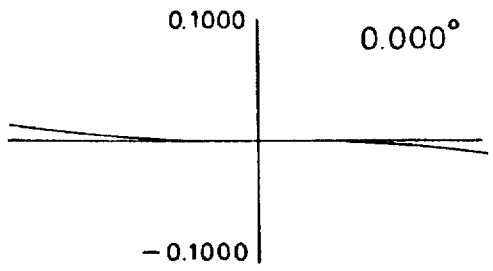
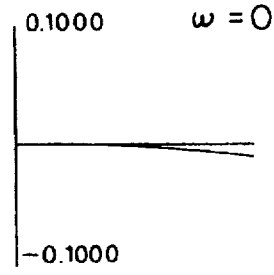

Spherical aberration (mm)

Astigmatism (mm)

Distortion (%)

$\omega = 15.00°$ $\omega = 15.00°$ 10.50°

$\omega = 10.50°$ 0.000°

$\omega = 0.000°$

Spherical aberration (mm)

Astigmatism (mm)

Distortion (%)

ω = 15.00°

ω = 15.00°

10.50°

ω = 10.50°

0.000°

ω = 0.000°

Spherical aberration (mm)

Astigmatism (mm)

Distortion (%)

ω = 15.00°

ω = 15.00°

10.50°

ω = 10.50°

0.000°

ω = 0.000°

Spherical aberration (mm)

Astigmatism (mm)

Distortion (%)

$\omega = 15.00°$ $10.50°$ $0.000°$ $\omega = 15.00°$ $\omega = 10.50°$ $\omega = 0.000°$ Spherical aberration (mm)

Astigmatism (mm)

Distortion (%)

$\omega = 15.00°$ 10.50°

0.000°

$\omega = 15.00°$ $\omega = 10.50°$ $\omega = 0.000°$

IMAGE DISPLAY APPARATUS

BACKGROUND OF THE INVENTION

The present invention relates to an image display apparatus and, more particularly, to an image display apparatus reduced in overall size and weight, such as a head-mounted display apparatus which is retained on the user's head or face to project an image on the user's eyeball.

Helmet- and goggle-type image display apparatuses, which are designed to be retained on the user's head or face and hence called "head-mounted display apparatus" have heretofore been developed for the purpose of enabling the user to enjoy virtual reality or a wide-screen image by oneself.

There is a method of reducing the size of an optical system while maintaining favorable image forming characteristics by turning back the optical path using a half-mirror, as disclosed in Japanese Patent Application Laid-Open (KOKAI) No. 03-191389 (1991). U.S. Pat. No. 4,269,476 also discloses a similar technique.

FIG. 49 shows an optical system as one example of the above-described conventional technique. In the optical system, a half-mirror 2 is obliquely disposed in front of an observer's eye 1, and an image display device 3, e.g., a liquid crystal display device, and a magnifying reflecting mirror 4 are disposed to face each other across the half-mirror 2 and to extend parallel to the observer's line of sight. Let us consider the relationship between the vertical field angle of the optical system and the size of the half-mirror 2. As shown in FIG. 50, a straight line which passes through the center of the observer's pupil E when he or she observes the center of the field of view and which extends in the direction of the observer's line of sight at this time is defined as an x-axis. The point of projection on the x-axis of an end of the half-mirror 2 which is closer to the pupil E is defined as the origin of a coordinate system. Further, a direction, in which the distance from the x-axis to the half-mirror 2 increases as the distance from the pupil E increases within a plane defined by the x-axis and the line normal to the half-mirror 2 at the intersection of the x-axis and the half-mirror 2, is defined as a y-axis.

Assuming that the distance along the x-axis from the pupil E to the point of projection of the pupil-side end of the half-mirror 2 on the x-axis is $d_1$, the length of the half-mirror 2 projected on the x-axis is $d_2$, the diameter of the pupil E is epd, and the vertical field angle (half view angle) is $\theta$, the following relationship holds:

$$epd/2 + (d_1 + d_2)\tan\theta = d_2/2 \times \tan 45° \quad (1)$$

Hence, $$d_2 = (epd/2 + d_1 \tan\theta)/(\tfrac{1}{2} - \tan\theta) \quad (2)$$

where $\tan\theta < \tfrac{1}{2}$.

Since it is preferable to satisfy the conditions of epd$\geq$8 mm and $d_1 \geq 20$ mm, epd=8 mm and $d_1$=20 mm are substituted into Equation (2) as follows:

$$d_2 = (4 + 20\tan\theta)/(\tfrac{1}{2} - \tan\theta) \quad (3)$$

where $\tan\theta < \tfrac{1}{2}$.

Under these conditions, when $\theta=10°$, $d_2$=23.3 mm; when $\theta=15°$, $d_2$=40.3 mm; and when $\theta=20°$, $d_2$=82.9 mm.

It is necessary in order to realize a compact optical system to satisfy the condition of $\theta<15°$. Accordingly, the arrangement shown in FIG. 49 limits the achievement of a wide field angle.

Conventional methods of solving the above-described problem include one in which a beam splitter prism P is used to constitute a half-mirror, as shown in FIG. 51. This method will be explained below with reference to FIG. 52. The relationship between $d_2$ and $\theta$ may be obtained in the same way as the above:

$$epd/2 + d_1\tan\theta + d_2\tan\sin^{-1}\sin\theta/n = d_2/2 \times \tan 45° \quad (4)$$

where n is the refractive index of the prism p.

Hence, $$d_2 = (epd/2 + d_1\tan\theta) / (\tfrac{1}{2} - \tan\sin^{-1}\sin\theta/n) \quad (5)$$

where $\sin\theta < n \cdot \sin \tan^{-1} 1/2 \approx 0.447\, n$.

If epd=8 mm and $d_1$=20 mm are substituted into Equation (5) in the same way as the above, $d_2$ is given by $$d_2 = (4 + 20\tan\theta)/(\tfrac{1}{2} - \tan\sin^{-1}\sin\theta/n) \quad (6)$$

Assuming that n=1.5, when $\theta=10°$, $d_2$=19.6 mm; when $\theta=15°$, $d_2$=28.8 mm; and when $\theta=20°$, $d_2$=42.4 mm. Thus, the optical system becomes compact.

However, when $\theta=20°$, the thickness of the prism P is 42.4 mm. Accordingly, the weight of the optical system increases by using the prism P, although the size of the optical system becomes small, that is, it is not greatly different from the size of an optical system which employs a half-mirror and in which $\theta=15°$. Therefore, it is demanded to make the optical system even more compact in the case of an optical system that uses a prism.

Incidentally, the above-mentioned Japanese Patent Application Laid-Open (KOKAI) No. 03-191389 (1991) discloses an arrangement which includes, as shown in the sectional view of FIG. 53, an image display device 3 for displaying the contents of information, a magnifying reflecting mirror 4 provided to face the image display device 3 so as to project the displayed contents on the observer's eyeball 1 as an enlarged image, and a half-mirror 2 disposed between the image display device 3 and the magnifying reflecting mirror 4, thereby enabling a wide-screen image to be obtained with a small-sized display apparatus. If the half-mirror 2 is provided with a function of transmitting an outside, real world image, light from the outside world also reaches the observer's eyeball 1, as shown by the broken line in the figure. Accordingly, the observer can see both an image displayed on the image display device 3 and an outside, real world image, which are superimposed on one another.

Even if the magnifying reflecting mirror 4 is a semitransparent mirror which is disposed opposite the eyeball, as shown in FIG. 54, advantages similar to those described above can be obtained.

There is also known an arrangement wherein the contents of information displayed on a display device are temporarily formed as an intermediate image by a relay optical system, and this image is projected on the observer's eyeball as an enlarged image by a magnifying reflecting mirror, as disclosed in U.S. Pat. No. 4,269,476.

Incidentally, the optical system of the above-described Japanese Patent Application Laid-Open (KOKAI) No. 03-191389 (1991) is a compact ocular optical system which is comprised of three parts in total, that is, an image display device, a half-mirror, and a surface reflecting mirror having a reflecting mirror directed toward the image display device, which serves as a magnifying reflecting mirror, as shown in FIGS. 53 and 54. However, Petzval sum PS, that is, $$PS = \Sigma(1/nf)$$

which shows the flatness of the image surface, is inevitably smaller than 0, i.e., PS<0, as a whole as long as the above-described arrangement is adopted because n=−1 and f>0 in the case of a surface reflecting mirror. If the field angle is increased to obtain a wide-screen image by using an image display device of certain size, f decreases, and hence PS becomes a negative large value. Accordingly, the optical system of the conventional apparatus has the problem that the flatness of the image surface is impaired to a considerable extent. When the flatness of the image surface is inferior, there is a great difference between the center and edge of an image for observation in the position of an aerial enlarged image presented to the observer in the direction of the optical axis. Accordingly, the eye must have the accommodation function to work considerably, causing much fatigue to the observer's eye. Thus, the optical system is not suitable for a display apparatus. In addition, it becomes impossible to observe an image when projected closer to the eye than the near point of accommodation, which is the limit of the accommodation function of the eye.

As one example, FIGS. 55A–55I graphically show spherical aberration, astigmatism, distortion and coma in a case where the arrangement shown in FIG. 53 is adopted under the conditions that the radius r of curvature of the surface reflecting mirror is 54.3 mm, that is, the focal length f is 27.15 mm, and the field angle is 30°. With regard to the amount of field curvature in this case, the difference between the center and edge of the observation image is equivalent to about 1 diopter. Accordingly, the amount of accommodation of the eye is considerably large. In this case, $PS=1/(-1)\times 27.15=-0.037$.

In contrast to this, the optical system of U.S. Pat. No. 4,269,476 uses a relay optical system to temporarily form a curved intermediate image for the purpose of correcting such field curvature and projects an image of favorable flatness on the eyeball, with the intermediate image used as an object point, by using either a surface reflecting mirror or a reverse reflecting mirror. This optical system suffers, however, from the problem that the overall length of the ocular optical system is long and hence the overall size of the apparatus is large because of the use of a relay optical system. It is important for a head-mounted display apparatus to be small in the overall size with a view to enabling the user to feel comfortable when wearing the display apparatus, as a matter of course.

SUMMARY OF THE INVENTION

The present invention has been made to solve the above-described problems of the background art, and it is a first object of the present invention to provide an image display apparatus, e.g., a head-mounted display apparatus, which uses a half-mirror or a beam splitter prism and yet has an even more compact structure.

It is a second object of the present invention to provide an image display apparatus which uses no relay optical system and which is compact and yet provides a favorably flat image surface, that is, an image display apparatus which uses an ocular optical system having a small overall Petzval sum.

To attain the above-described objects, the present invention provides an image display apparatus having an image display device for displaying an image, a semitransparent reflecting member provided in a direction of propagation of a bundle of rays emitted from the image display device, a magnifying reflecting mirror disposed so that a bundle of rays emerging from the semitransparent reflecting member moves to and from the magnifying reflecting mirror and returns to the semitransparent reflecting member, and an optical member of positive power which is provided on an optical path formed between the image display device and an eye point to which a bundle of rays reflected by the magnifying reflecting mirror is led through the semitransparent reflecting member.

According to one aspect of the present invention, the image display apparatus has an image display device for displaying an image, a semitransparent reflecting member provided in a direction of propagation of a bundle of rays emitted from the image display device, a magnifying reflecting mirror disposed so that a bundle of rays passing through the semitransparent reflecting member moves to and from the magnifying reflecting mirror and returns to the semitransparent reflecting member, and an optical member of positive power which is provided between the image display device and an eye point which a bundle of rays reflected by the magnifying reflecting mirror forms in a direction in which the reflected rays are reflected by the semitransparent reflecting member.

According to another aspect of the present invention, the image display apparatus has an image display device for displaying an image, a semitransparent reflecting member provided in a direction of propagation of a bundle of rays emitted from the image display device, a magnifying reflecting mirror disposed so that a bundle of rays reflected by the semitransparent reflecting member moves to and from the magnifying reflecting mirror and returns to the semitransparent reflecting member, and an optical member of positive power which is provided between the image display device and an eye point which a bundle of rays reflected by the magnifying reflecting mirror forms in a direction in which the reflected rays are transmitted by the semitransparent reflecting member.

In addition, the present invention may be applied to an image display apparatus including a face-mounted unit which has an image display device, a semitransparent reflecting member, and a magnifying reflecting mirror, and a support member for retaining the face-mounted unit on the observer's head.

According to another aspect of the present invention, the above-described semitransparent reflecting member is provided in a direction of propagation of a bundle of rays emitted from the image display device so that an optical path is formed to extend from the image display device to the semitransparent reflecting member. In addition, the magnifying reflecting mirror is disposed so that an optical path for a round-trip travel of a bundle of rays is provided between the semitransparent reflecting member and the magnifying reflecting mirror. The image display apparatus further comprises an optical member of positive power which is provided between the image display device and an eye point that is determined by the image display device, the semitransparent reflecting member and the magnifying reflecting mirror.

In the above-described arrangements, the magnifying reflecting mirror may be a surface reflecting mirror that reflects a bundle of rays at an entrance-side surface thereof. Alternatively, the magnifying reflecting mirror may be a reverse reflecting mirror having a configuration in which a coating surface is provided on an optical member having a refractive index larger than 1 so that a bundle of rays entering the optical member is reflected by the coating surface.

In the case of the surface reflecting mirror, it is preferable to satisfy the following condition:

$$0.5<|n_2\phi_1/\phi_2|<4 \tag{28}$$

where $\phi_1$ is the power of the surface reflecting mirror; $\phi_2$ is the power of the optical member having positive power; and $n_2$ is the refractive index for the spectral d-line of the optical member having positive power.

It is also preferable to satisfy the following condition:

$$1<|n_2\phi_1/\phi_2|<3 \tag{28}'$$

where $\phi_1$ is the power of the surface reflecting mirror; $\phi_2$ is the power of the optical member having positive power; and $n_2$ is the refractive index for the spectral d-line of the optical member having positive power.

The optical member of positive power may be a lens system having positive power.

The optical member of positive power is provided between the image display device and the semitransparent reflecting member, or between the eye point and the semitransparent reflecting member.

Further, it is preferable to satisfy the following condition:

$$2<R/F<3 \tag{29}$$

where R is the radius of curvature of the surface reflecting mirror, and F is the focal length of the entire optical system, exclusive of the image display device.

In the case of the reverse reflecting mirror, it is preferable to satisfy the following condition:

$$|F\phi_3/n_3^2|<1 \tag{30}$$

where $\phi_3$ is the power of the reflecting surface of the reverse reflecting mirror; $n_3$ is the refractive index for the spectral d-line of the medium of the optical member constituting the reverse reflecting mirror; and F is the focal length of the entire optical system, exclusive of the image display device.

It is also preferable to satisfy the following condition:

$$|F\phi_3/n_3^2|<0.6 \tag{30}'$$

where $\phi_3$ is the power of the reflecting surface of the reverse reflecting mirror; $n_3$ is the refractive index for the spectral d-line of the medium of the optical member constituting the reverse reflecting mirror; and F is the focal length of the entire optical system, exclusive of the image display device.

Further, at least one lens having either positive or negative power may be provided between the eye point and the semitransparent reflecting member.

Furthermore, at least one lens having either positive or negative power may be provided between the image display device and the semitransparent reflecting member.

Further, it is preferable to satisfy the following condition:

$$2<R/F<8 \tag{31}$$

where R is the radius of curvature of the reverse reflecting mirror, and F is the focal length of the entire optical system, exclusive of the image display device. Further, in the present invention, the optical member of positive power may be provided between the semitransparent reflecting member and the eye point. The arrangement may be such that the semitransparent reflecting member is formed from a prism having a half-mirror surface, and at least two different kinds of medium are present between the half-mirror surface and the magnifying reflecting mirror, one of the two different kinds of medium constituting the above-described prism. In this case, the optical member of positive power may be a surface of positive power that is provided on an end surface of the prism. The optical member of positive power may be a lens having positive power. The optical member of positive power preferably satisfies the following condition:

$$0.1\phi<\phi_1<0.5 \tag{8}$$

where $\phi_1$ is the power of the optical member having positive power, and $\phi$ is the power of the entire optical system, exclusive of the image display device. The above-described prism preferably satisfies the following condition:

$$v_d>30$$

where $v_d$ is the Abbe's number of the prism for the spectral d-line.

In addition, a lens of negative power may be provided between the prism and the magnifying reflecting mirror.

In this case, the lens of negative power preferably satisfies the following condition:

$$v_d<50$$

where $v_d$ is the Abbe's number of the lens of negative power for the spectral d-line.

Further, a cemented lens of a positive lens and a negative lens may be provided between the prism and the magnifying reflecting mirror.

In this case, the cemented surface of the cemented lens may be formed from a convex surface of the positive lens and a concave surface of the negative lens.

It should be noted that the term "surface reflecting mirror" is herein used to mean a reflecting member the surface of which forms a mirror, as in the case, for example, of a reflecting surface ($r_6$) in Example 7 (see FIG. 21), which will be described later.

The term "reverse reflecting mirror" is herein used to means a reflecting member wherein a mirror surface is coated on an optical member (e.g., glass or plastics) having a refractive index larger than 1, as in the case, for example, of a reflecting surface ($r_5$) in Example 11, which will be described later. In the reverse reflecting mirror, a bundle of rays entering the optical member on the obverse side of the reflecting member is reflected by the mirror surface lying at the reverse side thereof.

The reason for adopting the above-described arrangements and the functions thereof will be explained below.

To attain the first object thereof, the present invention provides an image display apparatus wherein, as shown in FIG. 1, an optical path splitting device S, e.g., a half-mirror, is obliquely disposed in front of an observer's eyeball 1, and an image display device 3, e.g., a liquid crystal display device, and a magnifying reflecting mirror 4 are disposed to face each other across the optical path splitting device S and to extend parallel to the observer's line of sight. In the image display apparatus, at least one surface L having positive refractive power is provided between the eyeball 1 and the optical path splitting device S for the purpose of widening the field angle without increasing the size and weight of the optical system considerably.

As shown, for example, in FIG. 1, the optical path splitting device S is constructed so that it has both transmitting functions and reflecting functions. Thus, light from the image display device 3 is transmitted by the optical path splitting device S to the magnifying reflecting mirror 4, and light from the magnifying reflecting mirror 4 is reflected by the optical path splitting device S toward the observer's eyeball 1.

Let us consider the relationship between the field angle and the size of the optical system from the focal length of the optical system with reference to the ray path diagram of FIG. 3. Since it is preferable to present the observer a virtual image of the image display device at infinity (or a sufficiently far position), the image display device must be disposed at the front focal point of the optical system (or a position near the front focal point and closer to the eyeball than it; the direction away from the eyeball is defined as forward direction).

Assuming that the field angle (half view angle) is e, the focal length of the optical system is $f_O$, and the size of the image display device 3 is h, the following relationship holds:

$$\theta = h/f_O \quad (7)$$

That is, if the size of the image display device 3 is fixed, the field angle $\theta$ is a function of only the focal length $f_O$ of the optical system.

The field angle can be increased by the following two methods:

① The size of the image display device 3 is increased.

② The focal length $f_O$ of the optical system is reduced.

With the method ①, the size of the optical system increases in proportion to the field angle. With the method ②, the spacing between the magnifying reflecting mirror 4 and the image display device 3 decreases (i.e., the front focal length shortens). Further, if the field angle is increased with the distance between the eyeball 1 and the magnifying reflecting mirror 4 fixed, the size er of the bundle of rays increases in proportion to $\tan\theta$, and it is therefore necessary to increase the size of the optical path splitting device S. Accordingly, there may be an interference between the optical path splitting device S and the magnifying reflecting mirror 4 or the image display device 3. Therefore, the reduction of the focal length $f_O$ of the optical system is limited.

To reduce the size er of the bundle of rays in order to minimize the size of the optical path splitting device S, the distance between the eyeball 1 and the magnifying reflecting mirror 4 (or the optical path splitting device S) should be reduced. However, if the above distance is reduced, an interference may occur between a part of the image display device 3 and the eyeball 1 or a part of the observer's face in the vicinity of the eyeball 1. Therefore, there is limitation on the reduction of the distance between the eyeball 1 and the magnifying reflecting mirror 4 (or the optical path splitting device S).

Accordingly, an optical element L having positive refractive power is interposed between the eyeball 1 and the optical path splitting device S, as shown in FIG. 1, for the purpose of increasing the field angle and, at the same time, minimizing the increase in size of the optical path splitting device S. In this case, as shown in the ray path diagram of FIG. 4, the focal length f of the entire optical system is determined by composition of the focal length $f_1$ of the optical element L, which is interposed between the eyeball 1 and the optical path splitting device S, and the focal length $f_2$ of the magnifying reflecting mirror 4. Accordingly, it is possible to reduce the focal length f of the entire optical system while properly maintaining the spacings between the eyeball 1, the optical path splitting device S, the magnifying reflecting mirror 4 and the image display device 3 without increasing the size of the optical system considerably. Thus, it is possible to widen the field angle.

Assuming that the refractive power of the surface or lens L of positive refractive power interposed between the eyeball 1 and the optical path splitting device S is $\phi_1$, and the refractive power of the entire optical system is $\phi$, the refractive power $\phi_1$ is preferably set in the following range:

$$0.1\phi < \phi_1 < 0.5\phi \quad (8)$$

If $\phi_1$ is smaller than the lower limit of the condition (8), that is, if $\phi_1 < 0.1\phi$, the effect of reducing the size of the optical system is undesirably small, whereas, if $\phi_1$ is larger than the upper limit of the condition (8), that is, if $\phi_1 > 0.5\phi$, the aberration correcting effect, which is produced by use of the magnifying reflecting mirror 4, reduces. Therefore, it is preferable for $\phi_1$ to satisfy the condition (8).

A wider field angle may be realized by a method wherein a prism P is used to constitute an optical path splitting device, as shown in the sectional view of FIG. 2. Since the optical system can be made compact by interposing an optical element L of positive refractive power between the eyeball 1 and the optical path splitting device S, it is possible to minimize the increase in weight of the optical system caused by using the prism P as an optical path splitting device.

However, when the beam splitter prism P is employed, the effect of chromatic aberration becomes unignorable in a wide-field angle optical system.

FIG. 5 is a sectional view showing one example of an optical system in which a prism P is used to constitute an optical path splitting device. When rays of light are traced from the eyeball 1 toward the image display device 3 (backward tracing), the light rays travel in the following sequence: the pupil → the lens L of positive refractive power → the beam splitter prism P—the magnifying reflecting mirror 4 → the beam splitter prism P → the end surface of the prism P that faces the image display device 3 → the image display device 3. Assuming that, as shown in FIG. 5, the lens L of positive refractive power and the lens-side end surface of the prism P are defined as a part A, the reflecting mirror-side end surface of the prism P and the magnifying reflecting mirror 4 are defined as a part B, and the end surface of the prism P which faces the image display device 3 is defined as a part C, the ray path can be simplified as follows: the pupil → the part A → the part B → the part C → the image display device 3, which may be expressed by a ray path diagram such as that shown in FIG. 6.

In this case, the space between the pupil and the part A is filled with air, while the space between the parts A and B and the space between the parts B and C are filled with the glass material of the prism P, and the space between the part C and the image display device 3 is filled with air. Assuming that light rays from infinity enter the pupil in this model, a paraxial ray is traced backward from the pupil toward the image display device 3 as follows.

Height of the incident ray ... $h_0 = 1$,
ray inclination ... $\omega_0 = 0$

Height of the ray emerging from the part A ... $h_1$,
ray inclination ... $\omega_1$ Height of the ray emerging from the part B ... $h_2$,
ray inclination ... $\omega_2$ Height of the ray emerging from the part C ... $h_3$,
ray inclination ... $\omega_3$ It is assumed that the refractive power of the part A is $p1(\lambda)$, the refractive power of the part B is $p2(\lambda)$, and the refractive index of the prism glass material is $n(\lambda)$. The refractive powers and index p1, p2 and n are functions of the wavelength $\lambda$. It is also assumed that the distance from the part A to the part B is $d_1$, and the distance from the part B to the part C is $d_2$.

The height $h_3$ and inclination $\omega_3$ of the ray emerging from the part C are given by $$h_3 = 1 - p1(\lambda)d_1/n(\lambda) - \{n(\lambda)p1(\lambda) + n(\lambda)p2(\lambda) - p1(\lambda)p2(\lambda)d_1\}d_2/n(\lambda)^2 \quad (9)$$

$$\omega_3 = p1(\lambda) + p2(\lambda) - [p1(\lambda)p2(\lambda)d_1]/n(\lambda) \quad (10)$$

The conditions in which the optical system has neither chromatic aberration of the focal point nor chromatic aberration of the focal length are as follows:

$$dh_3/d\lambda = 0 \quad (11)$$

$$d\omega_3/d\lambda = 0 \quad (12)$$

To obtain insight, linear approximation of $p1(\lambda)$, $p2(\lambda)$ and $n(\lambda)$ is made as follows:

$$p1(\lambda) = a_0 + a_1 \cdot \lambda \quad (13)$$

$$p2(\lambda) = b_0 \quad (14)$$

$$n(\lambda) = n_0 + n_1 \cdot \lambda \quad (15)$$

Equation (14) is deduced as shown above because the refractive power of the magnifying reflecting mirror 4 has no wavelength dependence and the refractive power of the end surface of the prism P can be ignored in comparison to the refractive power of the magnifying reflecting mirror 4.

If Equations (13) to (15) are substituted into Equation (10) and differentiated with respect to $\lambda$, the following expression is obtained:

$$d\omega_3/d\lambda = a_1 + (a_0 b_0 n_1 \cdot d_1 - a_1 b_0 n_0 \cdot d_1)/(n_0 + n_1 \lambda)^2 \quad (16)$$

It is necessary in order to allow the right-hand side of Equation (16) to be 0 independently of $\lambda$ to satisfy the following condition (17) or (18):

$$a_1 = a_0 = 0 \quad (17)$$

$$a_1 = b_0 = 0 \quad (18)$$

The condition (17) requires that the refractive power of the part A should be 0, which does not meet the purpose of the optical system of the present invention. The condition (18) requires that the part A should be formed from an achromatic lens and the part B should be a plane mirror, which does not meet the purpose of the optical system of the present invention, either.

In other words, if the part B is arranged so that it has no wavelength dependence, it becomes extremely difficult to correct chromatic aberration for the entire optical system.

To solve this problem, it may be considered to impart wavelength dependence to the part B or C. However, in the part C the height of the paraxial ray is low, and the distance from the part C to the image display device 3 is short. Therefore, the achromatic effect for the entire system is small. For this reason, it is preferable to impart an achromatic function to the part B.

Accordingly, the refractive power of the part B is given by $$p2(\lambda) = b_0 + b_1 \cdot \lambda \quad (19)$$

and Equations (13), (15) and (19) are substituted into Equations (9) and (10) and differentiated with respect to $\lambda$ as follows:

$$dh_3/d\lambda = (G_1 + G_2 \lambda)/(n_0 + n_1 \lambda)^3 \quad (20)$$

$$d\omega_3/d\lambda = (G_3 + G_4 \lambda + G_5 \lambda^2)/(n_0 + n_1 \lambda)^2 \quad (21)$$

where $$G_1 = -a_1 n_0^2 d_1 + a_0 b_0 n_1 d_1 - a_1 n_0^2 d_2 - \quad (22)$$
$$b_1 n_0^2 d_2 + a_0 n_0 n_1 d_2 + b_0 n_0 n_1 d_2 +$$
$$a_1 b_0 n_0 d_1 d_2 + a_0 b_1 n_0 d_1 d_2 - 2 a_0 b_0 n_1 d_1 d_2$$

$$G_2 = -a_1 n_0 n_1 d_1 + a_0 n_1^2 d_1 - a_1 n_0 n_1 d_2 - \quad (23)$$
$$b_1 n_0 n_1 n_2 + a_0 n_1^2 d_2 + b_0 n_1^2 d_2 +$$
$$2 a_1 b_1 n_0 d_1 d_2 - a_1 b_0 n_1 d_1 d_2 - a_0 b_1 n_1 d_1 d_2$$

$$G_3 = a_1 n_0^2 + b_1 n_0^2 - a_1 b_0 n_0 d_1 - a_0 b_1 n_0 d_1 + a_0 b_0 n_1 d_1 \quad (24)$$

$$G_4 = 2 a_1 n_0 n_1 + 2 b_1 n_0 n_1 - 2 a_1 b_1 n_0 d_1 \quad (25)$$

$$G_5 = a_1 n_1^2 + b_1 n_1^2 - a_1 b_1 n_1 d_1 \quad (26)$$

The conditions (11) and (12) are satisfied when the following condition is met:

$$G_1 = G_2 = G_3 = G_4 = G_5 = 0 \quad (27)$$

Even if $d_1$ and $d_2$, which represent the size of the prism P, are fixed, since there are a total of six variables, i.e., $a_0$, $a_1$, $b_0$, $b_1$, $n_0$ and $n_1$, there are generally an infinite number of solutions that satisfy the 5 conditions in the expression (27).

In other words, it becomes possible to correct chromatic aberration for the entire optical system by imparting wavelength dependence to the refractive power of the part B.

This will be explained below with reference to FIG. 6. Let us consider two light rays respectively having wavelengths $\lambda_L$ and $\lambda_S$ ($\lambda_L > \lambda_S$), which enter the part A at a ray height of $h_0$ and an inclination $\omega_0 = 0$. If the part A is arranged so that $P1(\lambda_L) < P1(\lambda_S)$, the two rays pass through the part A at respective inclination angles, that is, $\omega_1(\lambda_L) < \omega_1(\lambda_S)$, and in the part B the respective ray heights are given by $h_2(\lambda_L) > h_2(\lambda_S)$.

In this case, by arranging the part B so that $P2(\lambda_L) > P2(\lambda_S)$, the condition of $h_3(\lambda_L) = h_3(\lambda_S)$ can be realized, and there are solutions for $P1(\lambda)$ and $P2(\lambda)$ to satisfy the condition of $\omega_3(\lambda) = \omega_2(\lambda) \cdot n(\lambda) = \text{const}$.

This means that in the part A under-correction of chromatic aberration is performed, whereas in the part B over-correction of chromatic aberration is performed. Conversely, if chromatic aberration correction is sufficiently made in the part A, for example, light rays having different wavelengths separate when entering and passing through the prism P. However, it is exceedingly difficult to correct both the height and inclination of these rays in the part B.

To minimize chromatic aberration throughout the optical system, it is preferable to minimize dispersion caused by the glass material of the prism P used as an optical path splitting device. More specifically, it is preferable to satisfy the following condition:

$$v_d > 30$$

To perform over-correction of chromatic aberration in the part B, since the optical system has positive refractive power as a whole, a lens of negative refractive power which has high dispersive power, more specifically, a lens of negative refractive power that uses a glass material which satisfies the following condition $$v_d < 50$$

is disposed in the vicinity of the magnifying reflecting mirror 4.

An even more effective method is to use a cemented surface formed by a convex surface of a glass material G1($v_{d1}$) and a concave surface of a glass material G2($v_{d2}$), where $vd_1 > vd_2$.

By using such a cemented surface, it is possible to realize an optical system for an image display apparatus which suffers from minimal chromatic aberration and has a wide field angle and a compact structure.

Next, an image display apparatus whereby the second object of the present invention is attained will be explained.

In general, the flatness of an image surface formed by an optical system can be improved by minimization of the Petzval sum of the entire optical system by arranging positive and negative lenses with good balance. By doing so, however, the overall length of the optical system generally increases. Accordingly, in the case of a head-mounted image display apparatus as in the present invention, the ocular optical system increases in size and weight in front of the observer's face and projects long forwardly of the observer's face, so that the weight of the apparatus becomes imbalanced and one-sided forwardly of the observer's face, which is unfavorable for a head-mounted image display apparatus.

The ocular optical system of the image display apparatus according to the present invention has succeeded in minimizing the Petzval sum of the entire optical system while realizing a compact structure.

First, let us consider minimizing a negative Petzval value which is inevitably produced by a reflecting mirror used to project a virtual image on the observer's eyeball as an enlarged image. The negative Petzval value can be reduced by interposing a surface or optical element which produces a positive Petzval value in the optical path so as to cancel the negative Petzval value of the reflecting mirror, and also by reducing the power of the reflecting mirror to reduce the negative Petzval value itself. In other words, since the reflecting mirror has positive power similar to that of a positive lens, if the reflecting mirror shares the positive power with a positive lens added to the optical system, the power of the reflecting mirror decreases, while the focal length increases, and the negative Petzval value decreases.

Accordingly, first, the ocular optical system is formed by using a surface reflecting mirror and at least one lens system having positive refractive power to distribute the power to the two elements so that the negative Petzval value of the surface reflecting mirror is effectively canceled by the positive Petzval value of the lens system having positive refractive power, thereby minimizing the Petzval sum of the entire optical system. Distribution of power is a technique commonly used for aberration correction in an optical system. In the ocular optical system of the present invention, however, it is even more preferable to satisfy the following condition:

$$0.5 < |n_2\phi_1/\phi_2| < 4 \qquad (28)$$

where $\phi_1$ is the power of the surface reflecting mirror, $\phi_2$ is the power of the added lens system of positive refractive power, and $n_2$ is the refractive index for the spectral d-line of the glass material constituting the lens system.

The condition (28) limits the ratio between the positive and negative Petzval values. If $|n_2\phi_1/\phi_2|$ is not larger than 0.5, the positive Petzval value that is produced by the added lens system of positive refractive power becomes excessively large, whereas, if it is not smaller than 4, the negative Petzval value that is produced by the surface reflecting mirror becomes excessively large. In either case, the Petzval sum of the entire optical system cannot satisfactorily be reduced. With a view to minimizing the Petzval sum, it is particularly preferable to satisfy the following condition:

$$1 < |n_2\phi_1/\phi_2| 3 \qquad (28)'$$

By satisfying the above condition, it is possible to provide the observer an image for observation which is superior in resolution as far as the edges thereof.

An optical element having a semitransparent surface is necessary for the layout of the present invention in which the optical axis of the display device is deflected through 90° to the optical axis of the observer's eyeball. Accordingly, it is necessary for the above-described at least one lens system of positive refractive power to be interposed between the display device and the optical element having a semitransparent surface, or between the eyeball and the optical element having a semitransparent surface with a spacing maintained so that the lens system will not interfere with the observer's face.

It is even more preferable to satisfy the following condition:

$$2 < R/F < 3 \qquad (29)$$

where R is the radius of curvature of the surface reflecting mirror, and F is the focal length of the entire ocular optical system.

If the above R/F is not larger than 2, the refractive power of the added lens system of positive refractive power becomes excessively weak, resulting in an increase of inward coma produced by the reflecting mirror. Conversely, if R/F is not smaller than 3, the refractive power of the added lens system of positive refractive power becomes excessively strong, resulting in an increase of outward coma produced by the lens system. In an optical system having a relatively small number of constituent elements as in the case of the ocular optical system of the present invention, it is difficult to correct the above-described coma by other lens system. Therefore, the coma disturbs the off-axis image forming performance considerably.

Next, in the present invention, the ocular optical system is formed by using at least an optical element having a semitransparent surface and a reverse reflecting mirror which is arranged so that n and f in the expression of $PS=\Sigma(1/nf)$ are $n=-$(the refractive index of the reverse reflecting mirror material)$<-1$ and $f>0$ at the reflecting surface of the reverse reflecting mirror, whereby the negative Petzval value at the reflecting surface is made smaller than in the case of the surface reflecting mirror ($n=-1$), thereby minimizing the Petzval sum of the entire system. Further, in the ocular optical system of the present invention, it is even more preferable to satisfy the following condition:

$$|F\phi_3/n_3^2| < 1 \qquad (30)$$

where $\phi_3$ is the power of the reflecting surface of the reverse reflecting mirror, $n_3$ is the refractive index for the spectral d-line of the glass material of the lens constituting the reverse reflecting mirror, and F is the focal length of the entire ocular optical system. The condition (30) limits the ratio between the positive and negative Petzval values If $|F\phi_3/n_3^2|$ is not smaller than 1, the negative Petzval value that is produced by the reflecting surface of the reverse reflecting mirror becomes excessively larger, so that in a compact optical system having the above-described arrangement, the Petzval sum of the entire system cannot satisfactorily be minimized. As a result, large field curvature is produced, imposing a load on the observer and making it impossible to provide a clear image for observation.

With a view to minimizing the Petzval sum, it is particularly preferable to satisfy the following condition:

$$|F\phi_3/n_3^2| < 0.6 \qquad (30)'$$

By satisfying the above condition, it is possible to provide the observer an image for observation which is superior in resolution as far as the edges thereof.

An optical element having a semitransparent surface is necessary for the layout of the present invention in which the optical axis of the display device is deflected through 90° to the optical axis of the observer's eyeball.

With a view to further minimizing the overall Petzval sum, it is even more preferable that either at least one lens system of positive refractive power that produces a positive Petzval value or at least one lens system of negative refractive power that produces a negative Petzval value, which is selected according to the power of the reverse reflecting mirror, should be interposed between the display device and the optical element having a semitransparent surface, or between the eyeball and the optical element having a semitransparent surface with a spacing maintained so that the lens system will not interfere with the observer's face.

It is even more preferable to satisfy the following condition:

$$2 < R/F < 8 \tag{31}$$

where R is the radius of curvature of the reverse reflecting mirror, and F is the focal length of the entire ocular optical system.

If the above R/F is not larger than 2, the refractive power of the added lens system becomes too weak to ensure a predetermined field angle for observation while maintaining the focal length of the entire system, resulting in an increase of inward coma produced by the reflecting mirror. Conversely, if R/F is not smaller than 8, the refractive power of that surface of the lens constituting the reverse reflecting mirror which is opposite to the reflecting surface or the refractive power of the added lens system of positive refractive power becomes excessively strong, resulting in an extremely large difference in the angle of incidence on the refracting surface having increased power between the upper and lower marginal rays of off-axis rays incident on the refracting surface. Thus, outward coma is produced. In either case, it is impossible to correct the coma by other lens system. Therefore, the off-axis image forming performance degrades, and it becomes impossible to obtain an image for observation which is clear as far as the edges of visual field.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 15A–15L graphically show transverse aberration in Example 1 with FIGS. 15A–15F being in the horizontal direction and FIGS. 15G–15L being in the vertical direction.

FIGS. 16A–16L graphically show transverse aberration in Example 2 with FIGS. 16A–16F being in the horizontal direction and FIGS. 16G–16L being in the vertical direction.

FIGS. 17A–17L graphically show transverse aberration in Example 3 with FIGS. 17A–17F being in the horizontal direction and FIGS. 17G–17L being in the vertical direction.

FIGS. 18A–18L graphically show transverse aberration in Example 4 with FIGS. 18A–18F being in the horizontal direction and FIGS. 18G–18L being in the vertical direction.

FIGS. 19A–19L graphically show transverse aberration in Example 5 with FIGS. 19A–19F being in the horizontal direction and FIGS. 19G–19L being in the vertical direction.

FIGS. 20A–20L graphically show transverse aberration in Example 6 with FIGS. 20G–20L being in the vertical direction.

FIGS. 34A–34I graphically show various aberrations in an ocular optical system in Example 8 in a similar manner to FIG. 33 with FIGS. 34D–34F being meridional coma and FIGS. 34G–34I being sagittal coma.

FIGS. 35A–35I graphically show various aberrations in an ocular optical system in Example 9 in a similar manner to FIG. 33 with FIGS. 35D–35F being meridional coma and 35G–35I being sagittal coma.

FIGS. 40 graphically show various aberrations in an ocular optical system in Example 14 in a similar manner to FIG. 33 with FIGS. 40D–40F being meridional coma and FIGS. 40G–40I being sagittal coma.

DESCRIPTION OF THE PREFERRED EMBODIMENTS

Figure 1:
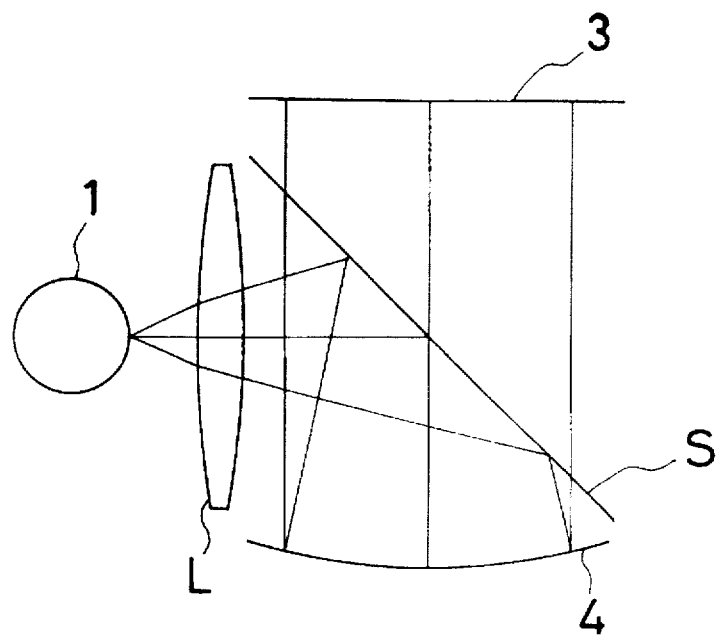
FIG. 1 is a sectional view schematically showing a basic arrangement of the image display apparatus according to the present invention.
Figure 2:
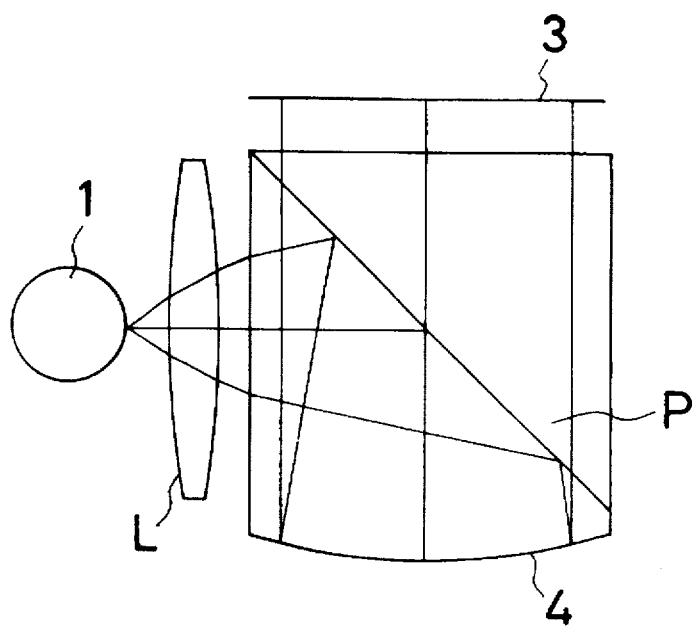
FIG. 2 is a sectional view schematically showing another basic arrangement of the image display apparatus according to the present invention.
Figure 3:
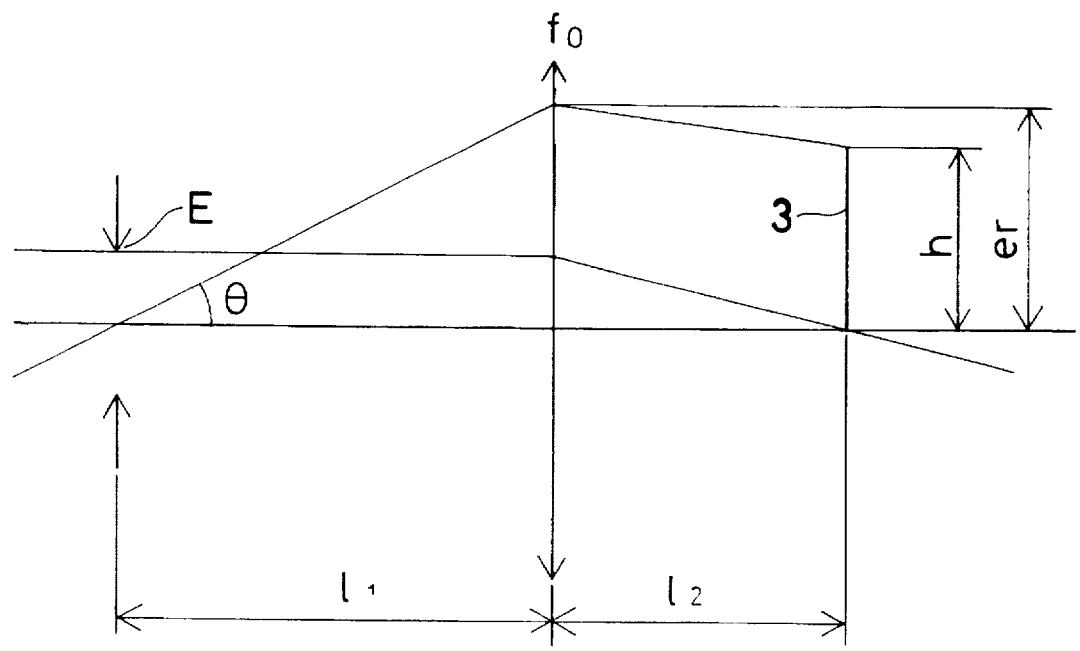
FIG. 3 is a ray path diagram illustrating the relationship between the field angle of the size of an optical system.
Figure 4:
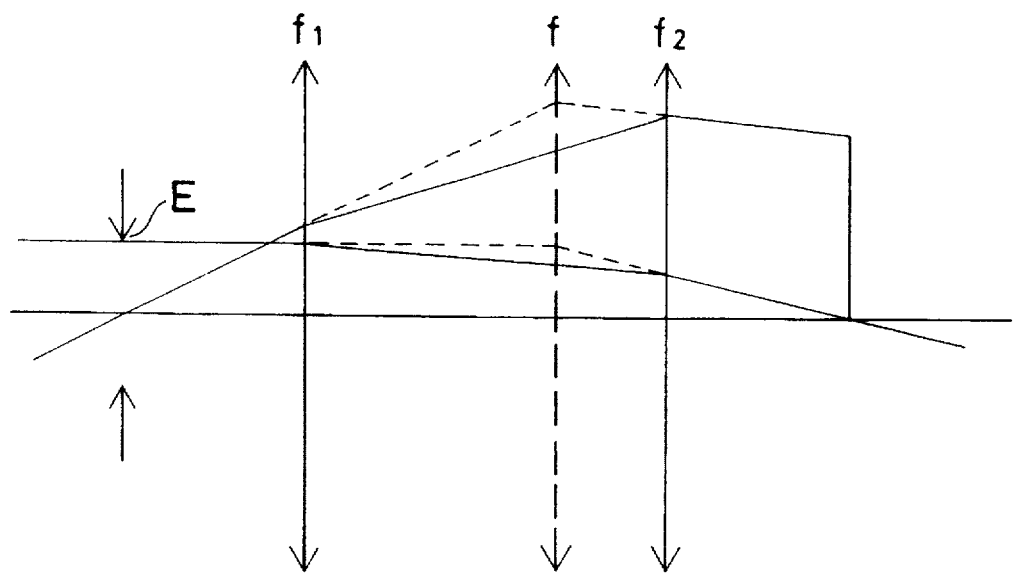
FIG. 4 is an equivalent ray path diagram of the arrangement shown in FIG. 1.
Figure 5:
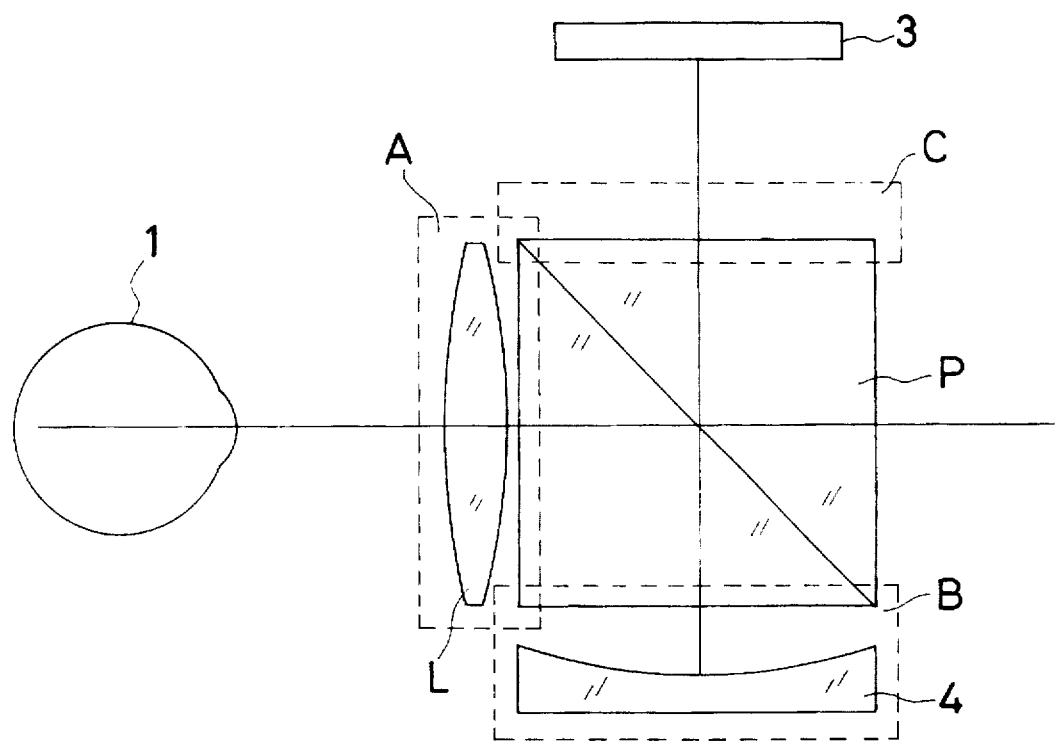
FIG. 5 is a sectional view showing one example of an optical system in which a prism is used to constitute an optical path splitting device.
Figure 6:
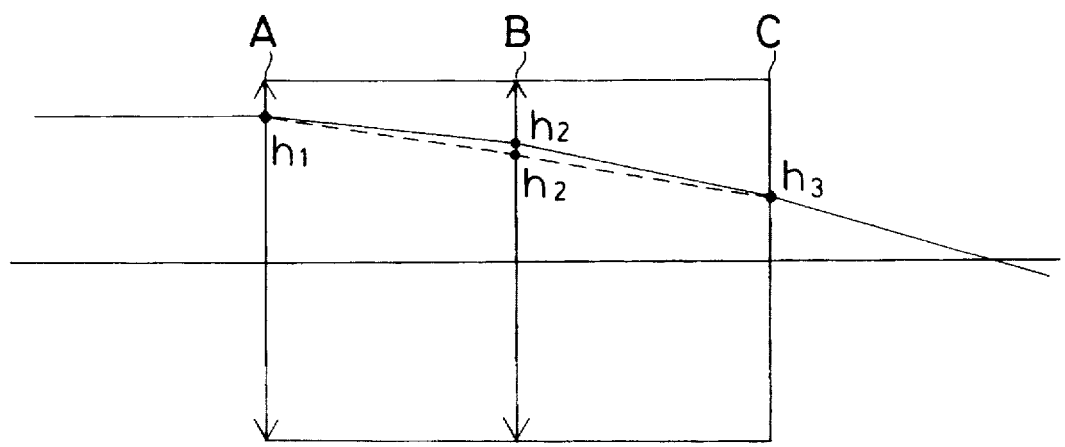
FIG. 6 is an equivalent ray path diagram of the arrangement shown in FIG. 5.
Figure 7:
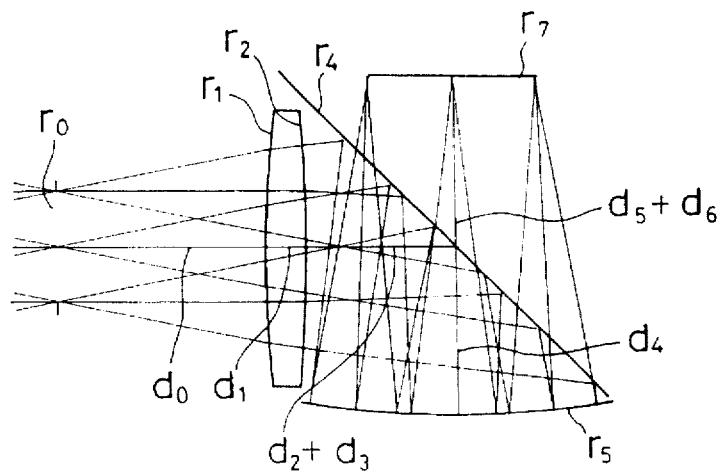
FIG. 7 is a sectional view showing the lens arrangement of Example 1.
Figure 8:
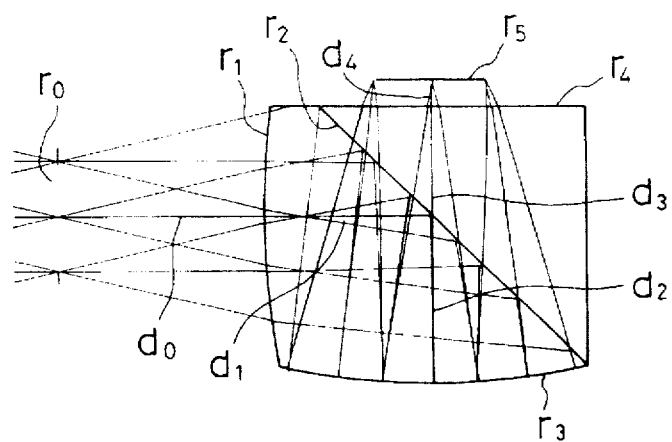
FIG. 8 is a sectional view showing the lens arrangement of Example 2.
Figure 9:
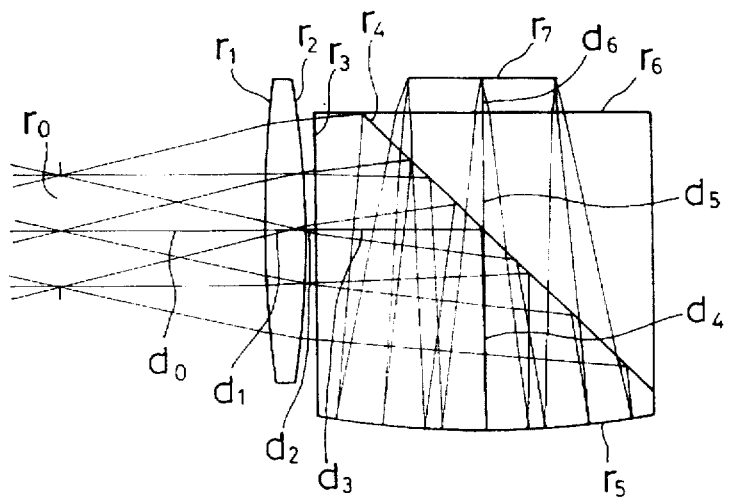
FIG. 9 is a sectional view showing the lens arrangement of Example 3.
Figure 10:
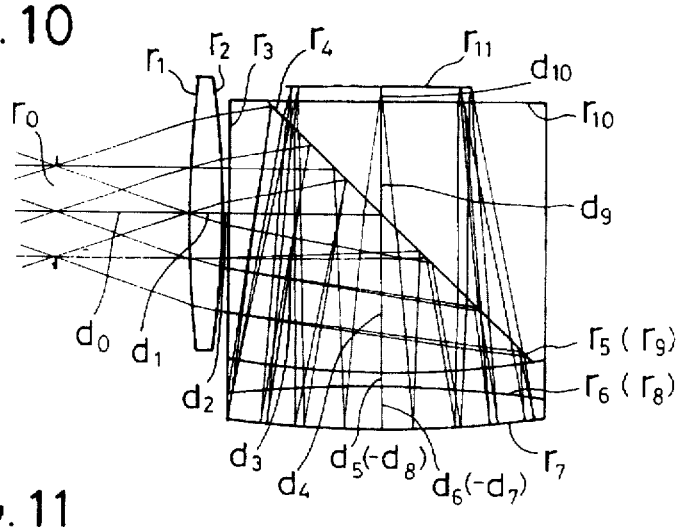
FIG. 10 is a sectional view showing the lens arrangement of Example 4.
Figure 11:
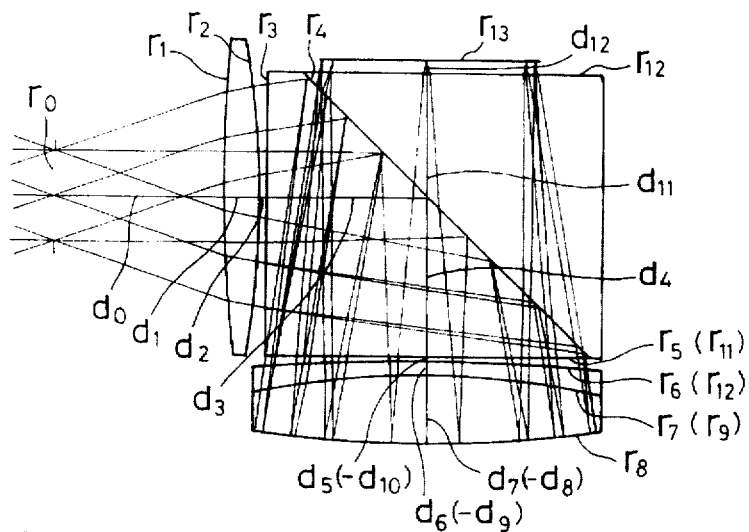
FIG. 11 is a sectional view showing the lens arrangement of Example 5.
Figure 12:
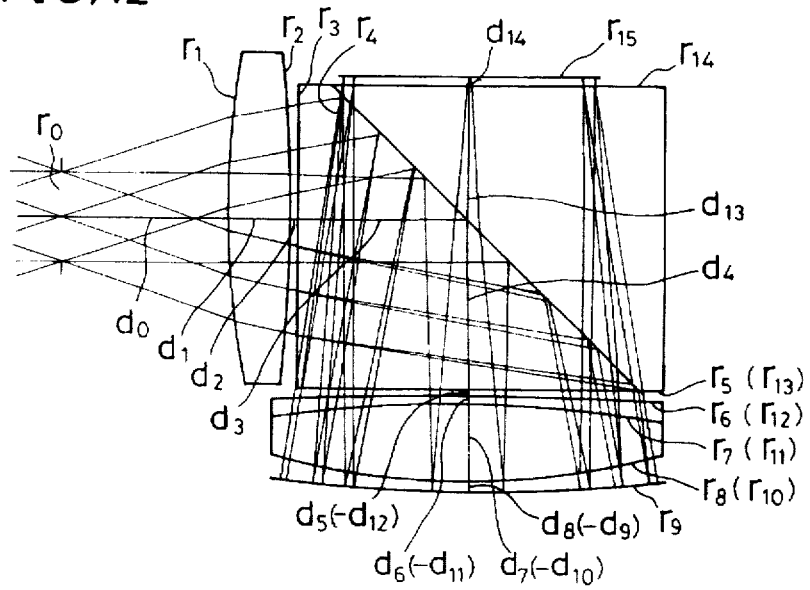
FIG. 12 is a sectional view showing the lens arrangement of Example 6.

First, Examples 1 to 6 of the image display apparatus according to the present invention will be described below with reference to the accompanying drawings. The lens arrangements of Examples 1 to 6 are shown in the sectional views of FIGS. 7 to 12, respectively. Lens data in each Example will be described later. These pieces of data are all shown in the order of backward tracing from the pupil to the image display device. In all Examples, the 0-th surface indicates the pupil position. Symbols $r_0$, $r_1$, $r_2$ . . . are the radii of curvature of lens surfaces including the pupil position and the image surface, $d_0$, $d_1$, $d_2$ . . . are the spacings between adjacent lens surfaces, $nd_1$, $nd_2$ . . . are the refractive indices for the spectral d-line of the lenses including the prism, and $vd_1$, $vd_2$ . . . are the Abbe's numbers of the lenses. Assuming that the direction of the observer's line of sight which passes through the center of the pupil is an x-axis direction, and a direction which intersects the x-axis at right angles and extends perpendicularly to the display surface of the image display device is a y-axis direction, the half-mirror surface is inclined at 45° to the x- and y-axes in each Example. In addition, X or Y is put behind each of the lens surface spacings $d_0$, $d_1$, $d_2$ . . . in the lens data to indicate the direction thereof. It should be noted that the effective pupil diameter at the pupil position is 8 mm in all Examples.

In Example 1, no beam splitter prism is employed, but a biconvex lens having positive refractive power is disposed between the observer's eyeball and the half-mirror. In the lens data (described later), $r_3$ and $r_6$ are imaginary surfaces. FIG. 15A–15L show transverse aberration in the horizontal and vertical directions in Example 1 at various angles to the image field: FIGS. 15F and 15L show aberration values in the direction of the visual axis (0° in the vertical direction and 0° in the horizontal direction); FIGS. 15E and 15K show aberration values at 0° in the vertical direction and 11.3° in the horizontal direction; FIGS. 15D and 15J show aberration values at 15° in the vertical direction and 11.3° in the horizontal direction; FIGS. 15C and 15I show aberration values at 15° in the vertical direction and 0° in the horizontal direction; FIGS. 15B and 15H show aberration values at 15° in the vertical direction and −11.3° in the horizontal direction; and FIGS. 15A and 15G show aberration values at 0° in the vertical direction and −11.3° in the horizontal direction.

In Example 2, a beam splitter prism is used as an optical path splitting device in order to obtain a wider angle of field. A surface of the prism that faces the eyeball is provided with positive power to thereby realize a wider angle of field and a reduction in the overall size of the optical system. FIGS. 16A–16L show transverse aberration in the horizontal and vertical directions in Example 2 at various angles to the image field: FIGS. 15F–16L show aberration values in the direction of the visual axis (0° in the vertical direction and 0° in the horizontal direction); FIGS. 16E and 16K show aberration values at 0° in the vertical direction and 13.5° in the horizontal direction; FIGS. 16D and 16J show aberration values at 18° in the vertical direction and 13.5° in the horizontal direction; FIGS. 16C and 16I show aberration values at 18° in the vertical direction and 0° in the horizontal direction; FIGS. 16B and 16H show aberration values at 18° in the vertical direction and −13.5° in the horizontal direction; and FIGS. 16A and 16G show aberration values at 0° in the vertical direction and −13.5° in the horizontal direction.

In Example 3, a biconvex lens of positive power is provided independently of the prism in place of the surface of positive power that is provided on the eyeball-side surface of the beam splitter prism in Example 2, thereby minimizing aberration. Although in this Example the two surfaces of the biconvex lens are of equal curvature, it should be noted that bending may be effected depending upon the aberration correction condition. FIGS. 17A–17L show transverse aberration in the horizontal and vertical directions in Example 3 at various angles to the image field: FIGS. 17E and 17L show aberration values in the direction of the visual axis (0° in the vertical direction and 0° in the horizontal direction); FIGS. 17F and 17K show aberration values at 0° in the vertical direction and 13.5° in the horizontal direction; FIGS. 17D and 17J show aberration values at 18° in the vertical direction and 13.5° in the horizontal direction; FIGS. 17C and 17I show aberration values at 18° in the vertical direction and 0° in the horizontal direction; FIGS. 17B and 17H show aberration values at 18° in the vertical direction and −13.5° in the horizontal direction; and FIGS. 17A and 17G show aberration values at 0° in the vertical direction and −13.5° in the horizontal direction.

Figure 13:
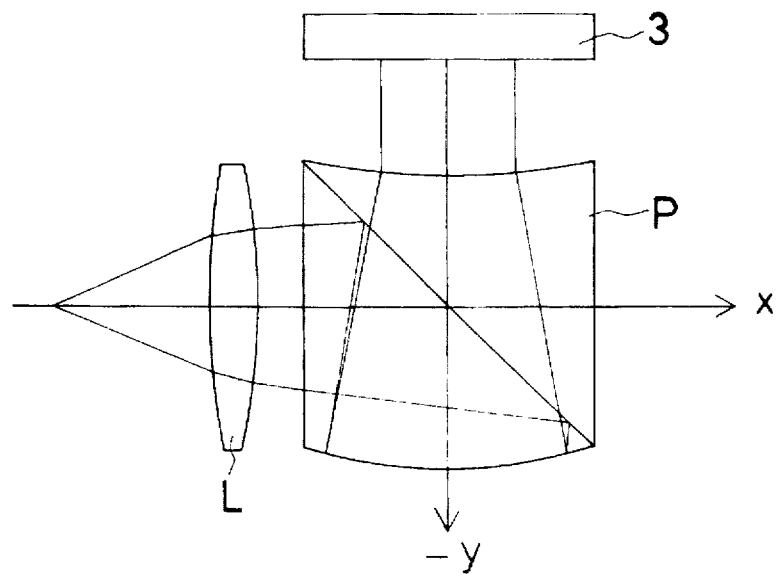
FIG. 13 is a schematic sectional view illustrating a modification.
Figure 14:
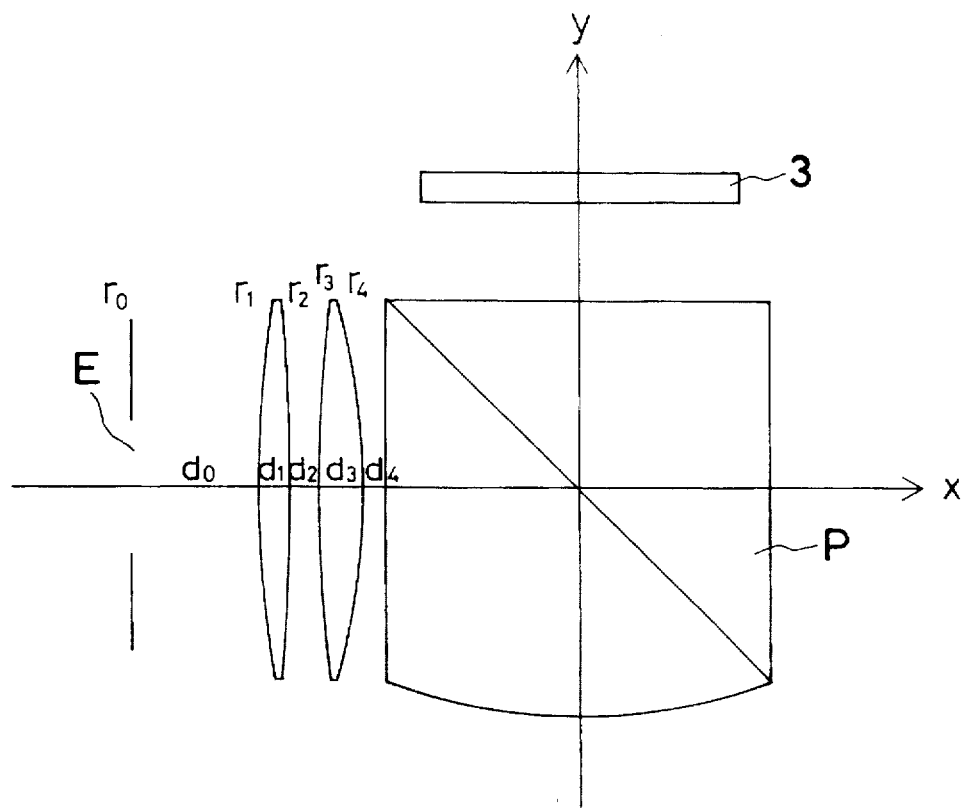
FIG. 14 is a schematic sectional view illustrating another modification.

It should be noted that if the end surface of the beam splitter prism P that faces the display device 3 is formed into a concave surface ($r_6 > 0$) so that the principal ray is incident on the display device 3 at an angle closer to the normal, as shown in FIG. 13, it is possible to minimize the intensity unevenness of the image to be observed. It is also possible to adjust the diopter by moving the display device 3 along the y-axis. The diopter can also be adjusted by dividing the convex lens, which is provided between the pupil E and the prism P, into two lens elements and varying the spacing $d_2$ therebetween, as shown in FIG. 14.

In Example 4, a cemented lens is provided in the vicinity of the magnifying reflecting mirror for correcting chromatic aberration, which gives rise to a problem when the field angle is further widened. FIGS. 18A–18L show transverse aberration in the horizontal and vertical directions in Example 4 at various angles to the image field: FIGS. 18F and 18L show aberration values in the direction of the visual axis (0° in the vertical direction and 0° in the horizontal direction); FIGS. 18E and 18K show aberration values at 0° in the vertical direction and 19° in the horizontal direction; FIGS. 18D and 18J show aberration values at 25° in the vertical direction and 19° in the horizontal direction; FIGS. 18C and 18I show aberration values at 25° in the vertical direction and 0° in the horizontal direction; FIGS. 18B and 18H show aberration values at 25° in the vertical direction and −19° in the horizontal direction; and FIGS. 18A and 18G show aberration values at 0° in the vertical direction and −19° in the horizontal direction.

In Example 5, the beam splitter prism as an optical path splitting device and the magnifying reflecting mirror in Example 4 are separated from each other. FIGS. 19A–19L show transverse aberration in the horizontal and vertical directions in Example 5 at various angles to the image field: FIGS. 19F and 19L show aberration values in the direction of the visual axis (0° in the vertical direction and 0° in the horizontal direction); FIGS. 19E and 19K show aberration values at 0° in the vertical direction and 19° in the horizontal direction; FIGS. 19D and 19J show aberration values at 25° in the vertical direction and 19° in the horizontal direction; FIGS. 19C and 19I show aberration values at 25° in the vertical direction and 0° in the horizontal direction; FIGS. 19B and 19H show aberration values at 25° in the vertical direction and −19° in the horizontal direction; and FIGS. 19A and 19G show aberration values at 0° in the vertical direction and −19° in the horizontal direction.

Figure 20A:
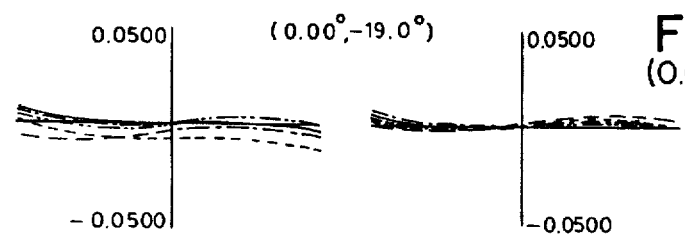
Figure 20B:
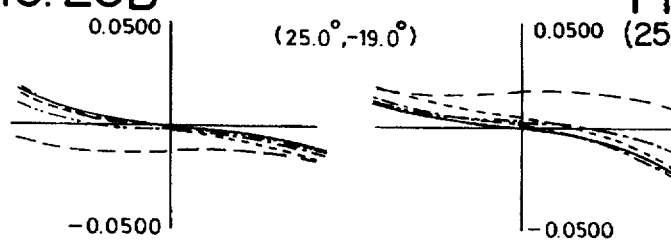
Figure 20C:
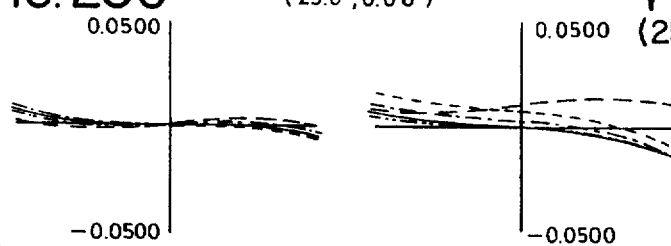
Figure 20D:
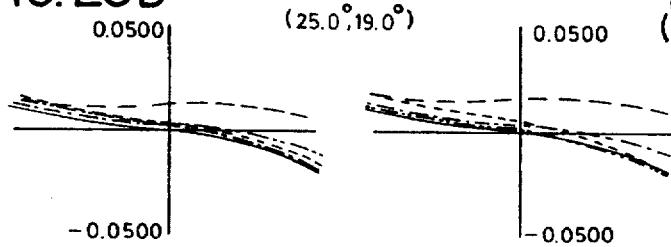
Figure 20E:
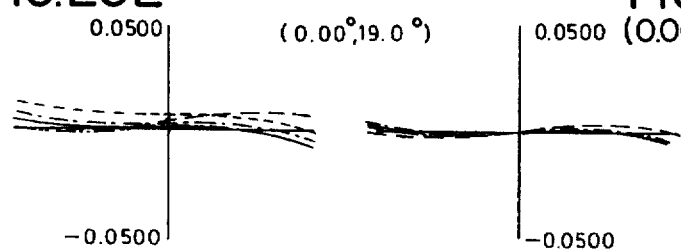
Figure 20F:
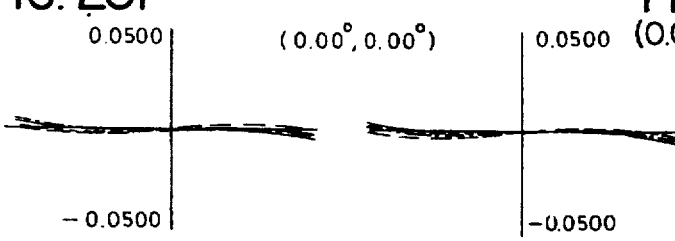
Figure 21:
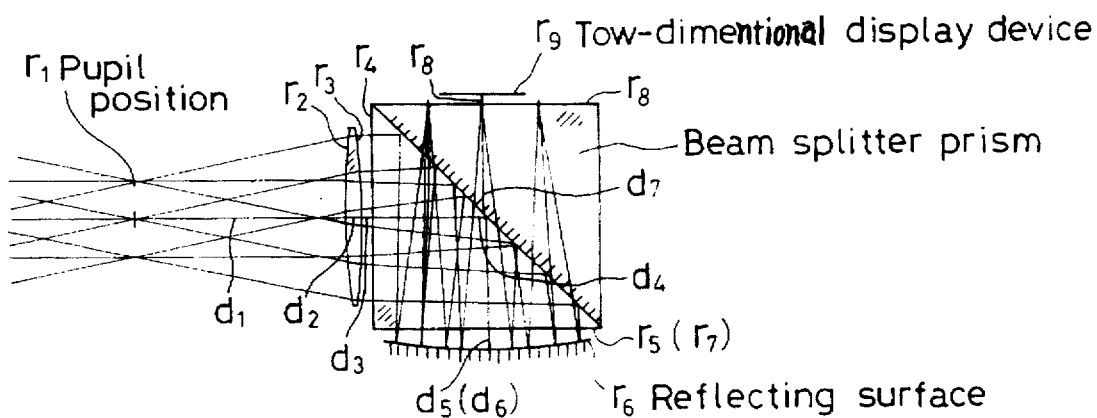
FIG. 21 is a sectional view of Example 7.
Figure 22:
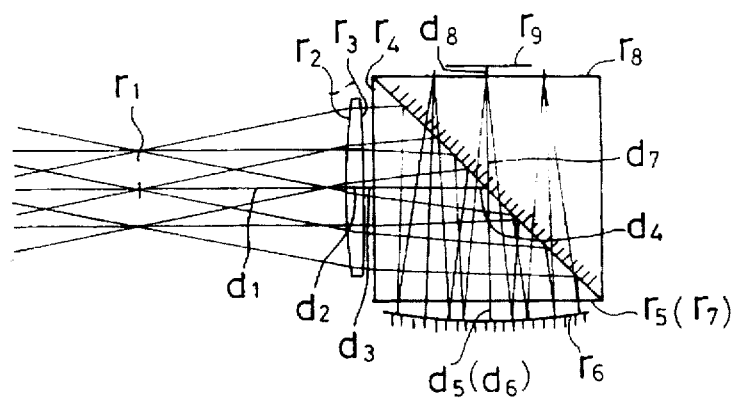
FIG. 22 is a sectional view of Example 8.

In Examples 4 and 5, a reverse reflecting mirror having a convex surface is used as a magnifying reflecting mirror, whereas, in Example 6, a concave mirror is used as a magnifying reflecting mirror. FIGS. 20A–20L show transverse aberration in the horizontal and vertical directions in Example 6 at various angles to the image field: FIGS. 20F and 20L show aberration values in the direction of the visual axis (0° in the vertical direction and 0° in the horizontal direction); FIGS. 20E and 20K show aberration values at 0° in the vertical direction and 19° in the horizontal direction; FIGS. 20D and 20J show aberration values at 25° in the vertical direction and 19° in the horizontal direction; FIGS. 20C and 20I show aberration values at 25° in the vertical direction and 0° in the horizontal direction; FIGS. 20B and 20H show aberration values at 25° in the vertical direction and −19° in the horizontal direction; and FIGS. 20A and 20G show aberration values at 0° in the vertical direction and −19° in the horizontal direction.

Although in the above-described Examples 1 to 6 a spherical mirror is used as a magnifying reflecting mirror, it should be noted that an aspherical mirror may be used in place of the spherical mirror for effectively correcting aberration or distortion. Similar advantageous effect can be obtained by using aspherical surfaces for the end surfaces of the beam splitter prism and the lens surfaces.

Example 1
field angle 30 × 22.5°

$r_0 = \infty$ (pupil)  $d_0 = 15.000$ (X)
$r_1 = 100.000$  $d_1 = 3.000$ (X)  $n_{d1} = 1.48700$  $v_{d1} = 70.4$
$r_2 = -100.000$  $d_2 = 0.500$ (X)
$r_3 = \infty$  $d_3 = 10.000$ (X)
$r_4 = \infty$  $d_4 = -12.000$ (Y)
(semitransparent mirror)
$r_5 = 70.000$  $d_5 = 20.000$ (Y)
(magnifying mirror)
$r_6 = \infty$  $d_6 = 4.238$ (Y)
$r_7 = \infty$ (display device)
$|n_2 \Phi_1 / \Phi_2| = 4.37$
$R/F = 2.22$
$PS = 0.022$ Example 2
field angle 36 × 27°

$r_0 = \infty$ (pupil)  $d_0 = 15.000$ (X)
$r_1 = 60.000$  $d_1 = 12.000$ (X)  $n_{d1} = 1.51633$  $v_{d1} = 64.1$
$r_2 = \infty$  $d_2 = -12.000$ (Y)  $n_{d2} = 1.51633$  $v_{d2} = 64.1$
(semitransparent mirror)
$r_3 = 54.529$  $d_3 = 20.000$ (Y)  $n_{d3} = 1.51633$  $v_{d3} = 64.1$
(magnifying mirror)

-continued

| | | | |
|---|---|---|---|
| $r_4 = \infty$ | $d_4 = 2.000$ (Y) | | |
| $r_5 = \infty$ (display device) | | | |
| $|F\Phi_3/n_3^2| = 0.43$ | | | |
| $R/F = 3.09$ | | | |
| $PS = 0.018$ | | | |

Example 3
field angle 36 × 27°

| | | | |
|---|---|---|---|
| $r_0 = \infty$ (pupil) | $d_0 = 15.000$ (X) | | |
| $r_1 = 67.678$ | $d_1 = 3.000$ (X) | $n_{d1} = 1.48700$ | $v_{d1} = 70.4$ |
| $r_2 = -67.678$ | $d_2 = 0.500$ (X) | | |
| $r_3 = \infty$ | $d_3 = 10.000$ (X) | $n_{d2} = 1.51633$ | $v_{d2} = 64.1$ |
| $r_4 = \infty$ | $d_4 = -11.500$ (Y) | $n_{d3} = 1.51633$ | $v_{d3} = 64.1$ |
| (semitransparent mirror) | | | |
| $r_5 = 58.580$ | $d_5 = 20.000$ (Y) | $n_{d4} = 1.51633$ | $v_{d4} = 64.1$ |
| (magnifying mirror) | | | |
| $r_6 = \infty$ | $d_6 = 1.000$ (Y) | | |
| $r_7 = \infty$ (display device) | | | |
| $|F\Phi_3/n_3^2| = 0.41$ | | | |
| $R/F = 3.19$ | | | |
| $PS = 0.013$ | | | |

Example 4
field angle 50 × 38°

| | | | |
|---|---|---|---|
| $r_0 = \infty$ (pupil) | $d_0 = 12.000$ (X) | | |
| $r_1 = 116.677$ | $d_1 = 3.000$ (X) | $n_{d1} = 1.48700$ | $v_{d1} = 70.4$ |
| $r_2 = -74.689$ | $d_2 = 0.500$ (X) | | |
| $r_3 = \infty$ | $d_3 = 13.000$ (X) | $n_{d2} = 1.65031$ | $v_{d2} = 54.9$ |
| $r_4 = \infty$ | $d_4 = -14.000$ (Y) | $n_{d3} = 1.65031$ | $v_{d3} = 54.9$ |
| (semitransparent mirror) | | | |
| $r_5 = 80.000$ | $d_5 = -1.000$ (Y) | $n_{d4} = 1.70650$ | $v_{d4} = 29.9$ |
| $r_6 = -100.000$ | $d_6 = -4.000$ (Y) | $n_{d5} = 1.74400$ | $v_{d5} = 44.7$ |
| $r_7 = 84.541$ | $d_7 = 4.000$ (Y) | $n_{d6} = 1.74400$ | $v_{d6} = 44.7$ |
| (magnifying mirror) | | | |
| $r_8 = -100.000$ | $d_8 = 1.000$ (Y) | $n_{d7} = 1.70650$ | $v_{d7} = 29.9$ |
| $r_9 = 80.000$ | $d_9 = 24.000$ (Y) | $n_{d8} = 1.65031$ | $v_{d8} = 54.9$ |
| $r_{10} = \infty$ | $d_{10} = 1.000$ (Y) | | |
| $r_{11} = \infty$ (display device) | | | |
| $|F\Phi_3/n_3^2| = 0.32$ | | | |
| $R/F = 3.59$ | | | |
| $PS = 0.007$ | | | |

Example 5
field angle 50 × 38°

| | | | |
|---|---|---|---|
| $r_0 = \infty$ (pupil) | $d_0 = 15.000$ (X) | | |
| $r_1 = 167.873$ | $d_1 = 3.000$ (X) | $n_{d1} = 1.54408$ | $vd_1 = 48.3$ |
| $r_2 = -77.059$ | $d_2 = 0.500$ (X) | | |
| $r_3 = \infty$ | $d_3 = 14.000$ (X) | $n_{d2} = 1.62000$ | $vd_2 = 60.3$ |
| $r_4 = \infty$ | $d_4 = -14.000$ (Y) | $nd_3 = 1.62000$ | $vd_3 = 60.3$ |
| (semitransparent mirror) | | | |
| $r_5 = \infty$ | $d_5 = -0.500$ (Y) | | |
| $r_6 = -164.303$ | $d_6 = -1.000$ (Y) | $n_{d4} = 1.75500$ | $vd_4 = 27.6$ |
| $r_7 = -61.404$ | $d_7 = -6.000$ (Y) | $n_{d5} = 1.60430$ | $vd_5 = 61.1$ |
| $r_8 = 107.760$ | $d_8 = 6.000$ (Y) | $n_{d6} = 1.60430$ | $vd_6 = 61.1$ |
| (magnifying mirror) | | | |
| $r_9 = -61.404$ | $d_9 = 1.000$ (Y) | $n_{d7} = 1.75500$ | $vd_7 = 27.6$ |
| $r_{10} = -164.303$ | $d_{10} = 0.500$ (Y) | | |
| $r_{11} = \infty$ | $d_{11} = 25.000$ (Y) | $n_{d8} = 1.62000$ | $vd_8 = 60.3$ |
| $r_{12} = \infty$ | $d_{12} = 1.000$ (Y) | | |
| $r_{13} = \infty$ (display device) | | | |
| $|F\Phi_3/n_3^2| = 0.32$ | | | |
| $R/F = 3.85$ | | | |
| $PS = 0.001$ | | | |

Example 6
field angle 50 × 38°

| | | | |
|---|---|---|---|
| $r_0 = \infty$ (pupil) | $d_0 = 15.000$ (X) | | |
| $r_1 = 97.558$ | $d_1 = 5.000$ (X) | $n_{d1} = 1.51633$ | $v_{d1} = 64.1$ |
| $r_2 = -172.872$ | $d_2 = 0.500$ (X) | | |
| $r_3 = \infty$ | $d_3 = 15.000$ (X) | $n_{d2} = 1.51633$ | $v_{d2} = 64.1$ |
| $r_4 = \infty$ | $d_4 = -15.000$ (Y) | $n_{d3} = 1.51633$ | $v_{d3} = 64.1$ |
| (semitransparent mirror) | | | |
| $r_5 = \infty$ | $d_5 = -0.500$ (Y) | | |
| $r_6 = -287.732$ | $d_6 = -0.480$ (Y) | $n_{d4} = 1.80518$ | $v_{d4} = 25.4$ |
| $r_7 = -95.395$ | $d_7 = -6.925$ (Y) | $n_{d5} = 1.51633$ | $v_{d5} = 64.1$ |
| $r_8 = 73.148$ | $d_8 = -1.000$ (Y) | | |
| $r_9 = 123.967$ | $d_9 = 1.000$ (Y) | | |
| (magnifying mirror) | | | |
| $r_{10} = 73.148$ | $d_{10} = 6.925$ (Y) | $n_{d6} = 1.51633$ | $v_{d6}$ −64.1 |
| $r_{11} = -95.395$ | $d_{11} = 0.480$ (Y) | $n_{d7} = 1.80518$ | $v_{d7} = 25.4$ |

-continued $r_{12} = -287.732$    $d_{12} = 0.500$ (Y)
$r_{13} = \infty$    $d_{13} = 27.000$ (Y)    $n_{d8} = 1.51633$    $v_{d8} = 64.1$
$r_{14} = \infty$    $d_{14} = 0.659$ (Y)
$r_{15} = \infty$ (display device)
$|n_2 \Phi_1/\Phi_2| = 2.96$
$R/F = 3.81$
$PS = 0$ Next, other Examples 7 to 18 of the image display apparatus according to the present invention will be explained.

In all the following Examples 7 to 18, the image display device is a two-dimensional display device in which the length of the long sides is 14.55 mm (the diagonal length: 18.36 mm), and the observation field angle corresponding to the display device is 30°. However, it will be apparent that the field angle is not necessarily limited to this value and that it is possible to obtain an observation field angle corresponding to the size of each particular two-dimensional display device used by multiplying the entire arrangement by a coefficient.

Although in all the following Examples 7 to 18 a cube beam splitter prism is used as an optical element having a semitransparent surface, it should be noted that the optical element is not necessarily limited to the cube beam splitter prism and that the optical system can readily be formed by using a half-mirror or the like.

FIGS. 21 to 32 are sectional views of Examples 7 to 18, respectively, taken along the direction of the short sides of the two-dimensional display device.

Lens data in each Example will be described later. Each data is obtained by backward tracing from the observer's eyeball to the two-dimensional display device. In actual use, the two-dimensional display device is disposed at the position of the image surface.

In the following Examples 7 to 10, the optical system is formed from a surface reflecting mirror of the present invention and at least one lens system having positive refractive power. That is, both Examples 7 and 8 shown in FIGS. 21 and 22 use a concave surface reflecting mirror. In these Examples, a biconvex positive lens that produces a positive Petzval value is disposed between the pupil position and the semitransparent reflecting mirror, thereby minimizing the overall Petzval sum, and thus obtaining an image surface of good flatness. FIGS. 33A–33I and 34A–34I graphically show spherical aberration, astigmatism, distortion and coma in Examples 7 and 8. In these figures, spherical aberration is represented by the pupil ratio R, and astigmatism, distortion and coma are represented by the field angle ω.

Figure 23:
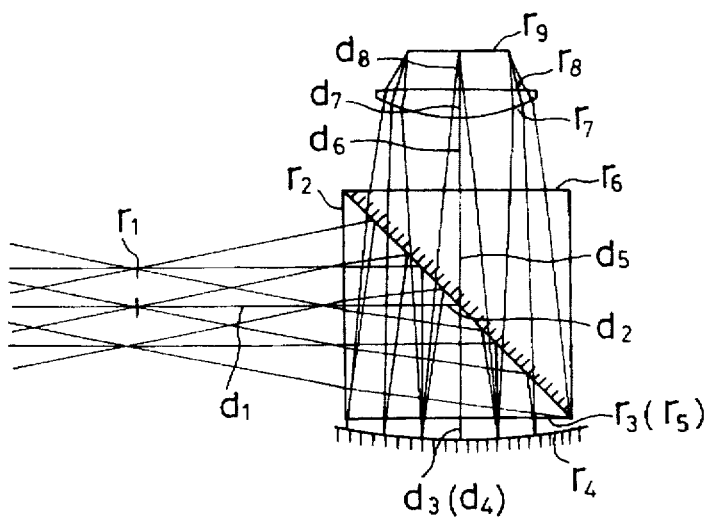
FIG. 23 is a sectional view of Example 9.
Figure 24:
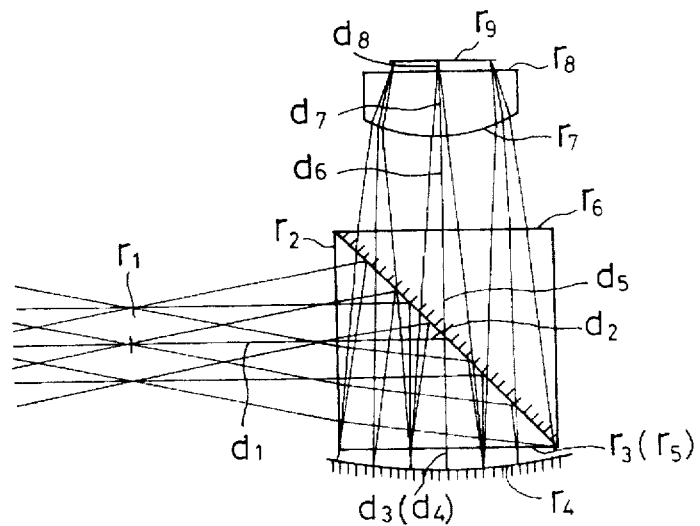
FIG. 24 is a sectional view of Example 10.
Figure 25:
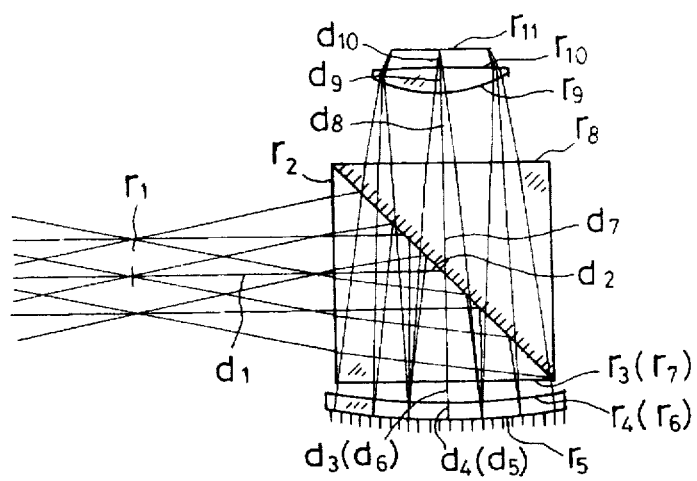
FIG. 25 is a sectional view of Example 11.

Both Examples 9 and 10 shown in FIGS. 23 and 24 use a concave surface reflecting mirror. In this case, a biconvex positive lens that produces a positive Petzval value is disposed between the semitransparent reflecting mirror and the two-dimensional display device, thereby minimizing the overall Petzval sum, and thus obtaining an image surface of good flatness. FIGS. 35A–35I and 36A–36I graphically show various aberrations in Examples 9 and 10, respectively, in a similar manner to FIG. 33.

In Examples 11 to 18, the optical system is formed from at least an optical element having a semitransparent surface, and a reverse reflecting mirror according to the present invention. That is, Example 11 shown in FIG. 25 uses a meniscus positive lens for the reverse reflecting mirror. Although the overall Petzval sum in this Example is small, it is further reduced by additionally disposing a biconvex positive lens between the semitransparent mirror and the two-dimensional display device. In this case, if the positive lens is disposed closer to the image surface away from the pupil, the Petzval sum can be further reduced without producing coma or astigmatism. FIG. 37A–37I graphically shows various aberrations in Example 11 in a similar manner to FIG. 33.

Figure 26:
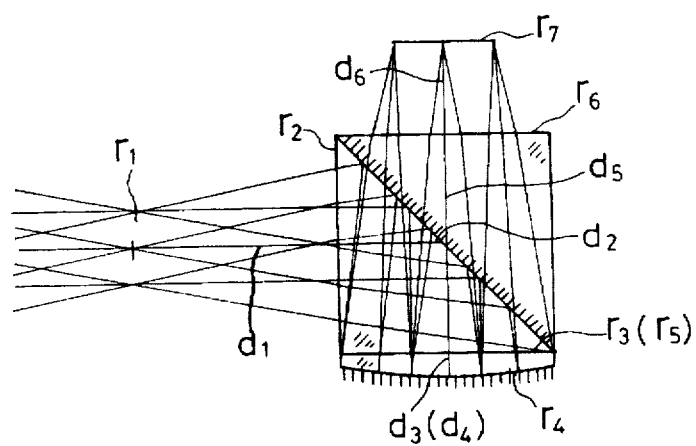
FIG. 26 is a sectional view of Example 12.

Example 12 shown in FIG. 26 uses a plano-convex lens for the reverse reflecting mirror. Although the beam splitter prism and the plano-convex lens may be cemented together as in this Example, it is also possible to form one surface of the beam splitter prism into a reflecting curved surface. By doing so, the number of parts required can be reduced. Since the lens of the reverse reflecting mirror is a plano-convex lens, no astigmatism is produced at the plane side, which is opposite to the reflecting surface. FIG. 38A–38I graphically show various aberrations in Example 12 in a similar manner to FIG. 33.

Figure 27:
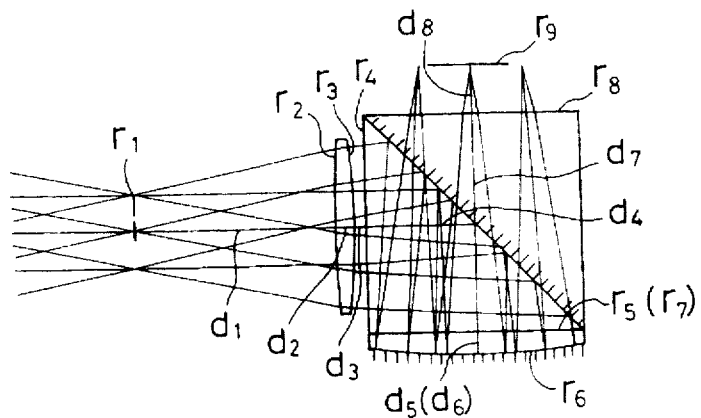
FIG. 27 is a sectional view of Example 13.

Example 13 shown in FIG. 27 uses a plano-convex lens for the reverse reflecting mirror. Although the beam splitter prism and the plano-convex lens may be cemented together as in this example, it is also possible to form one surface of the beam splitter prism into a reflecting curved surface, in the same way as in Example 12. By doing so, the number of parts required can be reduced. In this Example, a biconvex positive lens is additionally provided on the pupil-side of the beam splitter prism so as to produce a positive Petzval value, thereby further reducing the Petzval sum. By varying the power of the positive lens or moving it in the direction of the optical axis, the diopter can be adjusted to the observer's diopter. FIG. 39A–39I graphically show various aberrations in Example 13 in a similar manner to FIG. 33.

Figure 28:
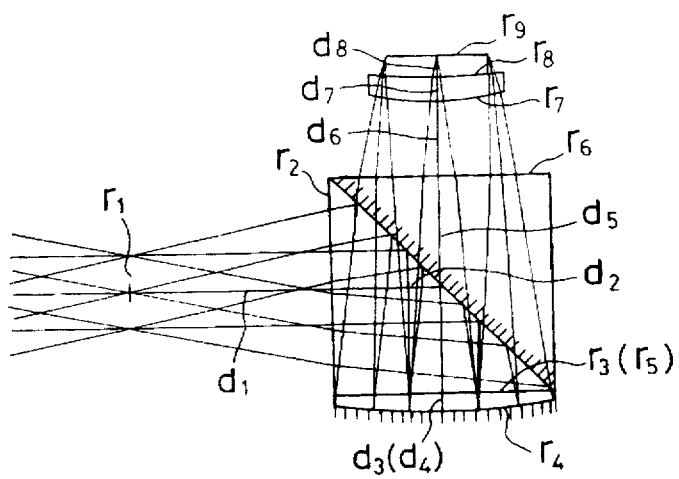
FIG. 28 is a sectional view of Example 14.

Example 14 shown in FIG. 28 uses a plano-convex lens for the reverse reflecting mirror. Although the beam splitter prism and the plano-convex lens may be cemented together as in this example, it is also possible to form one surface of the beam splitter prism into a reflecting curved surface, in the same way as in Example 12. By doing so, the number of parts required can be reduced. In this Example, a meniscus positive lens having a convex surface directed toward the beam splitter prism is additionally provided on the display device-side of the beam splitter prism so as to produce a positive Petzval value, thereby further reducing the Petzval sum. With this arrangement, the distance between the eye point and the apparatus can be increased in comparison to Example 13. FIG. 40A–40I graphically show various aberrations in Example 14 in a similar manner to FIG. 33.

Figure 29:
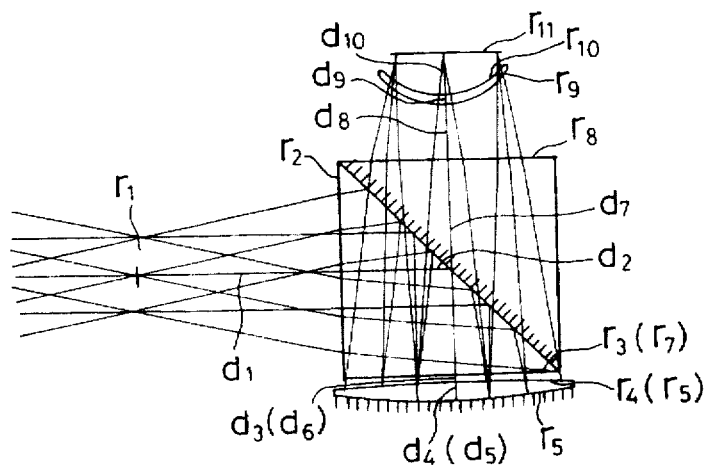
FIG. 29 is a sectional view of Example 15.

Example 15 shown in FIG. 29 uses a biconvex lens for the reverse reflecting mirror and hence has a small overall Petzval sum. However, astigmatism is produced by the surface of the biconvex lens that is opposite to the reflecting surface. Therefore, a meniscus negative lens of relatively small power having a convex surface directed toward the beam splitter prism is disposed in the vicinity of the two-dimensional display device, thereby correcting the astigmatism without impairing the Petzval sum. FIG. 41A–41I graphically show various aberrations in Example 15 in a similar manner to FIG. 33.

Figure 30:
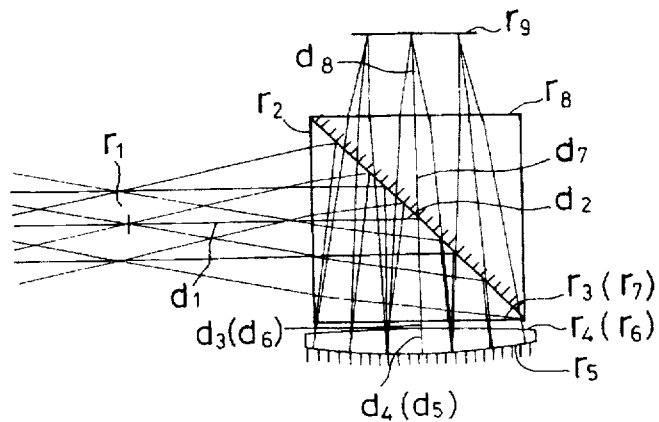
FIG. 30 is a sectional view of Example 16.

Example 16 shown in FIG. 30 uses a biconvex lens for the reverse reflecting mirror and hence has a small overall Petzval sum. However, astigmatism is produced by the surface of the biconvex lens that is opposite to the reflecting surface. Therefore, this surface of the biconvex lens is formed into an aspherical surface to thereby correct the astigmatism. This aspherical surface has such a configuration that the radius of curvature increases as the distance from the optical axis of the lens increases toward the peripheries thereof. Thus, the aspherical surface causes the meridional image surface to bend toward the lens at a position where the image height is high. FIG. 42A–42I graphically show various aberrations in Example 16 in a similar manner to FIG. 33.

Figure 31:
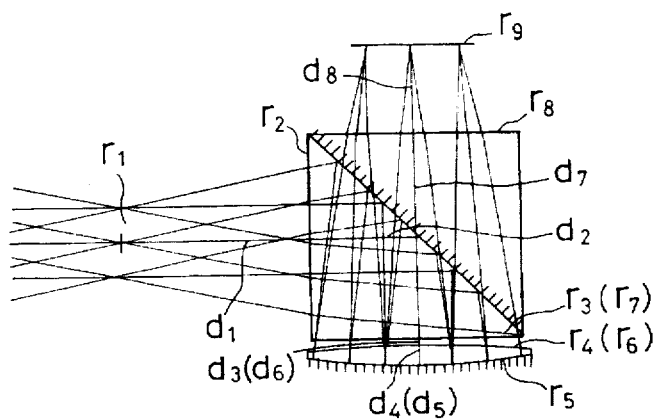
FIG. 31 is a sectional view of Example 17.

Example 17 shown in FIG. 31 uses a biconvex lens for the reverse reflecting mirror and hence has a small overall Petzval sum. However, astigmatism is produced by the surface of the biconvex lens that is opposite to the reflecting surface. Therefore, the reflecting surface of the biconvex lens is formed into an aspherical surface to thereby correct the astigmatism. This aspherical surface has such a configuration that the radius of curvature increases as the distance from the optical axis of the lens increases toward the peripheries thereof. Thus, the aspherical surface causes the meridional image surface to bend toward the lens at a position where the image height is high. FIG. 43A–43I graphically show various aberrations in Example 17 in a similar manner to FIG. 33.

Figure 32:
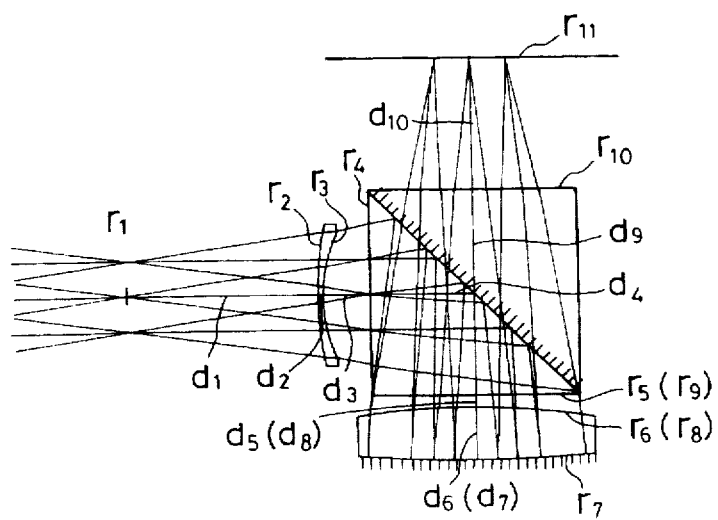
FIG. 32 is a sectional view of Example 18.
Figure 33A:
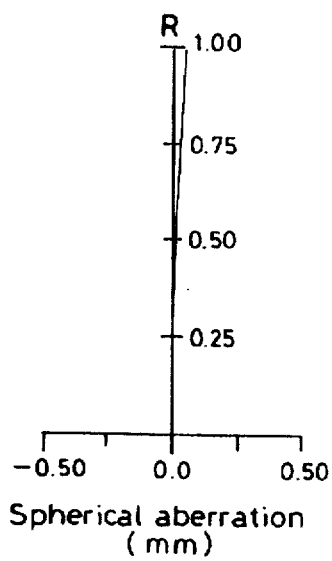
FIGS. 33A–33I graphically show spherical aberration, astigmatism, distortion and coma in an ocular optical system of Example 7 with FIGS. 33D–33F being meridional coma and FIGS. 33G–33I being sagittal coma.
Figure 33B:
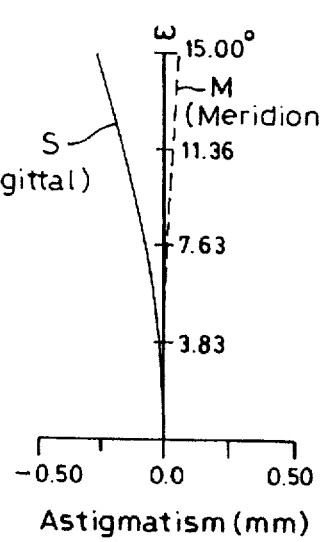
Figure 33C:
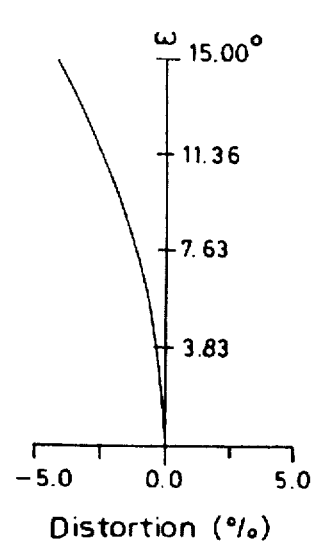
Figure 33D:
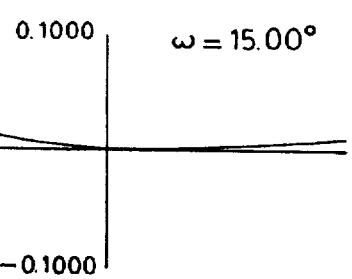
Figure 33G:
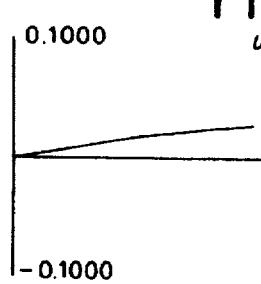
Figure 33E:
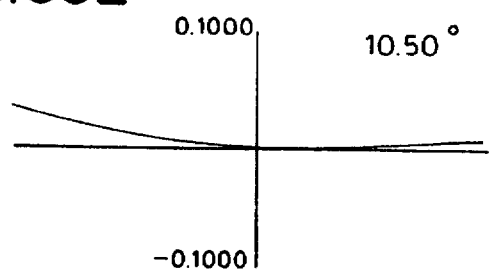
Figure 33H:
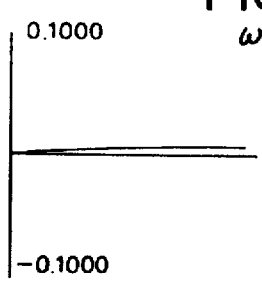
Figure 33F:
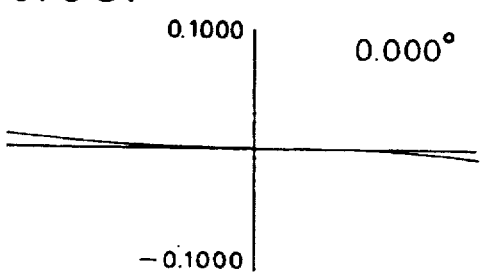
Figure 33I:
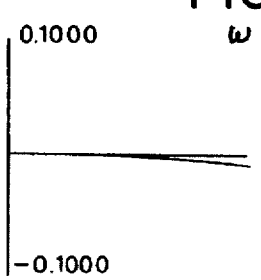
Figure 36A:
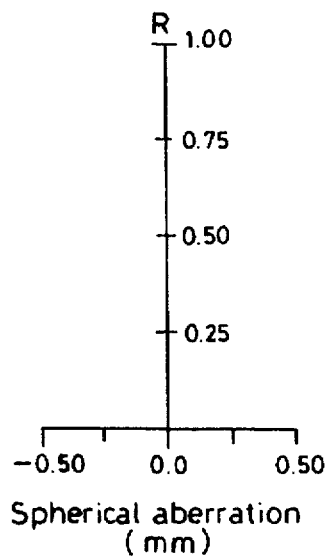
FIGS. 36A–36I graphically show various aberrations in an ocular optical system in Example 10 in a similar manner to FIG. 33 with FIGS. 36D–36F being meridional coma and FIGS. 36G–36I being sagittal coma.
Figure 36B:
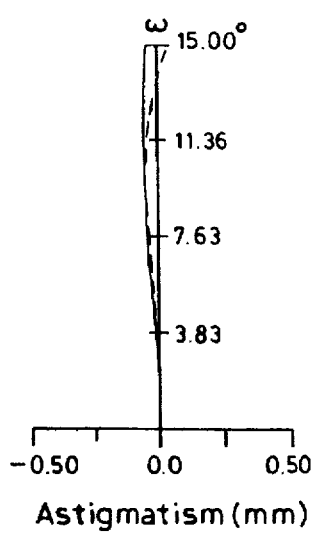
Figure 36C:
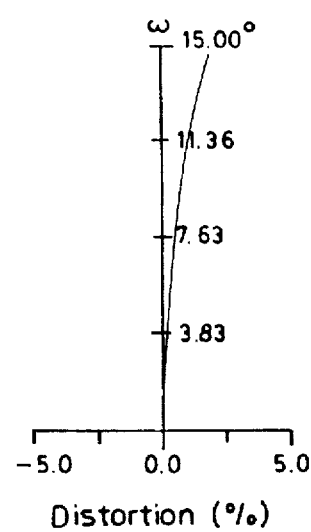
Figure 36D:
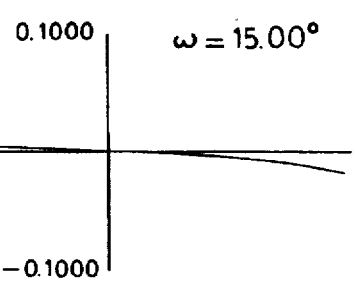
Figure 36E:
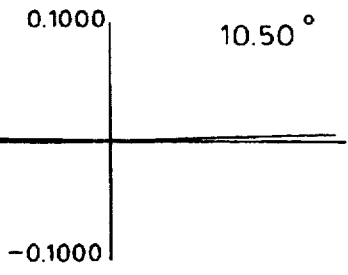
Figure 36F:
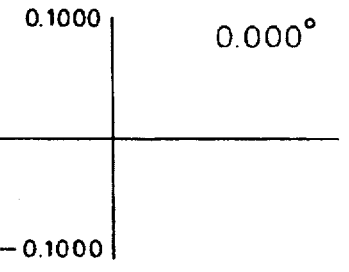
Figure 36G:
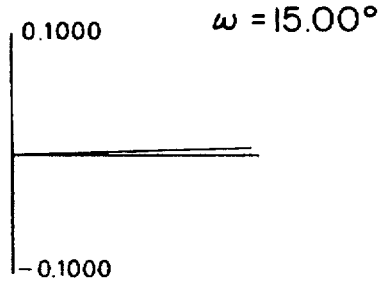
Figure 36H:
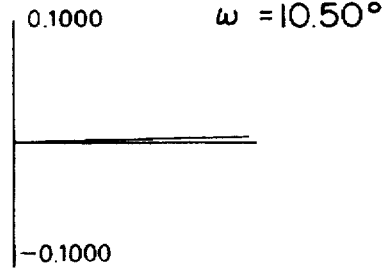
Figure 36I:
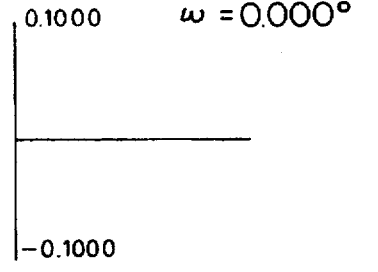
Figure 37A:
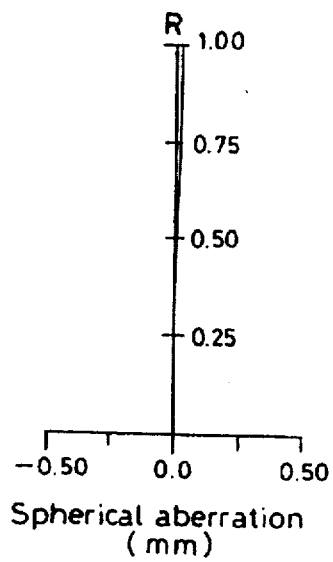
FIGS. 37A–37I graphically show various aberrations in an ocular optical system in Example 11 in a similar manner to FIG. 33 with FIGS. 37D–37F being meridional coma and FIGS. 37G–37I being sagittal coma.
Figure 37B:
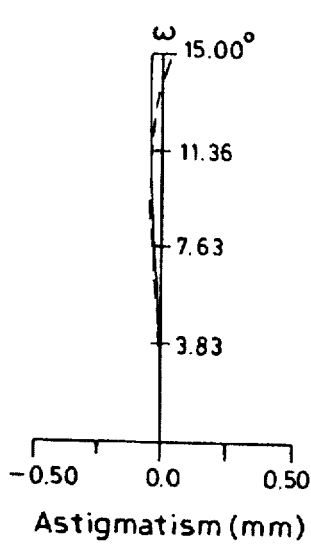
Figure 37C:
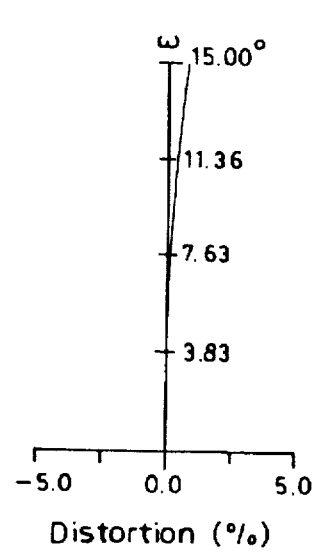
Figure 37D:
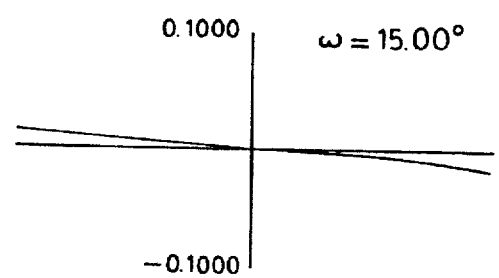
Figure 37G:
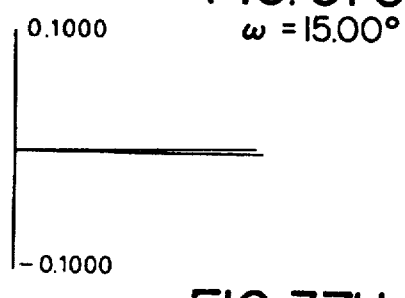
Figure 37E:
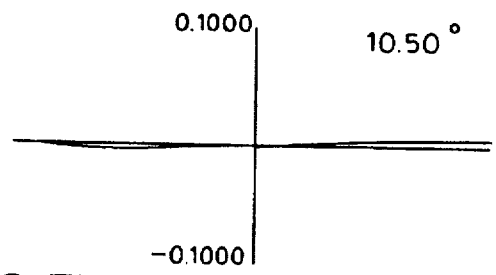
Figure 37H:
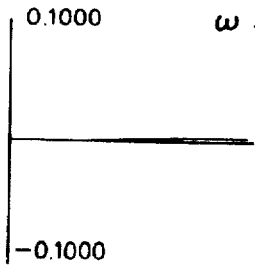
Figure 37F:
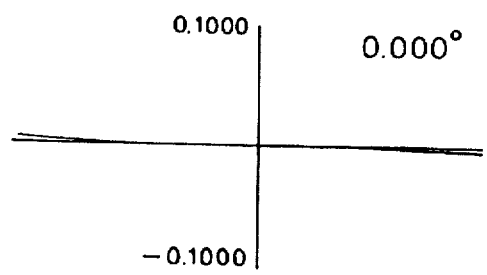
Figure 37I:
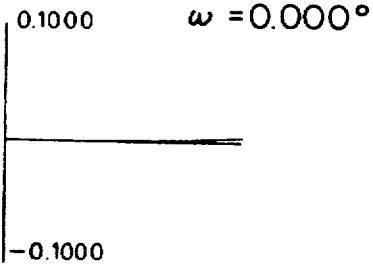
Figure 38A:
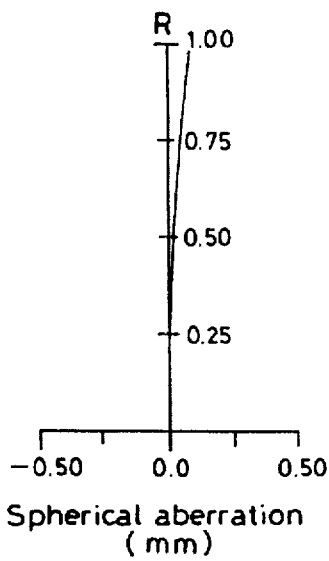
FIGS. 38 graphically show various aberrations in an ocular optical system in Example 12 in a similar manner to FIG. 33 with FIGS. 38D–38F being meridional coma and FIGS. 38G–38I being sagittal coma.
Figure 38B:
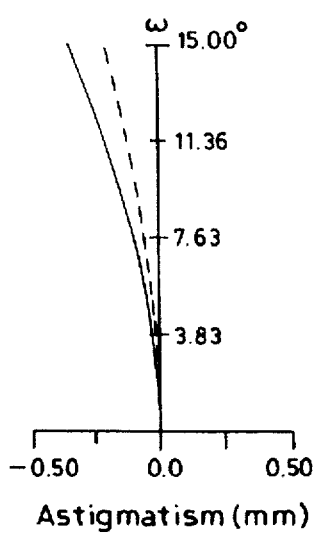
Figure 38C:
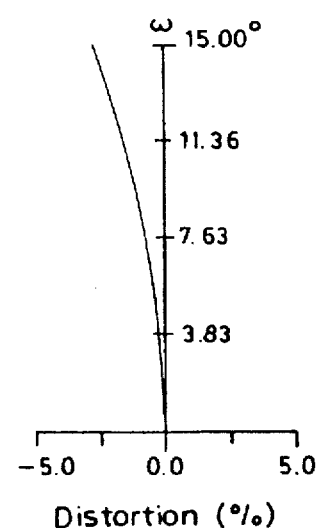
Figure 38D:
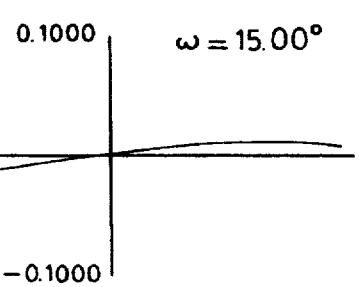
Figure 38E:
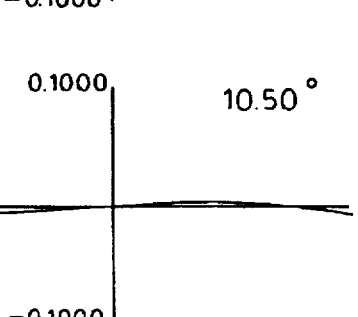
Figure 38F:
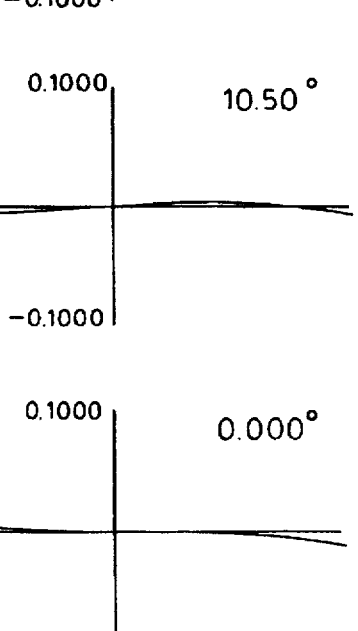
Figure 38G:
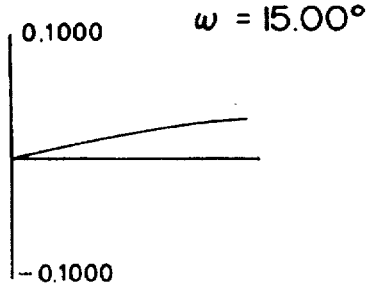
Figure 38H:
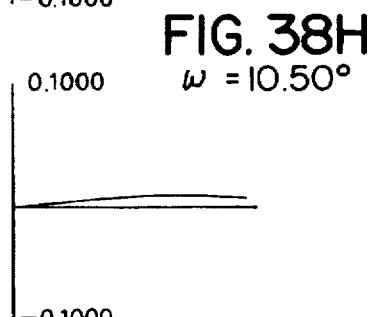
Figure 38I:
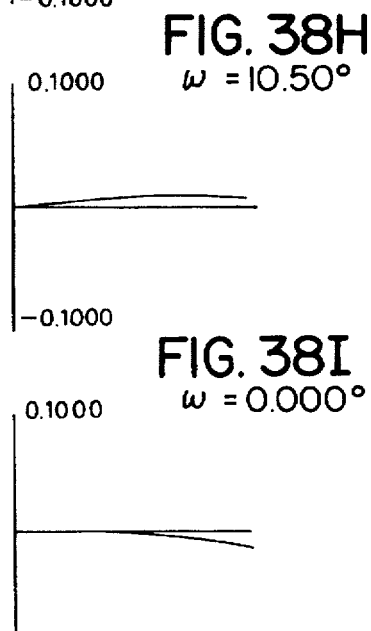
Figure 39A:
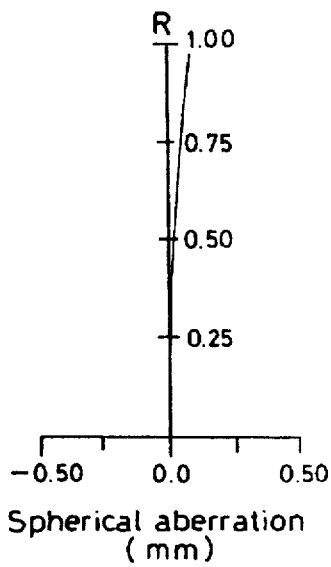
FIGS. 39 graphically show various aberrations in an ocular optical system in Example 13 in a similar manner to FIG. 33 with FIGS. 39D–39F being meridional coma and FIGS. 39G–39I being sagittal coma.
Figure 39B:
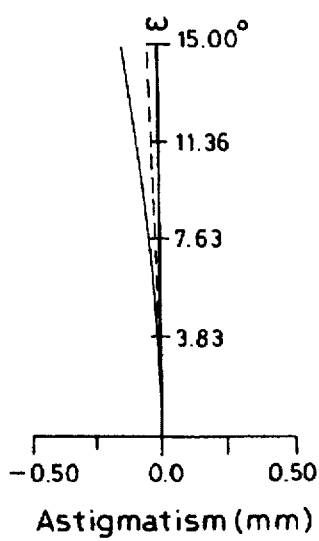
Figure 39C:
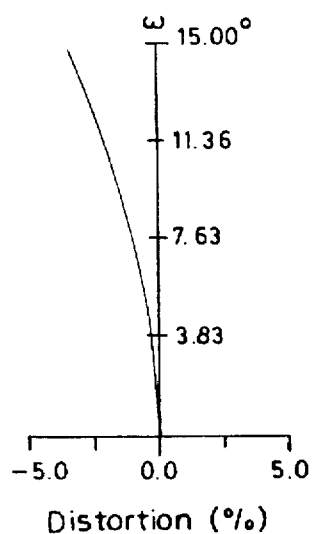
Figure 39D:
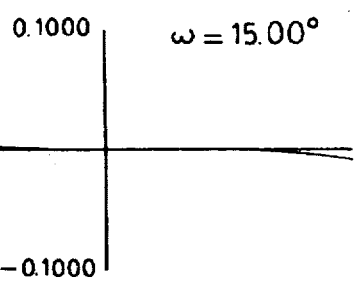
Figure 39E:
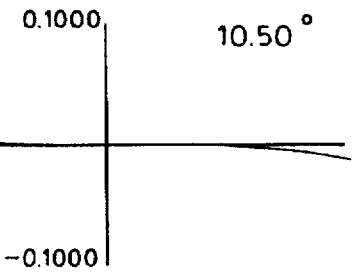
Figure 39F:
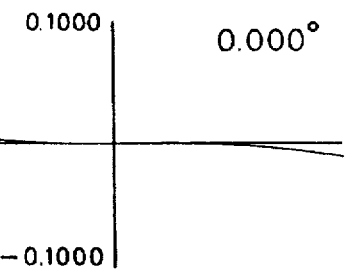
Figure 39G:
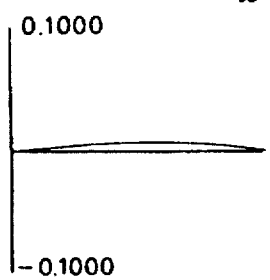
Figure 39H:
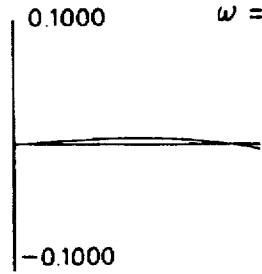
Figure 39I:
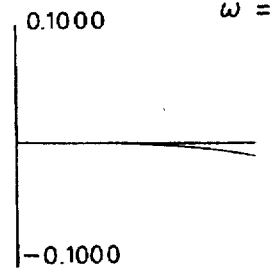
Figure 41A:
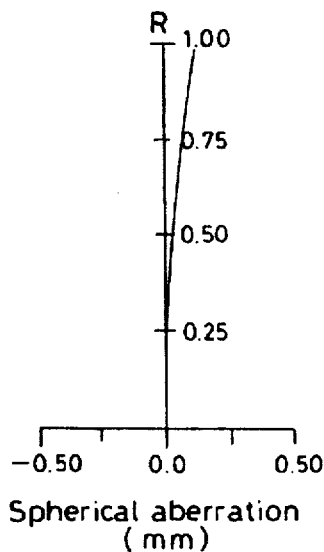
FIGS. 41 graphically show various aberrations in an ocular optical system in Example 15 in a similar manner to FIG. 33 with FIGS. 41D–41F being meridional coma and FIGS. 41G–41I being sagittal coma.
Figure 41B:
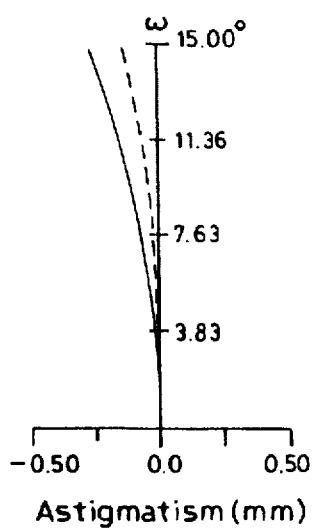
Figure 41C:
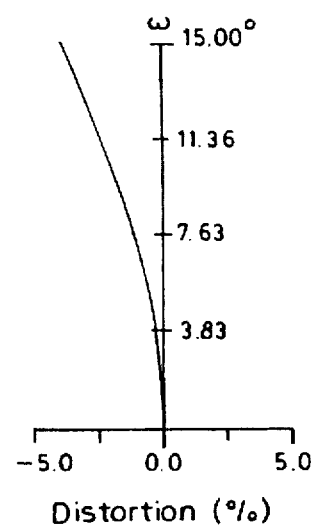
Figure 41D:
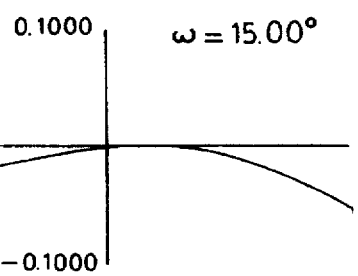
Figure 41G:
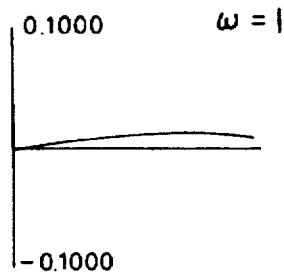
Figure 41E:
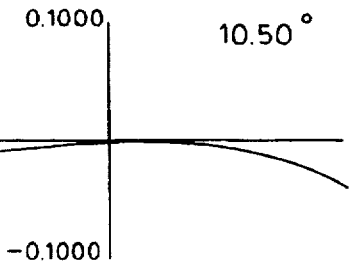
Figure 41H:
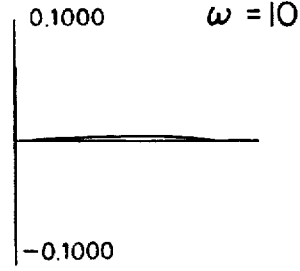
Figure 41F:
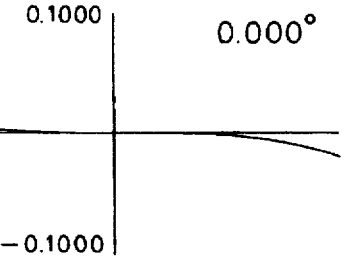
Figure 41I:
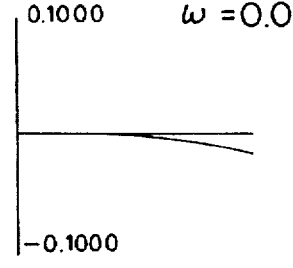
Figure 42A:
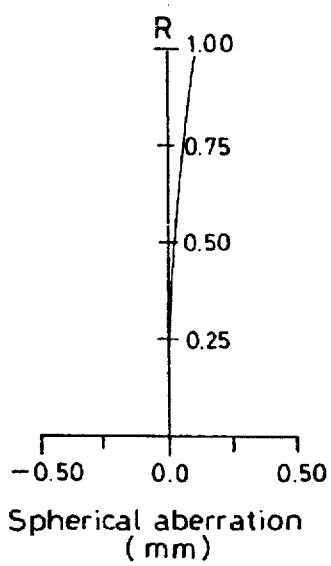
FIGS. 42 graphically show various aberrations in an ocular optical system in Example 16 in a similar manner to FIG. 33 with FIGS. 42D–42F being meridional coma and FIGS. 42G–42I being sagittal coma.
Figure 42B:
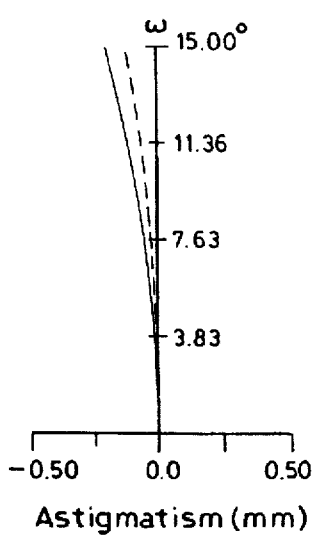
Figure 42C:
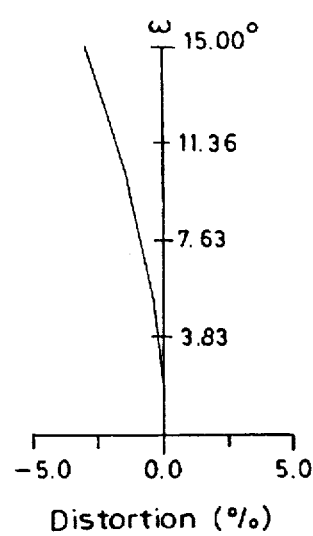
Figure 42D:
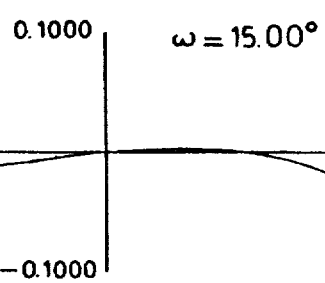
Figure 42G:
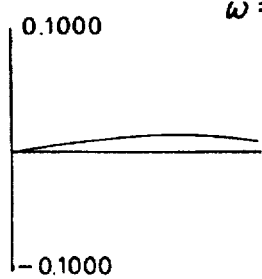
Figure 42E:
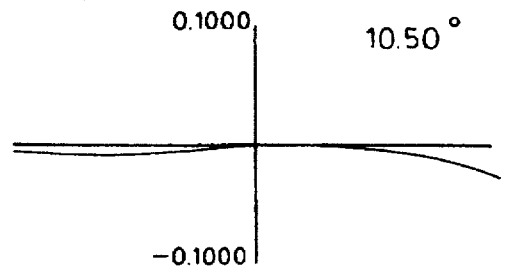
Figure 42H:
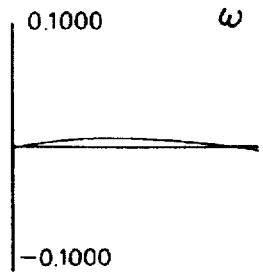
Figure 42F:
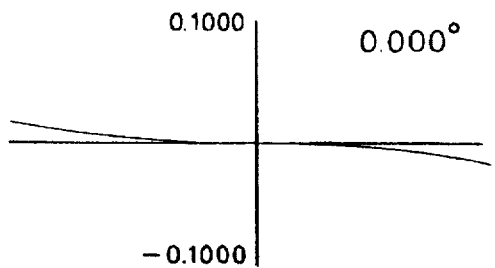
Figure 42I:
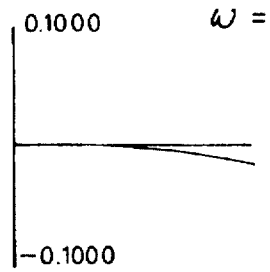
Figure 43A:
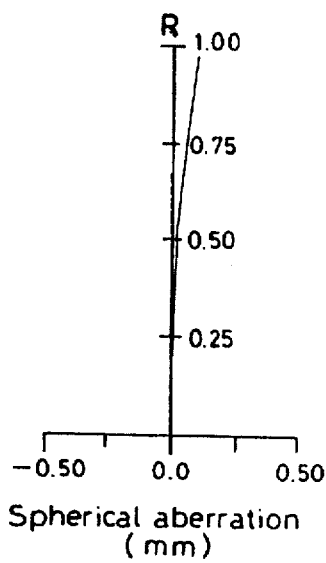
FIGS. 43 graphically show various aberrations in an ocular optical system in Example 17 in a similar manner to FIG. 33 with FIGS. 43D–43F being meridional coma and FIGS. 43G–43I being sagittal coma.
Figure 43B:
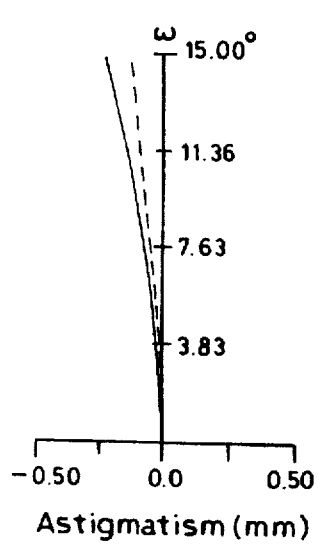
Figure 43C:
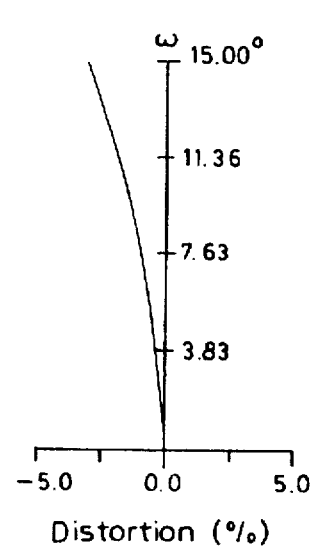
Figure 43D:
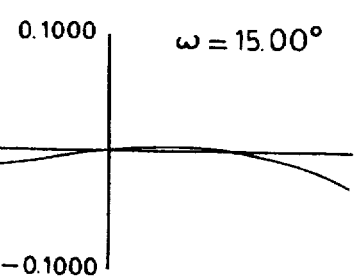
Figure 43G:
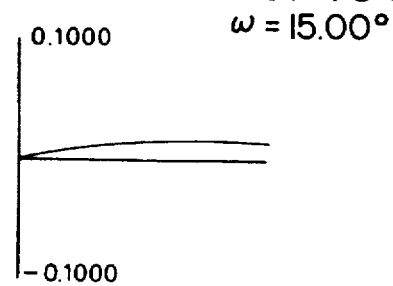
Figure 43E:
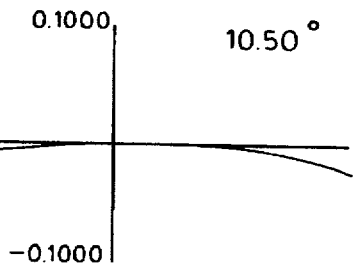
Figure 43H:
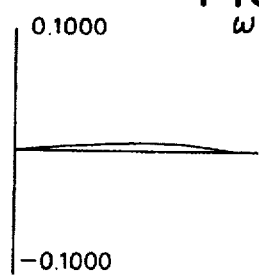
Figure 43F:
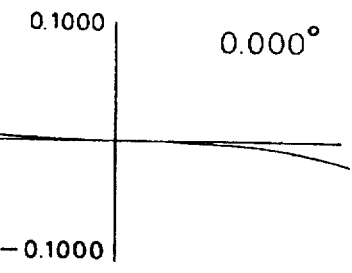
Figure 43I:
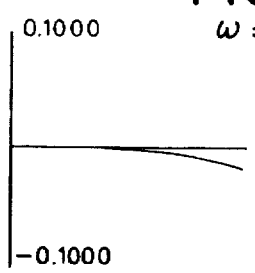
Figure 44A:
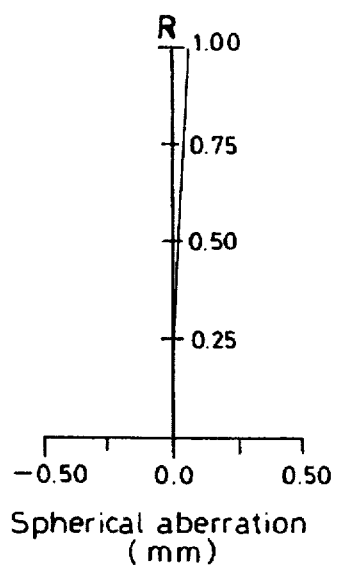
FIGS. 44 graphically show various aberrations in an ocular optical system in Example 18 in a similar manner to FIG. 33 with FIGS. 44D–44F being meridional coma and FIGS. 44G–44I being sagittal coma.
Figure 44B:
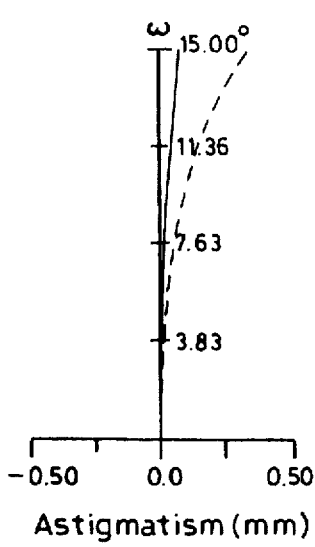
Figure 44C:
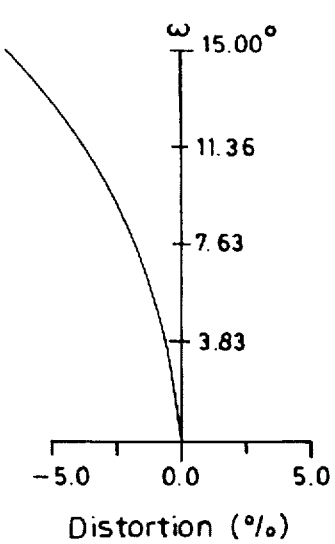
Figure 44D:
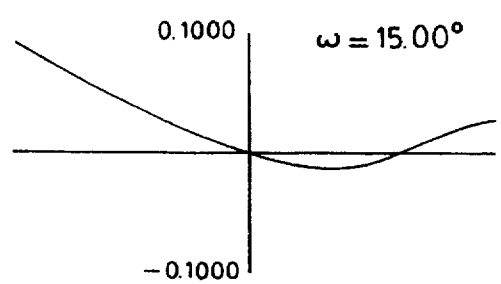
Figure 44E:
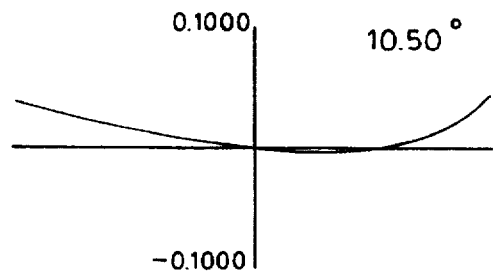
Figure 44F:
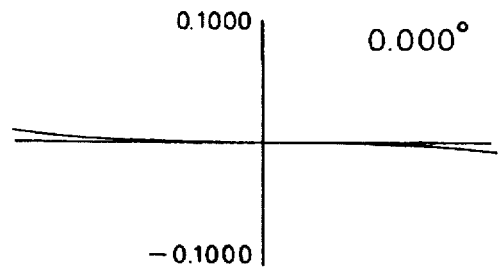
Figure 44G:
Figure 44H:
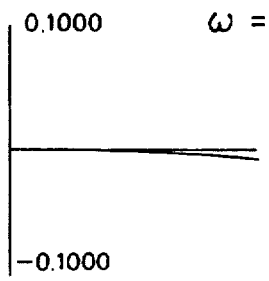
Figure 44I:
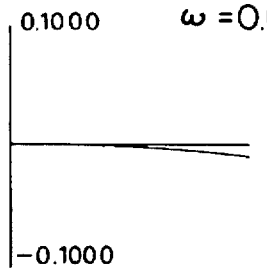

Example 18 shown in FIG. 32 is arranged on the assumption that the optical system is compatible with high definition television in which the frame size (aspect ratio) is 16:9. Example 18 uses a reverse reflecting mirror and hence has a small Petzval sum. In this Example, a meniscus negative lens having a convex surface directed toward the pupil is additionally provided between the pupil position and the semitransparent mirror, thereby further reducing the overall Petzval sum. In addition, the refractive index of the positive lens constituting the reverse reflecting mirror is set at 1.8 or more, thereby reducing the curvature of the surface of the reverse reflecting mirror that is opposite to the reflecting surface, and thus minimizing coma and astigmatism produced by this surface. At this time, the negative lens is disposed in the vicinity of the pupil to further correct aberrations, particularly comatic aberration. By varying the power of the negative lens or moving it in the direction of the optical axis, the diopter can be adjusted to the observer's diopter. FIG. 44A–44I graphically show various aberrations in Example 18 in a similar manner to FIG. 33.

Lens data in each Example will be shown below. In the following, $r_1, r_2 \ldots$ are the radii of curvature of lens surfaces including the pupil position and the image surface, $d_1, d_2 \ldots$ are the spacings between adjacent lens surfaces, $nd_1, nd_2 \ldots$ are the refractive indices of the lenses for the spectral d-line. Assuming that the direction of the optical axis is x and a direction perpendicular to the optical axis is y, the aspherical configuration is expressed by $$x=(y^2/r)[1+\{1-(1+K)(y^2/r^2)\}^{1/2}]+A_4 y^4+A_6 y^6+A_8 y^8+A_{10} y^{10}$$

where r is the paraxial curvature radius; K is a conical coefficient; and $A_4$, $A_6$, $A_8$, and $A_{10}$ are aspherical coefficients.

Example 7

$r_1 = \infty$ (pupil); $d_1 = 22.000$
$r_2 = 59.176$; $d_2 = 2.000$; $n_{d1} = 1.5163$
$r_3 = -60.551$; $d_3 = 1.000$
$r_4 = \infty$; $d_4 = 24.000$; $n_{d2} = 1.5163$
$r_5 = \infty$; $d_5 = 2.000$
$r_6 = -73.145$ (mirror); $d_6 = 2.000$
$r_7 = \infty$; $d_7 = 24.000$; $n_{d3} = 1.5163$
$r_8 = \infty$; $d_8 = 0.998$
$r_9 =$ image plane (display device)
$|n_2 \Phi_1/\Phi_2| = 2.4$
$R/F = 2.6$
$PS = -0.016$ Example 8

$r_1 = \infty$ (pupil); $d_1 = 22.000$
$r_2 = 70.973$; $d_2 = 2.000$; $n_{d1} = 1.8829$
$r_3 = -183.579$; $d_3 = 1.000$
$r_4 = \infty$; $d_4 = 24.000$; $n_{d2} = 1.5163$
$r_5 = \infty$; $d_5 = 2.000$
$r_6 = -73.319$ (mirror); $d_6 = 2.000$
$r_7 = \infty$; $d_7 = 24.000$; $n_{d3} = 1.5163$
$r_8 = \infty$; $d_8 = 0.971$
$r_9 =$ image plane (display device)
$|n_2 \Phi_1/\Phi_2| = 2.9$
$R/F = 2.6$
$PS = -0.018$ Example 9

$r_1 = \infty$ (pupil); $d_1 = 22.000$
$r_2 = \infty$; $d_2 = 24.000$; $n_{d1} = 1.5163$
$r_3 = \infty$; $d_3 = 2.000$
$r_4 = -66.235$ (mirror); $d_4 = 2.000$
$r_5 = \infty$; $d_5 = 24.000$; $n_{d2} = 1.5163$
$r_6 = \infty$; $d_6 = 8.000$
$r_7 = -18.134$; $d_7 = 3.000$; $n_{d3} = 1.5163$
$r_8 = 226.719$; $d_8 = 4.021$
$r_9 =$ image plane (display device)
$|n_2 \Phi_1/\Phi_2| = 1.5$
$R/F = 2.4$
$PS = -0.01$ Example 10

$r_1 = \infty$ (pupil); $d_1 = 22.000$
$r_2 = \infty$; $d_2 = 24.000$; $n_{d1} = 1.5163$
$r_3 = \infty$; $d_3 = 2.000$
$r_4 = -68.874$ (mirror); $d_4 = 2.000$
$r_5 = \infty$; $d_5 = 24.000$; $n_{d2} = 1.5163$
$r_6 = \infty$; $d_6 = 10.550$
$r_7 = -18.429$; $d_7 = 7.047$; $n_{d3} = 1.8829$
$r_8 = 729.279$; $d_8 = 0.956$
$r_9 =$ image plane (display device)
$|n_2 \Phi_1/\Phi_2| = 1.1$
$R/F = 2.6$
$PS = -0.003$ Example 11

$r_1 = \infty$ (pupil); $d_1 = 22.000$
$r_2 = \infty$; $d_2 = 24.000$; $n_{d1} = 1.5163$
$r_3 = \infty$; $d_3 = 2.000$
$r_4 = -89.160$; $d_4 = 2.000$; $n_{d2} = 1.5163$
$r_5 = -70.000$ (mirror); $d_5 = 2.000$; $n_{d3} = 1.5163$
$r_6 = -89.160$; $d_6 = 2.000$
$r_7 = \infty$; $d_7 = 24.000$; $n_{d4} = 1.5163$
$r_8 = \infty$; $d_8 = 7.487$
$r_9 = -15.973$; $d_9 = 3.000$; $n_{d5} = 1.5163$
$r_{10} = 136.371$; $d_{10} = 1.799$
$r_{11} =$ image plane (display device)
$|F\Phi_3/n_3^2| = 0.51$
$R/F = 2.6$
$PS = 0.005$ -continued Example 12

| | | |
|---|---|---|
| $r_1 = \infty$ (pupil) | $d_1 = 22.000$ | |
| $r_2 = \infty$ | $d_2 = 24.000$ | $n_{d1} = 1.5163$ |
| $r_3 = \infty$ | $d_3 = 2.000$ | $n_{d2} = 1.5163$ |
| $r_4 = -84.704$ (mirror) | $d_4 = 2.000$ | $n_{d3} = 1.5163$ |
| $r_5 = \infty$ | $d_5 = 24.000$ | $n_{d4} = 1.5163$ |
| $r_6 = \infty$ | $d_6 = 10.500$ | |
| $r_7 =$ image plane | | |
| (display device) | | |

$|F\Phi_3/n_3^2| = 0.45$
$R/F = 3.2$
$PS = -0.016$

Example 13

| | | |
|---|---|---|
| $r_1 = \infty$ (pupil) | $d_1 = 22.000$ | |
| $r_2 = 134.955$ | $d_2 = 2.000$ | $n_{d1} = 1.5163$ |
| $r_3 = -78.954$ | $d_3 = 1.000$ | |
| $r_4 = \infty$ | $d_4 = 24.000$ | $n_{d2} = 1.5163$ |
| $r_5 = \infty$ | $d_5 = 2.000$ | $n_{d3} = 1.5163$ |
| $r_6 = -96.939$ (mirror) | $d_6 = 2.000$ | $n_{d4} = 1.5163$ |
| $r_7 = \infty$ | $d_7 = 24.000$ | $n_{d5} = 1.5163$ |
| $r_8 = \infty$ | $d_8 = 5.540$ | |
| $r_9 =$ image plane | | |
| (display device) | | |

$|F\Phi_3/n_3^2| = 0.39$
$R/F = 3.5$
$PS = -0.013$

Example 14

| | | |
|---|---|---|
| $r_1 = \infty$ (pupil) | $d_1 = 22.000$ | |
| $r_2 = \infty$ | $d_2 = 24.000$ | $n_{d1} = 1.5163$ |
| $r_3 = \infty$ | $d_3 = 2.000$ | $n_{d2} = 1.5163$ |
| $r_4 = -89.861$ (mirror) | $d_4 = 2.000$ | $n_{d3} = 1.5163$ |
| $r_5 = \infty$ | $d_5 = 24.000$ | $n_{d4} = 1.5163$ |
| $r_6 = \infty$ | $d_6 = 8.000$ | |
| $r_7 = -26.585$ | $d_7 = 3.000$ | $n_{d5} = 1.5163$ |
| $r_8 = -91.042$ | $d_8 = 2.170$ | |
| $r_9 =$ image plane | | |
| (display device) | | |

$|F\Phi_3/n_3^2| = 0.41$
$R/F = 3.3$
$PS = -0.014$

Example 15

| | | |
|---|---|---|
| $r_1 = \infty$ (pupil) | $d_1 = 22.000$ | |
| $r_2 = \infty$ | $d_2 = 24.000$ | $n_{d1} = 1.5163$ |
| $r_3 = \infty$ | $d_3 = 0.500$ | |
| $r_4 = 254.351$ | $d_4 = 2.000$ | $n_{d2} = 1.5163$ |
| $r_5 = -100.000$ (mirror) | $d_5 = 2.000$ | $n_{d3} = 1.5163$ |
| $r_6 = 254.351$ | $d_6 = 0.500$ | |
| $r_7 = \infty$ | $d_7 = 24.000$ | $n_{d4} = 1.5163$ |
| $r_8 = \infty$ | $d_8 = 6.000$ | |
| $r_9 = -9.537$ | $d_9 = 1.000$ | $n_{d5} = 1.5163$ |
| $r_{10} = -9.195$ | $d_{10} = 4.550$ | |
| $r_{11} =$ image plane | | |
| (display device) | | |

$|F\Phi_3/n_3^2| = 0.37$
$R/F = 3.5$
$PS = -0.013$

Example 16

| | | |
|---|---|---|
| $r_1 = \infty$ (pupil) | $d_1 = 22.000$ | |
| $r_2 = \infty$ | $d_2 = 24.000$ | $n_{d1} = 1.5163$ |
| $r_3 = \infty$ | $d_3 = 0.500$ | |
| $r_4 = 177.140$ (aspheric) | $d_4 = 3.000$ | $n_{d2} = 1.5163$ |
| $r_5 = -100.000$ (mirror) | $d_5 = 3.000$ | $n_{d3} = 1.5163$ |
| $r_6 = 177.140$ (aspheric) | $d_6 = 0.500$ | |
| $r_7 = \infty$ | $d_7 = 24.000$ | $n_{d4} = 1.5163$ |
| $r_8 = \infty$ | $d_8 = 9.640$ | |
| $r_9 =$ image plane | | |
| (display device) | | |

Aspherical Coefficients

5th (6th) surface
$K = -1$
$A_4 = -0.623 \times 10^{-6}$
$A_6 = A_8 = A_{10} = 0$
$|F\Phi_3/n_3^2| = 0.36$
$R/F = 3.6$
$PS = -0.013$ Example 17

| | | |
|---|---|---|
| $r_1 = \infty$ (pupil) | $d_1 = 22.000$ | |
| $r_2 = \infty$ | $d_2 = 24.000$ | $n_{d1} = 1.5163$ |
| $r_3 = \infty$ | $d_3 = 0.500$ | |
| $r_4 = 194.949$ | $d_4 = 2.000$ | $n_{d2} = 1.5163$ |
| $r_5 = -98.725$ | $d_5 = 2.000$ | $n_{d3} = 1.5163$ |
| (mirror, aspheric) | | |
| $r_6 = 194.949$ | $d_6 = 0.500$ | |
| $r_7 = \infty$ | $d_7 = 24.000$ | $n_{d4} = 1.5163$ |
| $r_8 = \infty$ | $d_8 = 10.290$ | |
| $r_9 =$ image plane | | |
| (display device) | | |

Aspherical Coefficients

5th surface
$K = -1$
$A_4 = 0.655 \times 10^{-7}$
$A_6 = A_8 = A_{10} = 0$
$|F\Phi_3/n_3^2| = 0.36$
$R/F = 3.5$
$PS = -0.013$ Example 18

| | | |
|---|---|---|
| $r_1 = \infty$ (pupil) | $d_1 = 22.000$ | |
| $r_2 = 30.533$ | $d_2 = 1.000$ | $n_{d1} = 1.5163$ |
| $r_3 = 19.611$ | $d_3 = 5.000$ | |
| $r_4 = \infty$ | $d_4 = 24.000$ | $n_{d2} = 1.5163$ |
| $r_5 = \infty$ | $d_5 = 1.000$ | |
| $r_6 = 95.111$ | $d_6 = 6.000$ | $n_{d3} = 1.8829$ |
| $r_7 = -200.000$ (mirror) | $d_7 = 6.000$ | $n_{d4} = 1.8829$ |
| $r_8 = 95.111$ | $d_8 = 1.000$ | |
| $r_9 = \infty$ | $d_9 = 24.000$ | $n_{d5} = 1.5163$ |
| $r_{10} = \infty$ | $d_{10} = 15.280$ | |
| $r_{11} =$ image plane | | |
| (display device) | | |

$|F\Phi_3/n_3^2| = 0.03$
$R/F = 6.9$
$PS = -0.007$

Incidentally, the above-described Examples may be provided with a function that enables the user to observe the outside world in addition to an image displayed on the image display device by adding a surface or lens of negative power on the side of the optical path splitting device which is opposite to the side thereof which faces the observer's eyeball so that an afocal optical system is formed from the surface or lens of positive power, the optical path splitting device and the surface or lens of negative power, and further providing a shutter device in front of the surface or lens of negative power.

Figure 45:
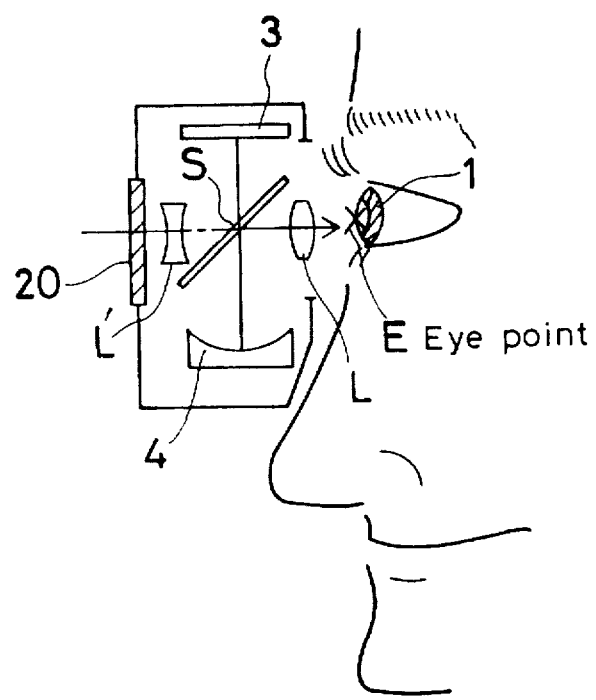
FIG. 45 is a view for explanation of the function of an eye point in the present invention.

Next, the function of an eye point in the present invention will be explained with reference to FIG. 45. FIG. 45 is a sectional view of the image display apparatus according to the present invention when it is formed as a head-mounted display apparatus having a see-through function by using, for example, an optical system such as that shown in FIG. 1. A half-mirror S is disposed in front of the observer's eyeball 1 at an angle to his/her line of sight, and an image display device 3 and a concave mirror 4 are disposed to face each other across the half-mirror S and to extend parallel to the observer's line of sight. In addition, a positive lens L according to the present invention is disposed between the eyeball 1 and the half-mirror S, and a negative lens L' is disposed forwardly of the half-mirror S As viewed in the direction of the observer's line of sight to constitute in combination with the lens L an afocal optical system for allowing the observer to directly view the outside world. Further, a shutter 20 is disposed in front of the negative lens L'. With this arrangement, information light from the image display device 3 is led to the inside of the observer's eyeball 1 without effecting image formation. In addition, it is possible to observe the outside world.

More specifically, the above-described arrangement enables information light from the image display device 3 to be led to the inside of the observer's eyeball 1 without effecting image formation. That is, a bundle of rays from an image formed by the image display device 3 is propagated by an optical system, which is comprised of a half-mirror S as a semitransparent reflecting member, a concave mirror 4 as a magnifying reflecting mirror, and a positive lens L as an optical member having positive power, to form an eye point E. When the observer's eyeball 1 is placed at the eye point E, the bundle of rays is condensed by the crystalline lens in the eyeball 1 to form an image of the image display device 3 on the retina in the eyeball 1. In other words, the observer forms a virtual image type optical system whereby an enlarged image is seen to be projected in the air.

Figure 46:
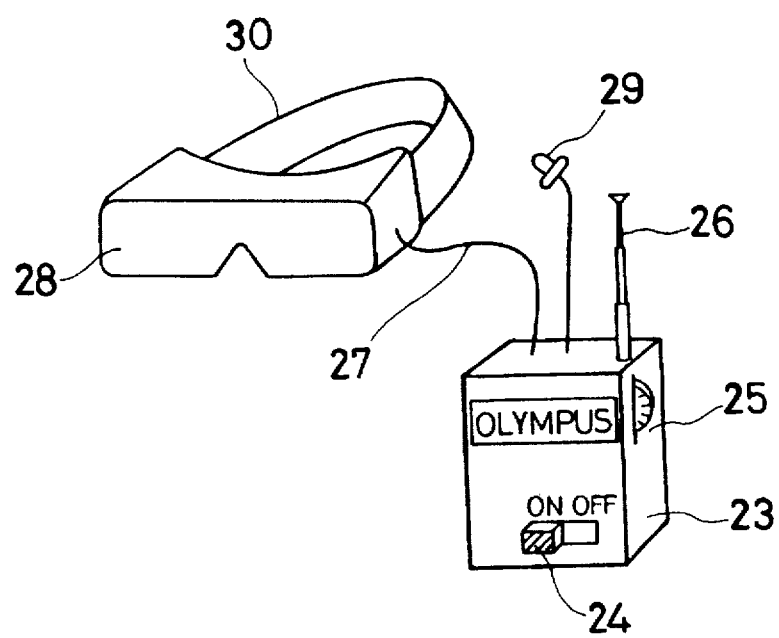
FIG. 46 shows one example of a specific arrangement of the image display apparatus according to the present invention when it is formed as a head-mounted display apparatus.

An example of a specific arrangement of the image display apparatus, arranged as described above, when it is formed as a head-mounted display apparatus will be explained below. To display an image on the two-dimensional image display device 3, e.g., a liquid crystal display, in the image display apparatus, an arrangement such as that shown in FIG. 46 may be adopted. Referring to FIG. 46, when a switch 24 of a TV signal receiving device 23, for example, is turned on, a TV signal of the channel that has been preset by actuating a TV channel selecting knob 25 is received by an antenna 26. The TV signal thus received is reproduced on the screen of an image display device 3, e.g., a liquid crystal display, a small-sized CRT display, etc., provided in a goggle-type display apparatus body 28 through a cord 27. The image is displayed by an optical arrangement such as that in the above-described Examples. In addition, the device 23 is provided with an earphone 29 to enable the user to listen to the TV sound.

Figure 47:
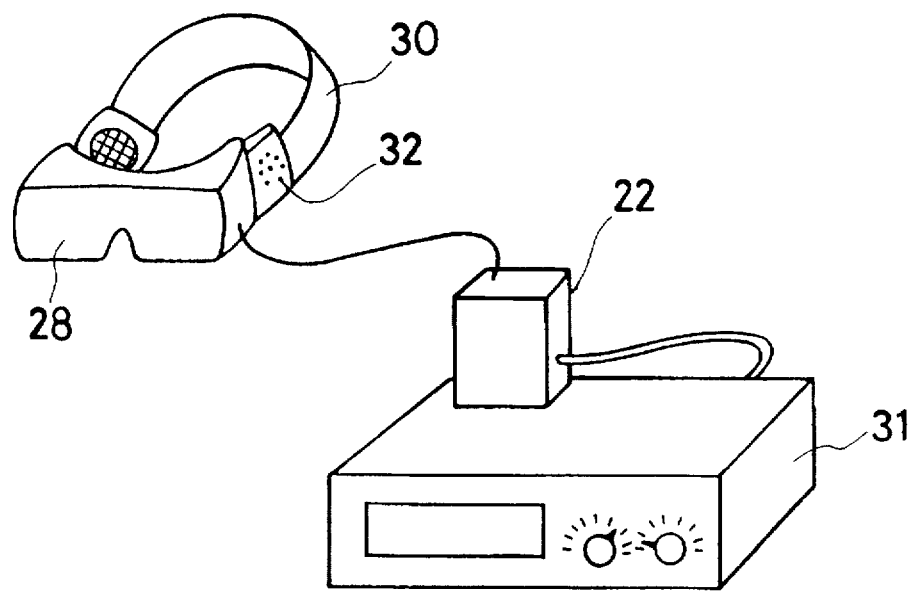
FIG. 47 shows one example of another specific arrangement of the image display apparatus according to the present invention.

It should be noted that the head-mounted display apparatus according to the present invention is not necessarily limited to the above-described TV signal receiving device 23. Another example is shown in FIG. 47. In the arrangement shown in FIG. 47, an image processing device 22 is connected to an existing video reproducing device 31 to transmit an image to the image display device in the display apparatus body 28. In this case, no earphone is provided as a separate member, but a headphone 32 is attached to a rubber band provided as a support member 30 for the display apparatus body 28 instead. It should be noted that the TV signal receiving device 23 and the display apparatus body 28, which are shown in FIG. 46, may be integrated together as one unit.

Figure 48:
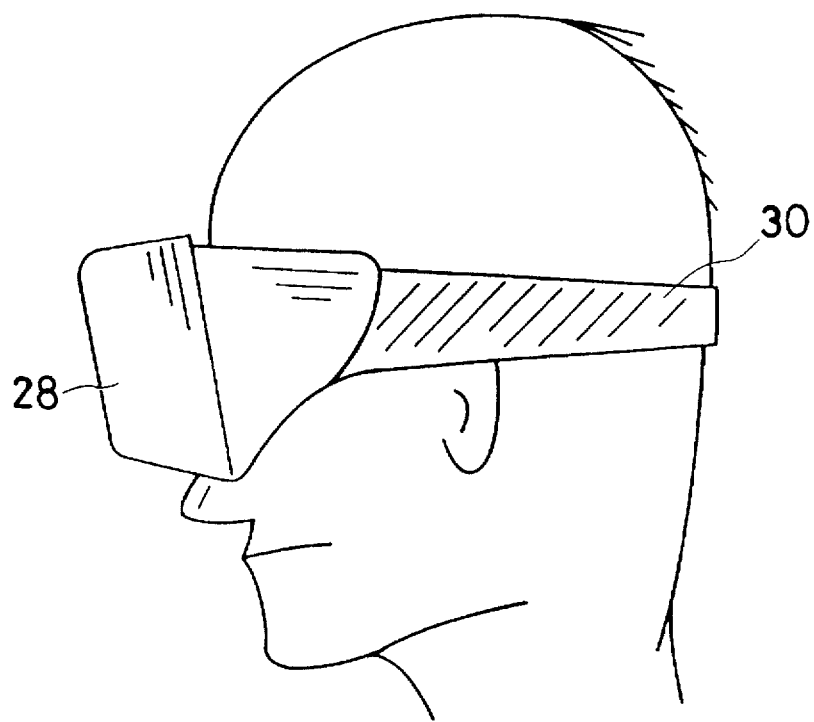
FIG. 48 shows a support member for retaining a goggle-type head-mounted display apparatus.
Figure 49:
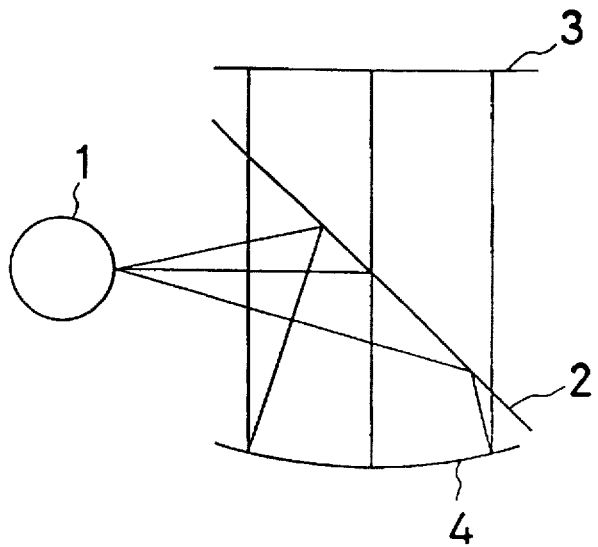
FIG. 49 is a sectional view showing an optical system of one example of conventional image display apparatuses.
Figure 50:
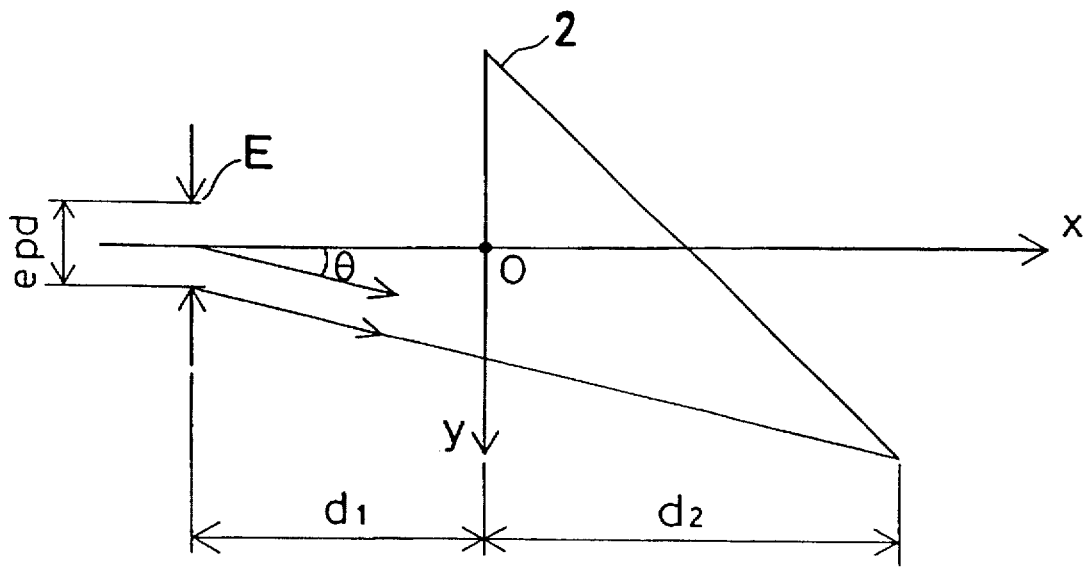
FIG. 50 is a ray path diagram for analysis of the arrangement shown in FIG. 49.
Figure 51:
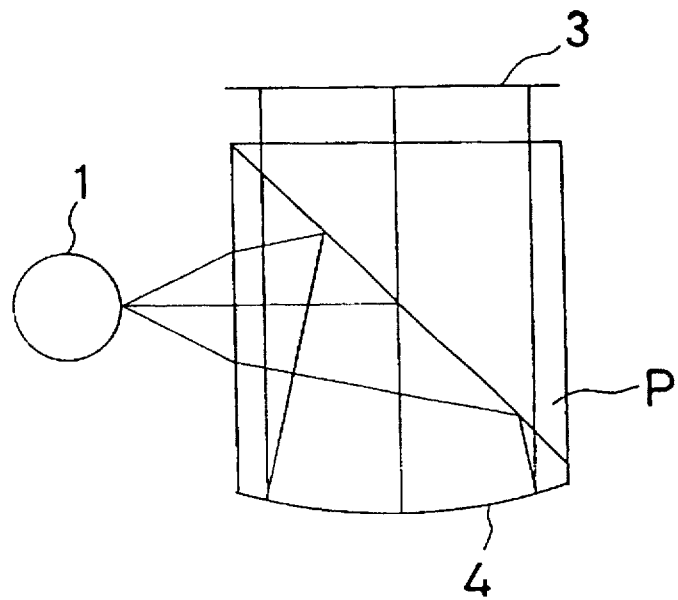
FIG. 51 is a sectional view showing an optical system of another conventional image display apparatus.
Figure 52:
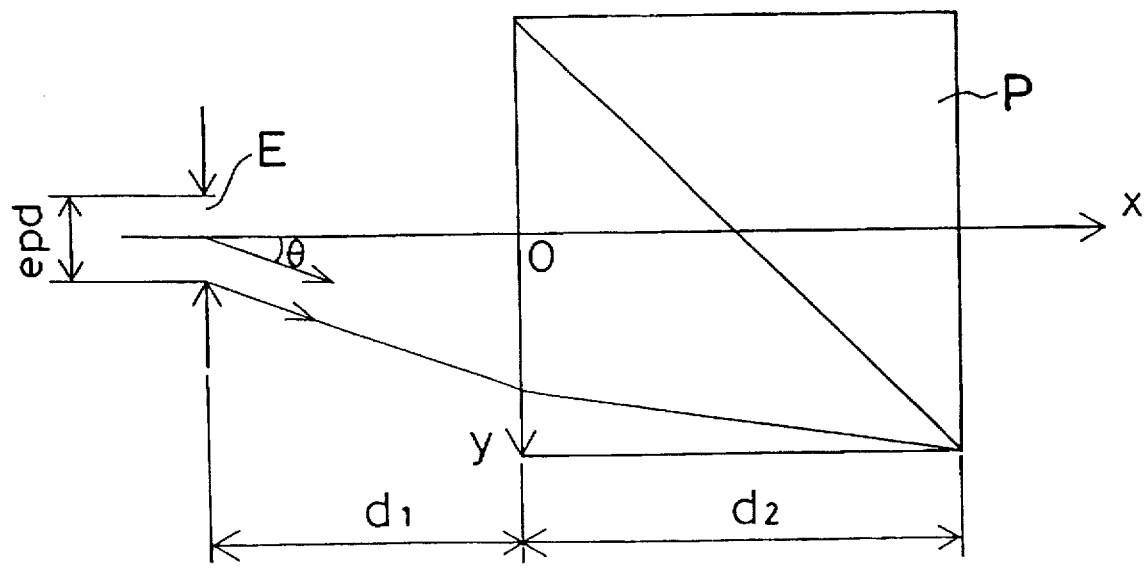
FIG. 52 is a ray path diagram for analysis of the arrangement shown in FIG. 51.

The head-mounted display apparatus according to the present invention may be arranged in the form of a goggle-type display apparatus in which the display apparatus body 28 is supported by a rubber band 30, for example, as shown in FIG. 48.

Figure 53:
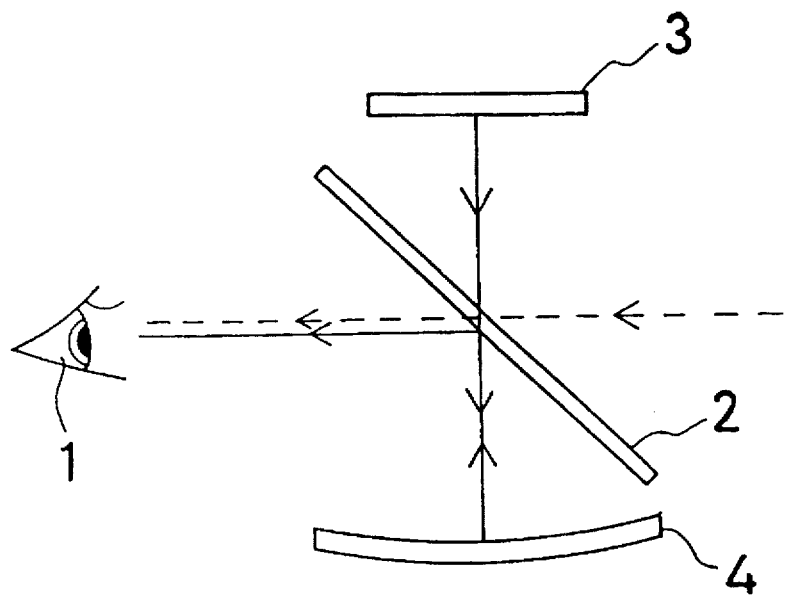
FIG. 53 is a sectional view showing one conventional head-mounted display apparatus.
Figure 54:
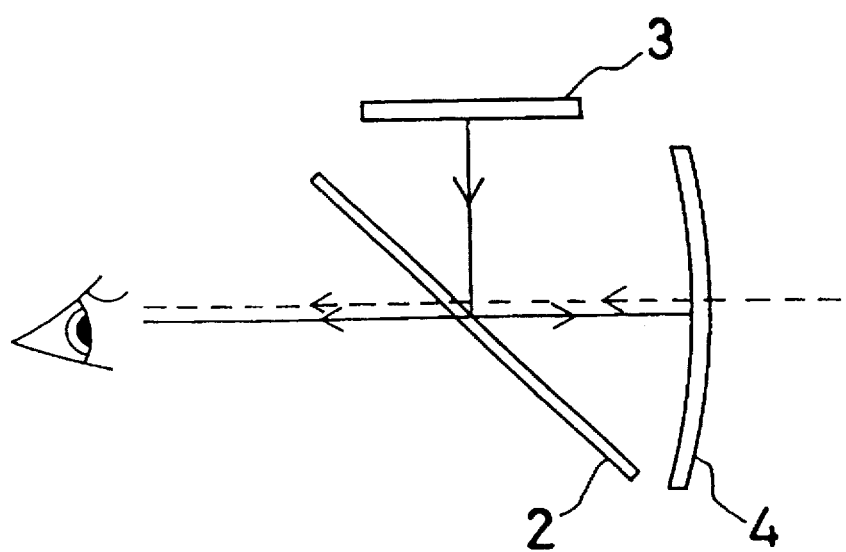
FIG. 54 is a sectional view showing a modification of the conventional head-mounted display apparatus.
Figure 55A:
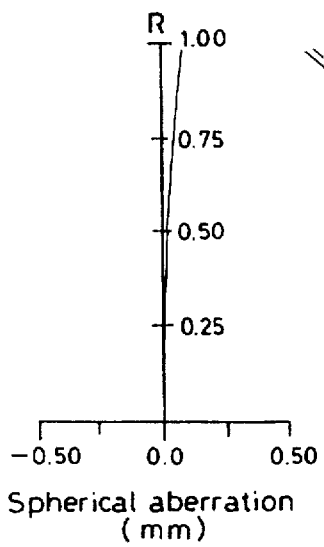
FIGS. 55A–55I graphically show various aberrations in the ocular optical system in FIG. 53 in a similar manner to FIG. 33 with FIGS. 55D–55F being meridional coma and FIGS. 55G–55I being sagittal coma.
Figure 55B:
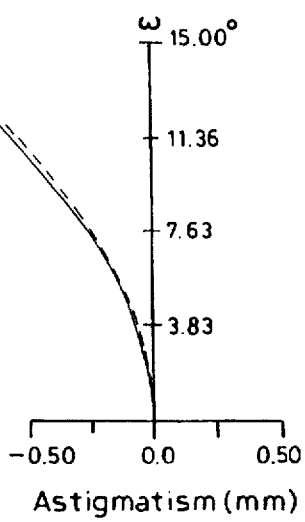
Figure 55C:
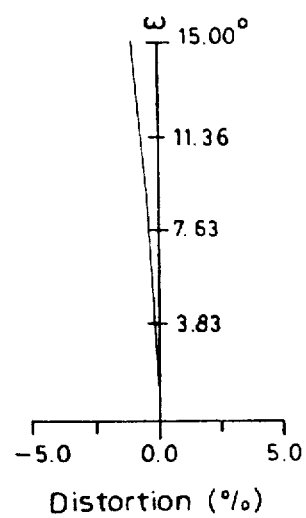
Figure 55D:
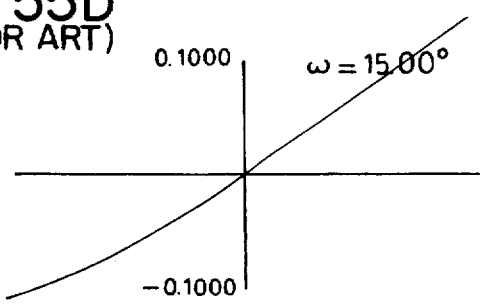
Figure 55E:
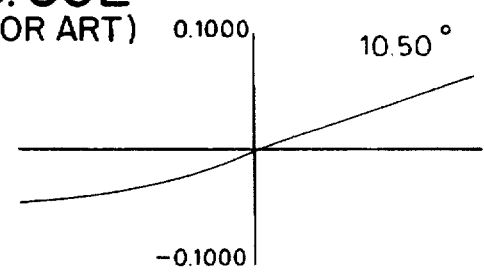
Figure 55F:
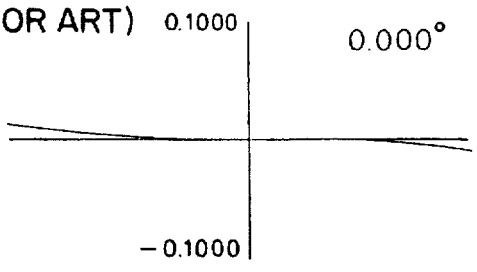
Figure 55G:
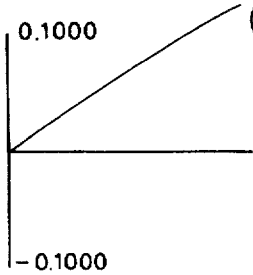
Figure 55H:
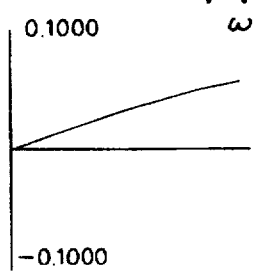
Figure 55I:
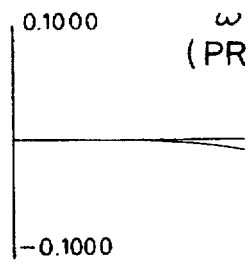

Although the image display apparatus of the present invention has been described above on the basis of the principle and some Examples thereof, it should be noted that the present invention is not necessarily limited to the described Examples and that various changes and modifications may be imparted thereto. Although in the foregoing description, the magnifying reflecting mirror is disposed outside the visual field so as to face the image display device and to extend parallel to the observer's line of sight, as shown in FIG. 53, the arrangement may be such that only the image display device is disposed outside the visual field in parallel to the observer's line of sight, and the magnifying reflecting mirror is disposed on the side of the optical path splitting device which is opposite to the side thereof which faces the observer's eyeball, as shown in FIG. 54. In this case, a bundle of rays from the image display device is first reflected by the optical path splitting device and then reflected by the magnifying reflecting mirror and transmitted through the optical path splitting device to reach the eyeball.

As will be clear from the foregoing description, according to the present invention, at least one surface having positive refractive power is disposed between the observer's eyeball and the optical path splitting device. Accordingly, an image of wide field angle can be obtained with a compact arrangement. If at least two different kinds of glass material are interposed between the optical path splitting device and the magnifying reflecting mirror, it is possible to obtain an image corrected for chromatic aberration for a wide field angle. In addition, the present invention enables minimization of the Petzval sum of the optical system despite the compact arrangement and hence makes it possible to provide an image which is favorably flat from the center to the peripheral edges thereof. Accordingly, it is possible to provide a head-mounted display apparatus which will not fatigue the observer's eye.

What is claimed is:

1. An image display apparatus comprising:

an image display device for displaying an image;

a semitransparent reflecting member provided in a direction of propagation of rays emitted from said image display device;

a magnifying reflecting mirror disposed so that rays emerging from said semitransparent reflecting member moves to and from said magnifying reflecting mirror and returns to said semitransparent reflecting member; and an optical member of positive power which is provided on an optical path between said image display device and an eye point to which rays reflected by said magnifying reflecting mirror is led through said semitransparent reflecting member;

said magnifying reflecting mirror being a reverse reflecting mirror having a configuration in which a coating surface is provided on an optical member whose refractive index (n) is larger than 1 (n>1) and which has positive power as a whole so that rays entering said optical member is reflected by said coating surface.

2. An image display apparatus according to claim 1, which satisfies the following condition:

$$|F\phi_3/n_3^2|<1 \quad (30)$$

where $\phi_3$ is the power of the reflecting surface of said reverse reflecting mirror; $n_3$ is the refractive index for the spectral d-line of a medium of the optical member constituting said reverse reflecting mirror; and F is the focal length of the entire optical system, exclusive of said image display device.

3. An image display apparatus according to claim 1, which satisfies the following condition:

$$|F\phi_3/n_3^2|<0.6 \quad (30)'$$

where $\phi_3$ is the power of the reflecting surface of said reverse reflecting mirror; $n_3$ is the refractive index for the spectral d-line of a medium of the optical member constituting said reverse reflecting mirror; and F is the focal length of the entire optical system, exclusive of said image display device.

4. An image display apparatus according to claim 1, further comprising at least one lens of positive power provided between said eye point and said semitransparent reflecting member.

5. An image display apparatus according to claim 1, further comprising at least one lens of negative power provided between said eye point and said semitransparent reflecting member.

6. An image display apparatus according to claim 1, further comprising at least one lens of positive power provided between said image display device and said semitransparent reflecting member.

7. An image display apparatus according to claim 1, further comprising at least one lens of negative power provided between said image display device and said semitransparent reflecting member.

8. An image display apparatus according to claim 1, which satisfies the following condition:

$$2<R/F<8 \quad (31)$$

where R is the radius of curvature of said reverse reflecting mirror, and F is the focal length of the entire optical system, exclusive of said image display device.

9. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror;

wherein an optical member of positive power is provided on an optical path, including said complete optical path, between said semitransparent reflecting member and an eye point that is determined by said image display device, said semitransparent reflecting member and said magnifying reflecting mirror;

wherein said magnifying reflecting mirror is a surface reflecting mirror that reflects rays at an entrance-side surface thereof; and wherein said image display apparatus satisfies the following condition:

$$0.5<|n_{2}\phi_1/\phi_2|<4$$

where $\phi_1$ is the power of said surface reflecting mirror; $\phi_2$ is the power of said optical member having positive power; and $n_2$ is the refractive index for the spectral d-line of said optical member having positive power.

10. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror;

wherein an optical member of positive power is provided on an optical path, including said complete optical path, between said semitransparent reflecting member and an eye point that is determined by said image display device, said semitransparent reflecting member and said magnifying reflecting mirror;

wherein said magnifying reflecting mirror is a surface reflecting mirror that reflects rays at an entrance-side surface thereof; and wherein said image display apparatus satisfies the following condition:

$$1<|n_2\phi_1/\phi_2|<3$$

where $\phi_1$ is the power of said surface reflecting mirror; $\phi_2$ is the power of said optical member having positive power; and $n_2$ is the refractive index for the spectral d-line of said optical member having positive power.

11. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror;

wherein an optical member of positive power is provided on an optical path, including said complete optical path, between said semitransparent reflecting member and an eye point that is determined by said image display device, said semitransparent reflecting member and said magnifying reflecting mirror;

wherein said magnifying reflecting mirror is a surface reflecting mirror that reflects rays at an entrance-side surface thereof; and wherein said optical member of positive power is a lens system having positive power.

12. An image display apparatus according to claim 11, wherein said lens system having positive power is provided between said image display device and said semitransparent reflecting member.

13. An image display apparatus according to claim 11, wherein said lens system having positive power is provided between said eye point and said semitransparent reflecting member.

14. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror;

wherein an optical member of positive power is provided on an optical path, including said complete optical path, between said semitransparent reflecting member and an eye point that is determined by said image display device, said semitransparent reflecting member and said magnifying reflecting mirror;

wherein said magnifying reflecting mirror is a surface reflecting mirror that reflects rays at an entrance-side surface thereof; and wherein said image display apparatus satisfies the following condition:

$$2 < R/F < 3$$

where R is the radius of curvature of said surface reflecting mirror, and F is the focal length of the entire optical system, exclusive of said image display device.

15. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror;

wherein an optical member of positive power is provided on an optical path, including said complete optical path, between said semitransparent reflecting member and an eye point that is determined by said image display device, said semitransparent reflecting member and said magnifying reflecting mirror; and wherein said semitransparent reflecting member is formed from a prism having a half-mirror surface, and wherein at least two different kinds of medium are present between said half-mirror surface and said magnifying reflecting mirror, one of the two different kinds of medium constituting said prism.

16. An image display apparatus according to claim 15, wherein said optical member of positive power is a surface of positive power that is provided on an end surface of said prism.

17. An image display apparatus according to claim 15, wherein said prism satisfies the following condition:

$$v_d > 30$$

where $V_d$ is the Abbe's number of said prism for the spectral d-line.

18. An image display apparatus according to claim 15, further comprising a lens of negative power provided between said prism and said magnifying reflecting mirror.

19. An image display apparatus according to claim 18, wherein said lens of negative power satisfies the following condition:

$$v_d < 50$$

where $V_d$ is the Abbe's number of said lens of negative power for the spectral d-line.

20. An image display apparatus according to claim 15, further comprising a cemented lens of a positive lens and a negative lens provided between said prism and said magnifying reflecting mirror.

21. An image display apparatus according to claim 20, wherein the cemented surface of said cemented lens is formed from a convex surface of said positive lens and a concave surface of said negative lens.

22. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror; and wherein an optical member of positive power is provided on an optical path, including said complete optical path, between said semitransparent reflecting member and an eye point that is determined by said image display device, said semitransparent reflecting member and said magnifying reflecting mirror;

wherein said optical member of positive power is provided between said semitransparent reflecting member and said eye point; and wherein said optical member of positive power is a lens having positive power.

23. An image display apparatus including a face-mounted unit which has an image display device, a semitransparent reflecting member, and a magnifying reflecting mirror, and a support member for retaining said face-mounted unit on an observer's head;

said semitransparent reflecting member being provided in a direction of propagation of rays emitted from said image display device so that an optical path is formed to extend from said image display device to said semitransparent reflecting member; and said magnifying reflecting mirror being disposed so that a complete optical path for forward and backward travel of rays is provided between said semitransparent reflecting member and said magnifying reflecting mirror;

wherein an optical member of positive power is provided on an optical path, including said complete optical path, between said semitransparent reflecting member and an eye point that is determined by said image display device, said semitransparent reflecting member and said magnifying reflecting mirror;

wherein said optical member of positive power is provided between said semitransparent reflecting member and said eye point; and wherein said optical member of positive power satisfies the following condition:

$$0.1\phi < \phi_1 < 0.5\phi$$

where $\phi_1$ is the power of said optical member having positive power, and $\phi$ is the power of the entire optical system, exclusive of said image display device.

24. An image display apparatus comprising:

an image display device for displaying an image;

a semitransparent reflecting member provided in a direction of propagation of rays emitted from said image display device;

a magnifying reflecting mirror disposed so that rays passing through said semitransparent reflecting member moves to and from said magnifying reflecting mirror and returns to said semitransparent reflecting member; and an optical member of positive power which is provided between said image display device and an eye point which rays reflected by said magnifying reflecting mirror forms in a direction in which the reflected rays are reflected by said semitransparent reflecting member;

said magnifying reflecting mirror being a reverse reflecting mirror having a configuration in which a coating surface is provided on an optical member whose refractive index (n) is larger than 1 (n>1) and which has positive power as a whole so that rays entering said optical member is reflected by said coating surface.

25. An image display apparatus comprising:

an image display device for displaying an image;

a semitransparent reflecting member provided in a direction of propagation of rays emitted from said image display device;

a magnifying reflecting mirror disposed so that rays reflected by said semitransparent reflecting member moves to and from said magnifying reflecting mirror and returns to said semitransparent reflecting member; and an optical member of positive power which is provided between said image display device and an eye point which rays reflected by said magnifying reflecting mirror forms in a direction in which the reflected rays are transmitted by said semitransparent reflecting member;

said magnifying reflecting mirror being a reverse reflecting mirror having a configuration with a cemented surface defined by said optical member whose refractive index (n) is larger than 1 (n>1) and which has positive power as a whole so that rays entering said optical member are reflected by said cemented surface.

26. An image display apparatus including a face-mounted unit which has an image display device, a semitransparent reflecting member, and a magnifying reflecting mirror, and a support member for retaining said face-mounted unit on an observer's head, said image display apparatus comprising:

said semitransparent reflecting member being provided in a direction of propagation of rays emitted from said image display device so that an optical path is formed to extend from said image display device to said semitransparent reflecting member;

said magnifying reflecting mirror being disposed so that an optical path for a round-trip travel of rays is provided between said semitransparent reflecting member and said magnifying reflecting mirror; and an optical member of positive power which is provided between said image display device and an eye point that is determined by said image display device, said semitransparent reflecting member and said magnifying reflecting mirror;

said magnifying reflecting mirror being a reverse reflecting mirror having a configuration with a cemented surface defined by said optical member whose refractive index (n) is larger than 1 (n>1) and which has positive power as a whole so that rays entering said optical member are reflected by said cemented surface.

27. An image display apparatus including a face-mounted unit which has an image display device, a member having both reflecting and transmitting functions, a magnifying reflecting mirror, a support member for retaining said face-mounted unit on an observer's head, said image display apparatus comprising:

said member having both reflecting and transmitting functions being provided in a direction of propagation of rays emitted from said image display device so that an optical path is formed to extend from said image display device to said member having both reflecting and transmitting functions;

said magnifying mirror being disposed so that a turn-back optical path for a complete travel of light rays is provided between said member having both reflecting and transmitting functions, and said magnifying reflecting mirror;

said magnifying reflecting mirror having a refractive index n which is larger than 1, said magnifying reflecting mirror further having a configuration including a coating surface that forms a back-coated mirror, said turn-back optical path being defined by said back-coated mirror; and an optical system that includes said back-coated mirror and said member having both reflecting and transmitting functions, and which has a positive power as a whole, said optical system being arranged to lead an image of said image display device to an observer's eyeball.

28. An image display apparatus according to claim 27, wherein said face-mounted unit is provided with a pair of left and right image display devices, a pair of left and right members having both reflecting and transmitting functions, and a pair of left and right back-coated mirrors.

29. An image display apparatus according to claim 27 or 28, wherein said image display device is provided in said face-mounted unit so that said image display device is disposed in front of a face of an observer.

30. An image display apparatus according to claim 27 or 28, wherein each of said magnifying reflecting mirror and said member having both reflecting and transmitting functions is formed of a prism member, which includes a medium having a refractive index, n that satisfies the condition:

n>1.

* * * * *